(12) United States Patent
Hattori et al.

(10) Patent No.: US 10,523,975 B2
(45) Date of Patent: Dec. 31, 2019

(54) INFORMATION PROCESSING DEVICE AND INFORMATION PROCESSING METHOD

(71) Applicant: SONY CORPORATION, Tokyo (JP)

(72) Inventors: Shinobu Hattori, Tokyo (JP); Mitsuhiro Hirabayashi, Tokyo (JP); Ohji Nakagami, Tokyo (JP); Toru Chinen, Kanagawa (JP); Runyu Shi, Kanagawa (JP); Minoru Tsuji, Chiba (JP); Yuki Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 145 days.

(21) Appl. No.: 14/904,232

(22) PCT Filed: Jul. 1, 2014

(86) PCT No.: PCT/JP2014/067508
§ 371 (c)(1),
(2) Date: Jan. 11, 2016

(87) PCT Pub. No.: WO2015/008613
PCT Pub. Date: Jan. 22, 2015

(65) Prior Publication Data
US 2016/0156944 A1 Jun. 2, 2016

(30) Foreign Application Priority Data

Jul. 19, 2013 (JP) .................................. 2013-151020
May 23, 2014 (WO) .................. PCT/JP2014/063752
Jun. 19, 2014 (WO) .................. PCT/JP2014/066321

(51) Int. Cl.
*H04N 21/234* (2011.01)
*H04N 21/4728* (2011.01)
(Continued)

(52) U.S. Cl.
CPC ....... *H04N 21/23418* (2013.01); *H04N 5/765* (2013.01); *H04N 21/2368* (2013.01);
(Continued)

(58) Field of Classification Search
CPC ....... H04N 21/23418; H04N 21/23614; H04N 21/2368; H04N 21/8456; H04N 21/8106;
(Continued)

(56) References Cited

U.S. PATENT DOCUMENTS

2003/0160862 A1* 8/2003 Charlier ............. H04N 5/23238
348/14.08
2004/0207728 A1 10/2004 Kihara et al.
(Continued)

FOREIGN PATENT DOCUMENTS

CN 101212577 A 7/2008
EP 1035732 A1 9/2000
(Continued)

OTHER PUBLICATIONS

Jan. 31, 2017, EP communication issued for related EP application No. 14826072.2.
(Continued)

*Primary Examiner* — Benjamin R Bruckart
*Assistant Examiner* — Akshay Doshi
(74) *Attorney, Agent, or Firm* — Paratus Law Group, PLLC

(57) ABSTRACT

The present disclosure relates to an information processing device and information processing method capable of recognizing an acquisition position of voice data on an image. A web server transmits image frame size information indicating image frame size of image data and audio position information indicating acquisition position of voice data. The present disclosure is applicable to an information processing system or other like system including file generation
(Continued)

device, web server, and video playback terminal to perform tiled streaming using a manner compliant with moving picture experts group phase-dynamic adaptive streaming over HTTP (MPEG-DASH).

15 Claims, 37 Drawing Sheets

(51) Int. Cl.
*H04N 21/81* (2011.01)
*H04N 21/854* (2011.01)
*H04N 5/765* (2006.01)
*H04N 21/84* (2011.01)
*H04N 21/845* (2011.01)
*H04N 21/236* (2011.01)
*H04N 21/2368* (2011.01)

(52) U.S. Cl.
CPC ... *H04N 21/23614* (2013.01); *H04N 21/4728* (2013.01); *H04N 21/816* (2013.01); *H04N 21/8106* (2013.01); *H04N 21/84* (2013.01); *H04N 21/8456* (2013.01); *H04N 21/85406* (2013.01)

(58) Field of Classification Search
CPC ........... H04N 21/816; H04N 21/85406; H04N 21/4728; H04N 5/765
See application file for complete search history.

(56) References Cited

U.S. PATENT DOCUMENTS

| | | | |
|---|---|---|---|
| 2008/0163329 A1 | 7/2008 | Kitashou | |
| 2009/0128617 A1* | 5/2009 | Zhan | H04N 7/147 348/14.12 |
| 2011/0058683 A1* | 3/2011 | Kosteva | H04R 3/005 381/92 |
| 2013/0076779 A1* | 3/2013 | Ernst | G06F 17/3028 345/604 |
| 2013/0321568 A1* | 12/2013 | Suzuki | H04N 5/23238 348/36 |

FOREIGN PATENT DOCUMENTS

| | | |
|---|---|---|
| JP | 06-301390 | 10/1994 |
| JP | 2001-197598 | 7/2001 |
| JP | 2004-007211 | 1/2004 |
| JP | 2007-027846 | 2/2007 |

OTHER PUBLICATIONS

Niamut, et al., Towards a Format-agnostic Approach for Production, Delivery and Rendering of Immersive Media, ACM Multimedia Systems 2013, Feb. 27-Mar. 1, 2013, pp. 249-260, Oslo, Norway.
Thomas, et al., Spatially segmented content description, International Organisation for Standardisation, ISO/IEC JTC1/SC29/WG11 MPEG2013/m28883, Apr. 2013, pp. 1-12, Incheon, South Korea.
ISO/IEC JTC 1/SC 29, "Information technology—Coding of audio-visual objects—Part 12: ISO base media file format, Technical Corrigendum 5", Dec. 12, 2011, p. i-37.
Mar. 27, 2018, Japanese Office Action issued for related JP Application No. 2015-527242.
May 25, 2018, Chinese Office Action issued for related CN Application No. 201480039825.2.
Feb. 3, 2019, Chinese Office Action issued for related CN Application No. 201480039825.2.
Feb. 27, 2019, European Communication issued for related EP Application No. 14826072.2.

* cited by examiner

FIG. 18

```
aligned(8) class GeneralSubsegmentIndexBox extends FullBox('gsix', 0, 0) {
    grouping_type int(32);
    unsigned int(32) subsegment_count;
    for(i=1;i<=subsegment_count;i++)
    {
        unsigned int(32) entry_count;
        for (j=1;j<= entry_count;j++) {
            unsigned int(8) entry_index;
            unsigned int(24) range_size;
        }
    }
}
```

FIG. 21

```
aligned(8) class GeneralSubsegmentIndexBox extends FullBox('gsix', 0, 0) {
    grouping_type int(32);
    unsigned int(32) subsegment_count;
    for(i=1;i<=subsegment_count;i++)
    {
        unsigned int(32) entry_count;
        for (j=1;j<= entry_count;j++) {
            unsigned int(8) entry_index;
            unsigned int(24) range_size;
        }
    }
}
```

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2014/067508 (filed on Jul. 1, 2014) under 35 U.S.C. § 371, which claims priority to PCT International Patent Application Nos. PCT/JP2014/066321 (filed on Jun. 16, 2014), PCT/JP2014/063752 (filed on May 23, 2014), and Japanese Patent Application No. 2013-151020 (filed on Jul. 19, 2013), which are all hereby incorporated by reference in their entirety.

TECHNICAL FIELD

The present disclosure relates to an information processing device and information processing method, and in particular, to an information processing device and information processing method, capable of recognizing an acquisition position of voice data on an image.

Background Art

One of the recent most popular streaming services is the over-the-top video (OTT-V) via the Internet. The moving picture experts group phase-dynamic adaptive streaming over HTTP (MPEG-DASH) is widely used as its underlying technology (see, for example, Non-Patent Literature 1).

In MPEG-DASH, a delivery server prepares a group of video data having different screen sizes and coding rates for one video content item, and a playback terminal requests a group of video data having an optimal screen size and coding rate depending on transmission line conditions, thus adaptive streaming delivery is achieved.

CITATION LIST

Non-Patent Literature

Non-Patent Literature 1: MPEG-DASH (Dynamic Adaptive Streaming over HTTP) (URL:http://mpeg.chiariglione.org/standards/mpeg-dash/media-presentation-description-and-segment-formats/text-isoiec-23009-12012-dam-1)

SUMMARY OF INVENTION

Technical Problem

However, no consideration is given to the recognition by a playback terminal of an acquisition position of voice data on video content.

The present disclosure is made in view of such circumstances, and is intended to be capable of recognizing an acquisition position of voice data on an image.

Solution to Problem

An information processing device according to a first aspect of the present disclosure includes: a transmitter configured to transmit image frame size information and voice position information, the image frame size information indicating an image frame size of image data, the voice position information indicating an acquisition position of voice data.

An information processing method according to the first aspect of the present disclosure corresponds to the information processing device according to the first aspect of the present disclosure.

According to the first aspect of the present disclosure, image frame size information and voice position information are transmitted, the image frame size information indicating an image frame size of image data, the voice position information indicating an acquisition position of voice data.

An information processing device according to a second aspect of the present disclosure includes: a receiver configured to receive image frame size information and voice position information, the image frame size information indicating an image frame size of image data, the voice position information indicating an acquisition position of voice data; and a position determination unit configured to determine an acquisition position of the voice data on an image corresponding to the image data based on the image frame size information of the image data and the voice position information received by the receiver.

An information processing method according to the second aspect of the present disclosure corresponds to the information processing device according to the second aspect of the present disclosure.

According to the second aspect of the present disclosure, image frame size information and voice position information are received, the image frame size information indicating an image frame size of image data, the voice position information indicating an acquisition position of voice data. An acquisition position of the voice data on an image corresponding to the image data is determined based on the image frame size information of the image data and the voice position information.

The information processing device according to the first and second aspects may be implemented by allowing a computer to execute a program.

The program to be executed by a computer may be provided by being transmitted through a transmission medium or being recorded in a recording medium to implement the information processing device according to the first and second aspects.

Advantageous Effects of Invention

According to the first aspect of the present disclosure, it is possible to transmit information used to recognize an acquisition position of voice data on an image.

According to the second aspect of the present disclosure, it is possible to recognize an acquisition position of voice data on an image.

BRIEF DESCRIPTION OF DRAWINGS

FIG. 18 is a diagram illustrating an exemplary description of gsix.

FIG. 21 is a diagram illustrating an exemplary description of type assignment box.

DESCRIPTION OF EMBODIMENTS

First Embodiment (Overview of First Embodiment of Information Processing System)

Figure 1:
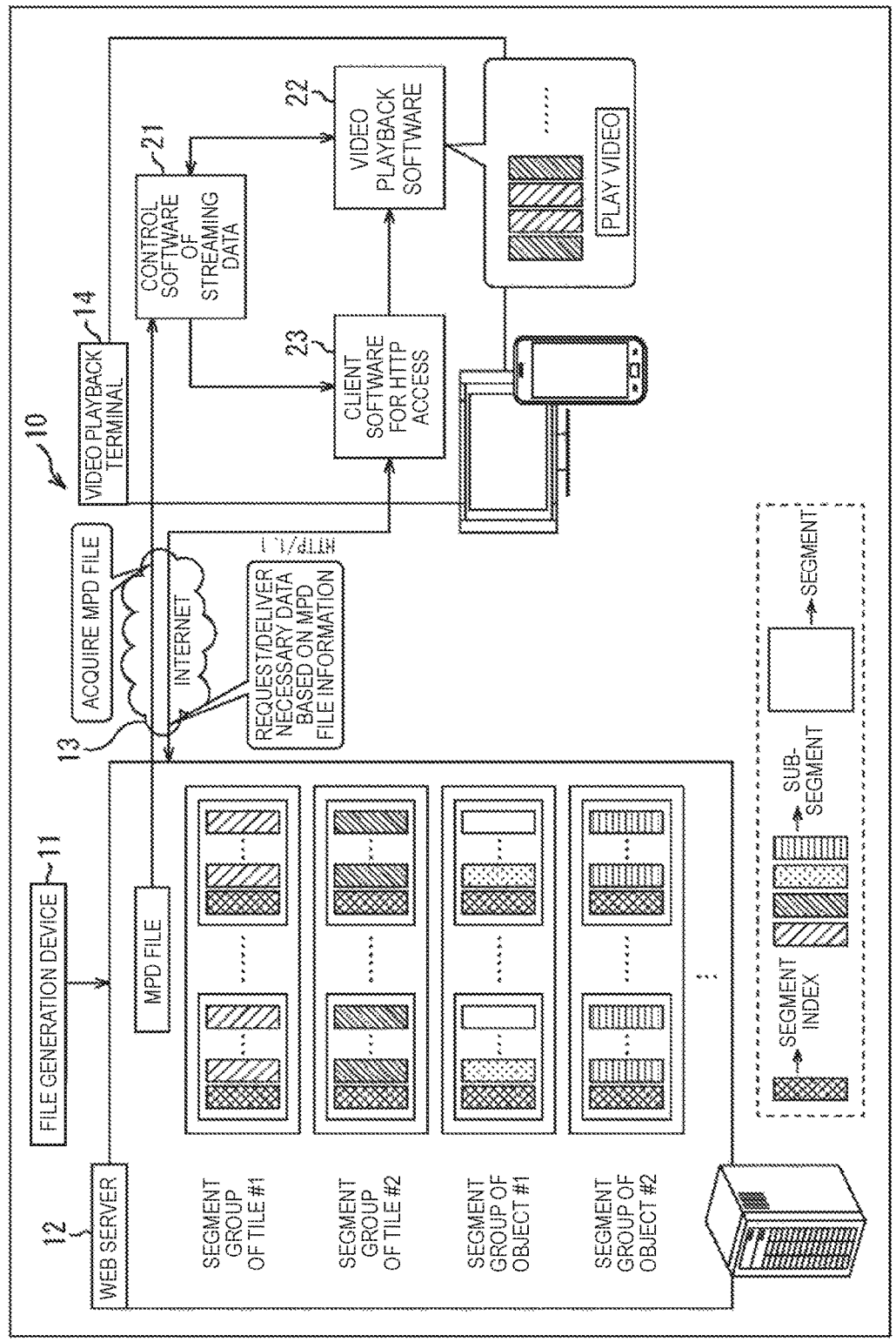
FIG. 1 is a diagram illustrated to describe an overview of a first embodiment of an information processing system to which the present disclosure is applied.

FIG. 1 is a diagram illustrated to describe an overview of a first embodiment of an information processing system to which the present disclosure is applied.

An information processing system 10 shown in FIG. 1 is configured to include a Web server 12 and a video playback terminal 14, which are connected to each other through the Internet 13. The Web server 12 is connected to a file generation device 11.

In the information processing system 10, the Web server 12 delivers image data of video content to the video playback terminal 14 in unit of tiles (tiled streaming) using a manner compliant with MPEG-DASH.

Specifically, the file generation device 11 acquires the image data of video content and encodes the image data in units of tiles to generate a video stream. The file generation device 11 processes the video stream of each tile into a file format at time intervals ranging from several seconds to approximately ten seconds, which is called a segment. The file generation device 11 uploads the resulting image file of each tile to the Web server 12.

The file generation device 11 acquires voice data of video content for each object (described late in detail) and encodes the voice data in unit of objects to generate an audio stream. The file generation device 11 processes an audio stream of each object into a file format in unit of segments, and uploads the resulting voice file of each object to the Web server 12.

The object is a sound source. The voice data of each object is acquired through a microphone or other audio equipment attached to the object. The object may be a material body such as a fixed microphone stand, or may be a moving body such as a person.

The file generation device 11 encodes audio metadata including object position information (voice position information) indicating the position of each object (the position at which voice data is acquired) and an object ID that is a unique ID to the object. The file generation device 11 processes the encoded data obtained by encoding the audio metadata into a file format in unit of segments, and the file generation device 11 uploads the resulting voice metafile to the Web server 12.

The file generation device 11 generates a media presentation description (MPD) file (control information) used to manage an image file or a voice file. The media presentation description file may contain image frame size information that indicates the frame size of images of video content and contains tile position information that indicates the position of each tile on an image. The file generation device 11 uploads the MPD file to the Web server 12.

The Web server 12 stores the image file, voice file, voice metafile, and MPD file which are uploaded from the file generation device 11.

In the example shown in FIG. 1, the Web server 12 stores a segment group of a plurality of segments composed of image files of a tile with a tile ID "1" and a segment group of a plurality of segments composed of image files of a tile with a tile ID "2". The Web server 12 also stores a segment group of a plurality of segments composed of voice files of an object with an object ID "1" and a segment group of a plurality of segments composed of voice files of an object with an object ID "2". Although not shown, a segment group composed of voice metafiles is similarly stored.

A file with a tile ID of i is referred to as "tile #i", and an object with an object ID of i is referred to as "object #i", hereinafter.

The Web server 12 functions as a transmitter configured to transmit the stored image file, voice file, voice metafile, and MPD file to the video playback terminal 14 in response to a request from the video playback terminal 14.

The video playback terminal 14 executes, for example, software for control of streaming data (hereinafter, referred to as control software) 21, video playback software 22, and client software for hypertext transfer protocol (HTTP) access (hereinafter, referred to as access software) 23.

The control software 21 is software to control data delivered via streaming from the Web server 12. Specifically, the control software 21 allows the video playback terminal 14 to acquire the MPD file from the Web server 12.

The control software 21 specifies a tile in a display area based on the display area that is an area in an image used to display video content indicated by the video playback software 22 and the tile position information contained in the MPD file. The control software 21 instructs the access software 23 to issue a request to transmit an image file of the specified tile.

The control software 21 instructs the access software 23 to issue a request to transmit the voice metafile. The control software 21 specifies an object corresponding to an image in the display area, based on the display area, the image frame size information contained in the MPD file, and object position information contained in the voice metafile. The control software 21 instructs the access software 23 to issue a request to transmit a voice file of the specified object.

The video playback software 22 is software to play back the image file and voice file acquired from the Web server 12. Specifically, when the user specifies a display area, the video playback software 22 indicates the specified display area to the control software 21. The video playback software 22 decodes the image file and voice file acquired from the Web server 12 in response to the indication, and the video playback software 22 synthesizes the decoded file for output.

The access software 23 is software to control communication with the Web server 12 via the Internet 13 using HTTP. Specifically, the access software 23 allows the video playback terminal 14 to transmit the request to transmit the image file, voice file, and voice metafile in response to the instruction from the control software 21. The access software 23 allows the video playback terminal 14 to receive the image file, voice file, and voice metafile transmitted from the Web server 12 in response to the transmission request.

(Example of Tile)

Figure 2:
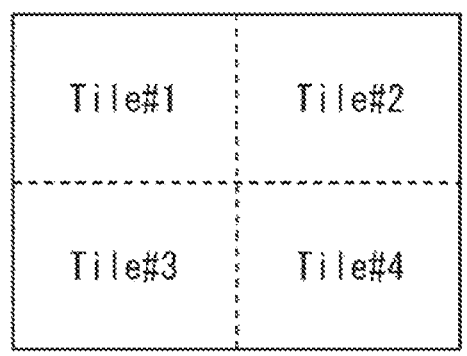
FIG. 2 is a diagram illustrating an example of a title.

FIG. 2 is a diagram illustrating an example of a tile.

As shown in FIG. 2, an image of video content is partitioned into a plurality of tiles. A tile ID that is a sequential number starting from 1 is assigned to each tile. In the example shown in FIG. 2, an image of video content is partitioned into four tiles #1 to #4.

(Illustration of Object)

Figure 3:
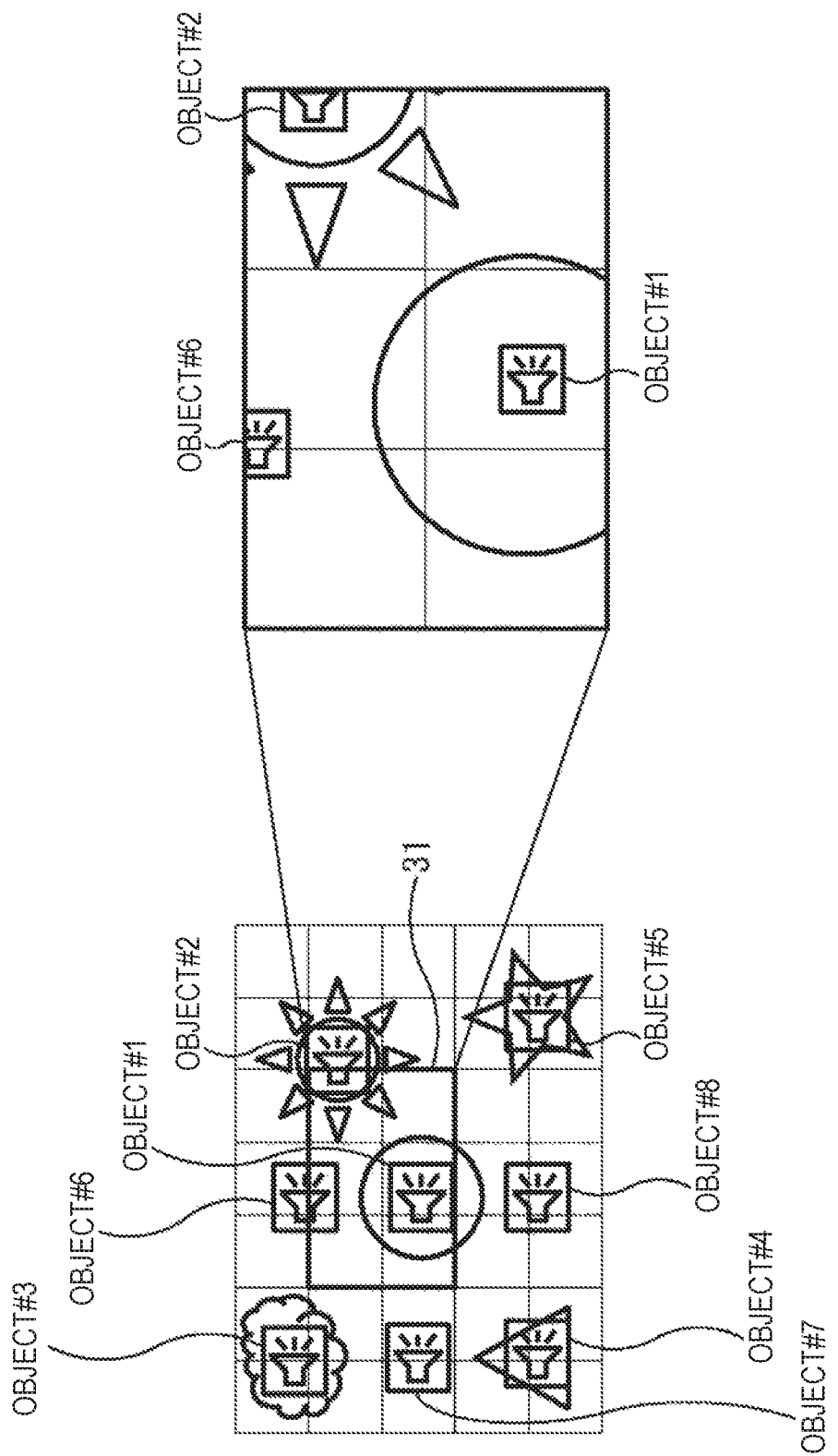
FIG. 3 is a diagram illustrated to describe an object.

FIG. 3 is a diagram illustrated to describe an object.

The example of FIG. 3 illustrates eight voice objects in an image acquired as a voice of video content. An object ID that is a sequential number starting from 1 is assigned to each object. Objects #1 to #5 are moving bodies, and objects #6 to #8 are stationary material bodies. In the example shown in FIG. 3, the image of video content is partitioned into 7 (width)×5 (height) tiles.

In this case, as shown in FIG. 3, when the user specifies a display area 31 composed of 3 (width)×2 (height) tiles, the display area 31 contains only objects #1, #2, and #6. Thus, the video playback terminal 14 may acquire and play back voice files of the objects #1, #2, and #6 from the Web server 12.

The objects in the display area 31 can be specified based on the image frame size information and the object position information as described above.

(Illustration of Object Position Information)

Figure 4:
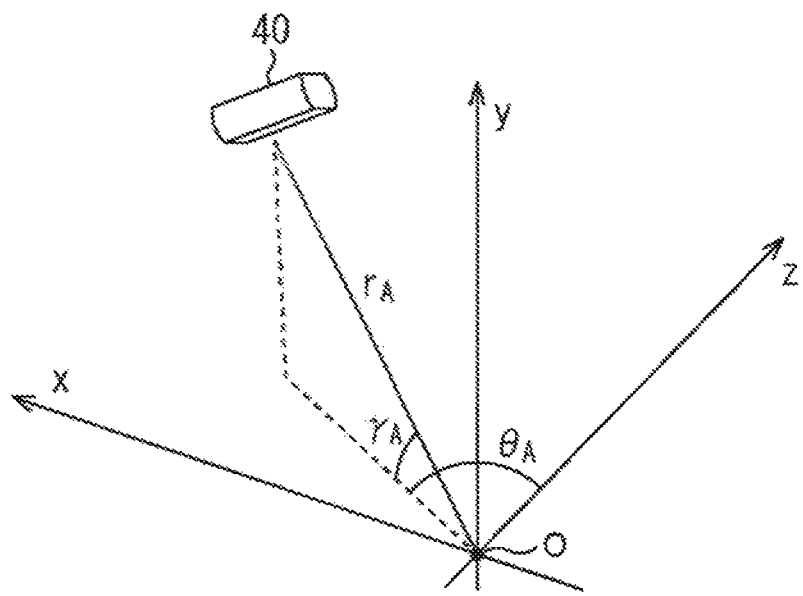
FIG. 4 is a diagram illustrated to describe object position information.

FIG. 4 is a diagram illustrated to describe the object position information.

As shown in FIG. 4, the object position information contains a horizontal angle $\theta_A$ ($-180°\leq\theta_A\leq180°$), a vertical angle $\gamma_A$ ($-90°\leq\gamma_A\leq90°$), and a distance $r_A$ ($0<r_A$). For example, a shooting position in the center of an image may be set to an origin (base point) O, the horizontal direction of the image may be set to X-axis direction, the vertical direction of the image may be set to Y-axis direction, and the depth direction perpendicular to the X-Y plane may be set to Z-axis direction. In this case, the horizontal angle $\theta_A$ is the angle in the horizontal direction formed by the Y-Z plane and the straight line connecting the object 40 and the origin O. The vertical angle $\gamma_A$ is the angle in the vertical direction formed by the X-Z plane and the straight line connecting the object 40 and the origin O. The distance $r_A$ is the distance between the object 40 and the origin O.

Herein, the angle of the left and up rotation is set to a positive angle, and the angle of the right and down rotation is set to a negative angle.

(Illustration of Image Frame Size Information)

Figure 5:
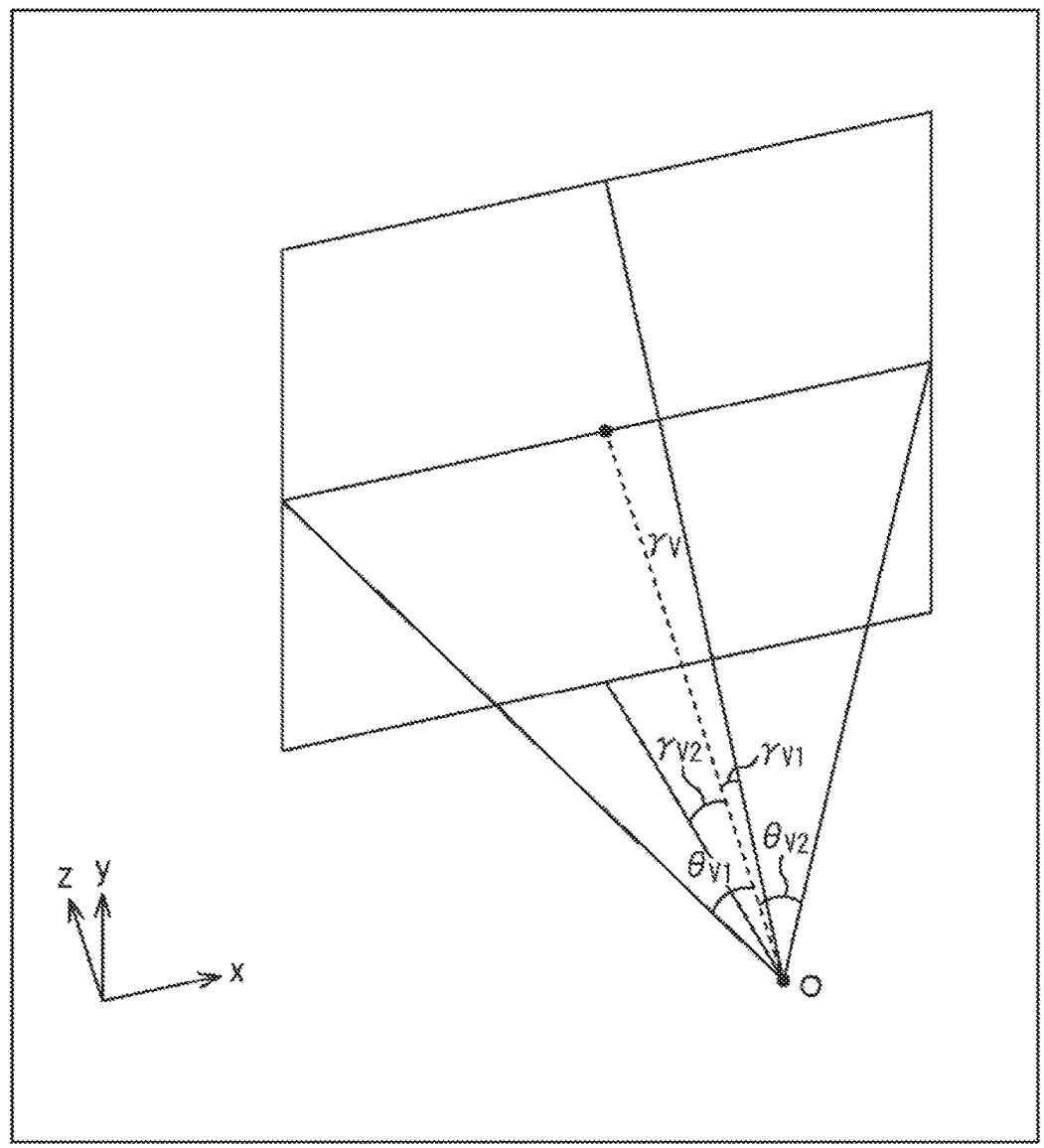
FIG. 5 is a diagram illustrated to describe image frame size information.

FIG. 5 is a diagram illustrated to describe image frame size information.

As shown in FIG. 5, the image frame size information contains a horizontal angle $\theta_{V1}$ of the left edge, a horizontal angle $\theta_{V2}$ of the right edge, a vertical angle $\gamma_{V1}$ of the upper edge, a vertical angle $\gamma_{V2}$ of the lower edge, and a distance $r_V$ in the image frame.

A shooting position of the center of an image may be set to the origin O, the horizontal direction of the image may be set to X-axis direction, the vertical direction of the image may be set to Y-axis direction, and the depth direction perpendicular to the X-Y plane may be set to Z-axis direction. In this case, the horizontal angle $\theta_{V1}$ is the angle in the horizontal direction formed by the Y-Z plane and the straight line connecting the left end of the image frame and the origin O. The horizontal angle $\theta_{V2}$ is the angle in the horizontal direction formed by the Y-Z plane and the straight line connecting the right end of the image frame and the origin O. Thus, an angle obtained by combining the horizontal angle $\theta_{V1}$ and the horizontal angle $\theta_{V2}$ becomes a horizontal angle of view.

The vertical angle $\gamma_{V1}$ is the angle formed by the X-Z plane and the straight line connecting between the upper end of the image frame and the origin O, and the vertical angle $\gamma_{V2}$ is the angle formed by the X-Z plane and the straight line connecting between the lower end of the image frame and the origin O. An angle obtained by combining the vertical angles $\gamma_{v1}$ and $\gamma_{v2}$ becomes a vertical angle of view. The distance $r_A$ is the distance between the origin O and the image plane.

As described above, the object position information represents the positional relationship between the object 40 and the origin O, and the image frame size information represents the positional relationship between the image frame and the origin O. Thus, it is possible to detect (recognize) the position of each object on the image based on the object position information and the image frame size information. As a result, it is possible to specify an object in the display area 31.

(Illustration of MPD File Structure)

Figure 6:
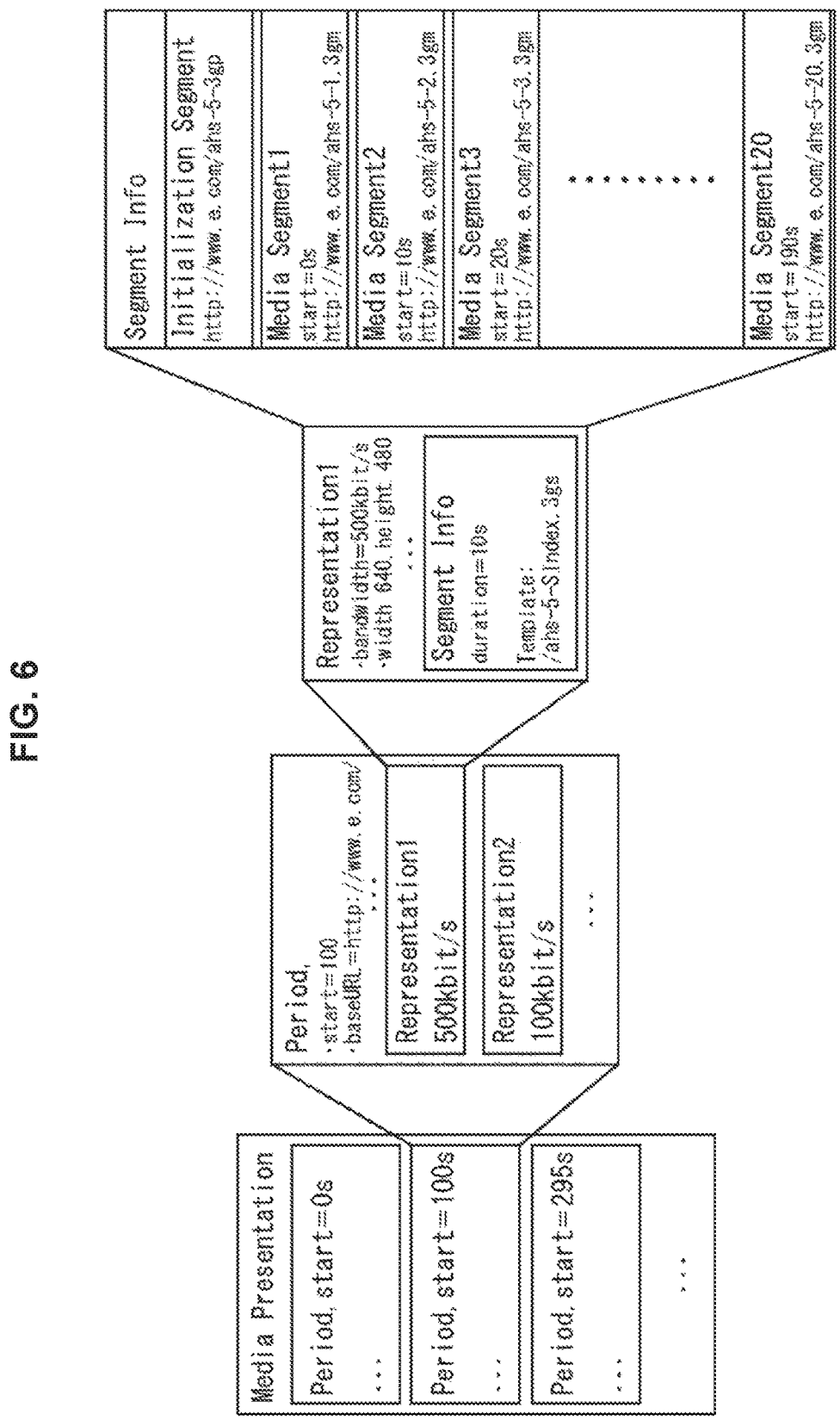
FIG. 6 is a diagram illustrating the structure of MPD file.

FIG. 6 is a diagram illustrating the structure of an MPD file.

In the analysis (parsing) of an MPD file, the video playback terminal 14 selects an optimum one among attributes of "Representation" contained in "Period" of the MPD file (Media Presentation).

The video playback terminal 14 acquires a file by referring to a uniform resource locator (URL) or other reference of "Initialization Segment" at the head of the selected "Representation", and processes the acquired file. The video playback terminal 14 acquires a file by referring to a uniform resource locator (URL) or other reference of the subsequent "Media Segment", and plays back the acquired file.

Figure 7:
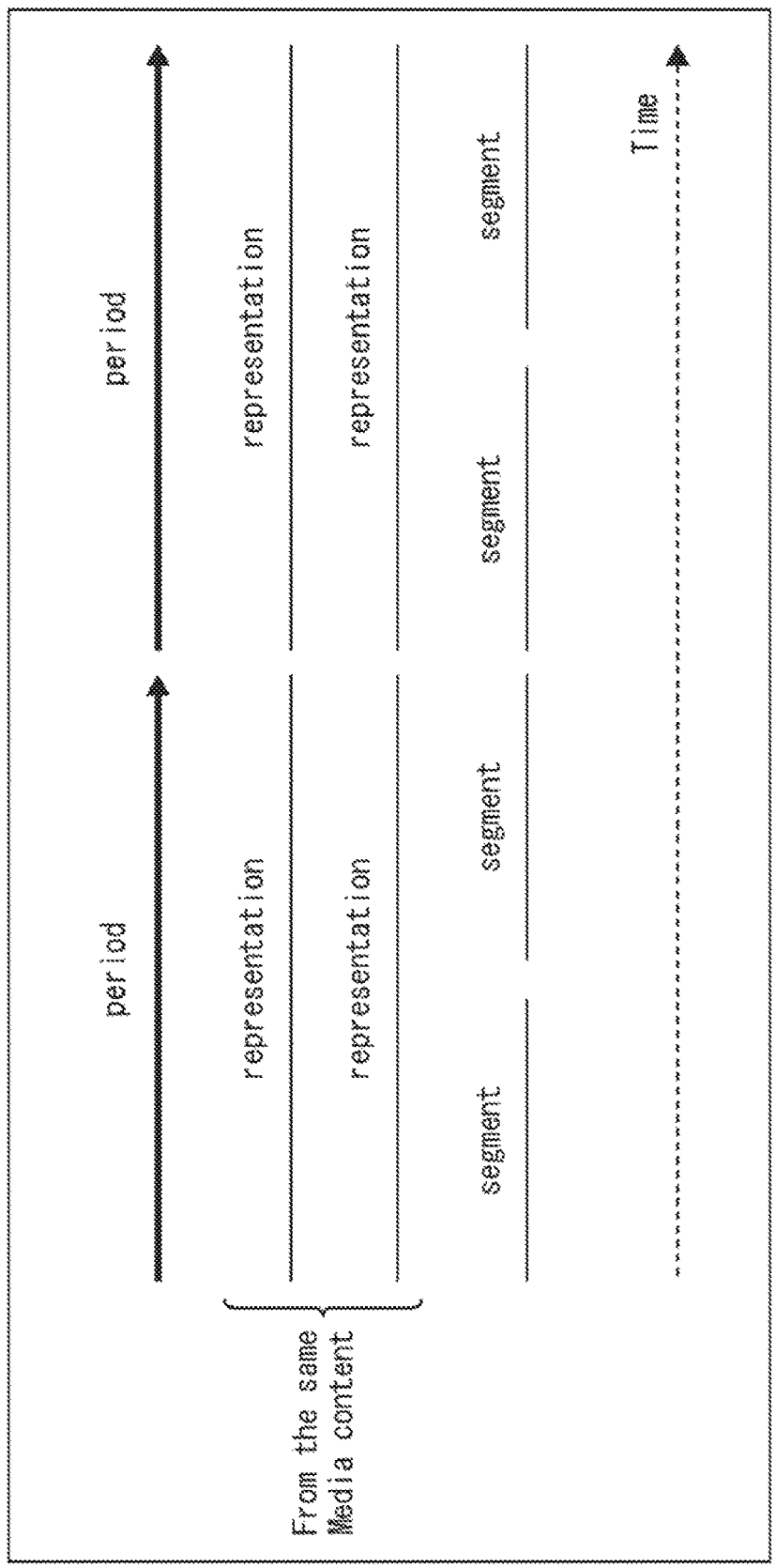
FIG. 7 is a diagram illustrating the relationship among "Period", "Representation", and "Segment" elements.

In the MPD file, the relationship among "Period", "Representation", and "Segment" becomes as shown in FIG. 7. In other words, a single video content item can be managed in a longer time unit than the segment by "Period", and can be managed in unit of segments by "Segment" in each "Period". In each "Period", it is possible to manage the video content in unit of stream attributes by "Representation".

Figure 8:
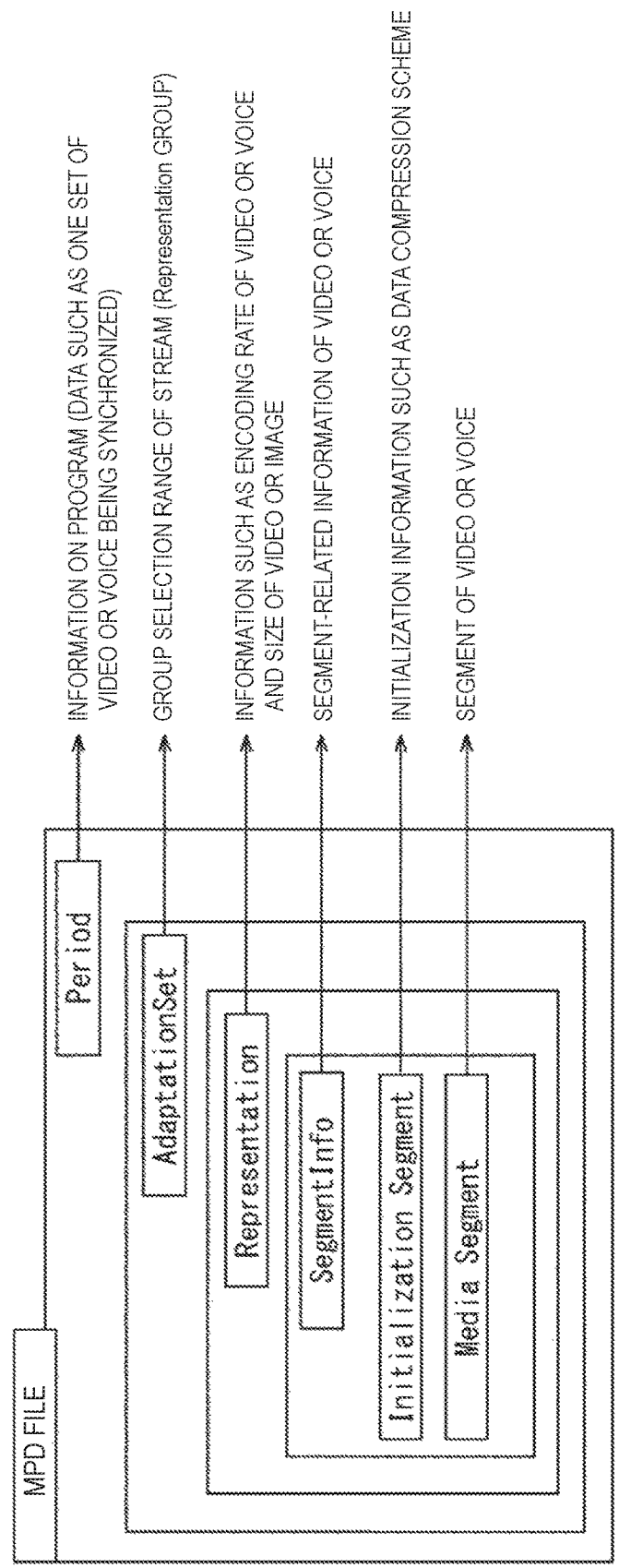
FIG. 8 is a diagram illustrating the hierarchical structure of MPD file.
Figure 9:
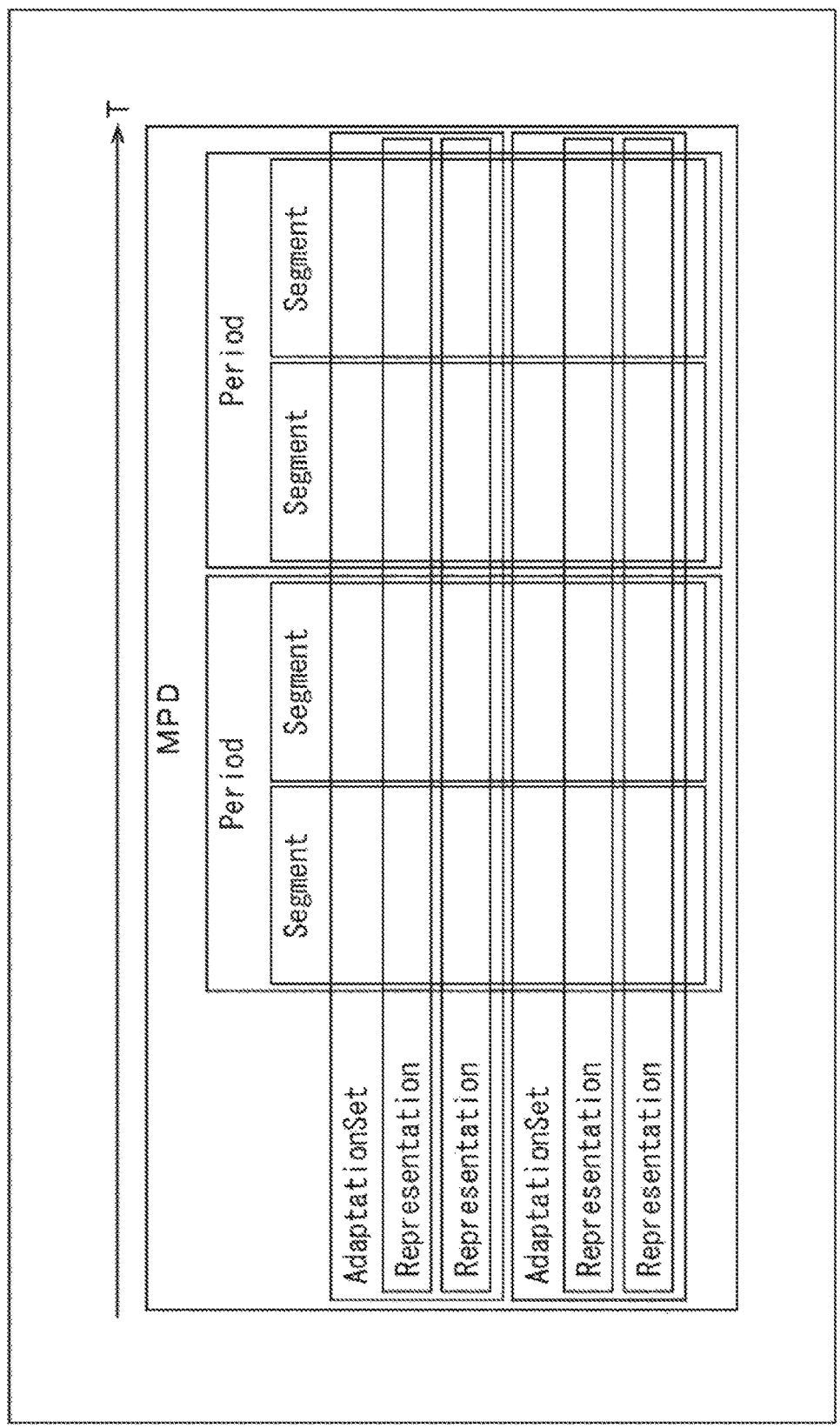
FIG. 9 is a diagram illustrating the relationship between the structure of MPD file and the time axis.

Thus, the MPD file has a hierarchical structure shown in FIG. 8, starting from the "Period". When the structure of the MPD file arranged on the time axis becomes the configuration as shown in FIG. 9. As is clear from FIG. 9, there are a plurality of "Representation" elements in the same segment. The video playback terminal 14 selects any one from among these elements adaptively, and thus it is possible to acquire an image file and voice file in the display area selected by the user and to play back the acquired file.

(Illustration of MPD File)

Figure 10:
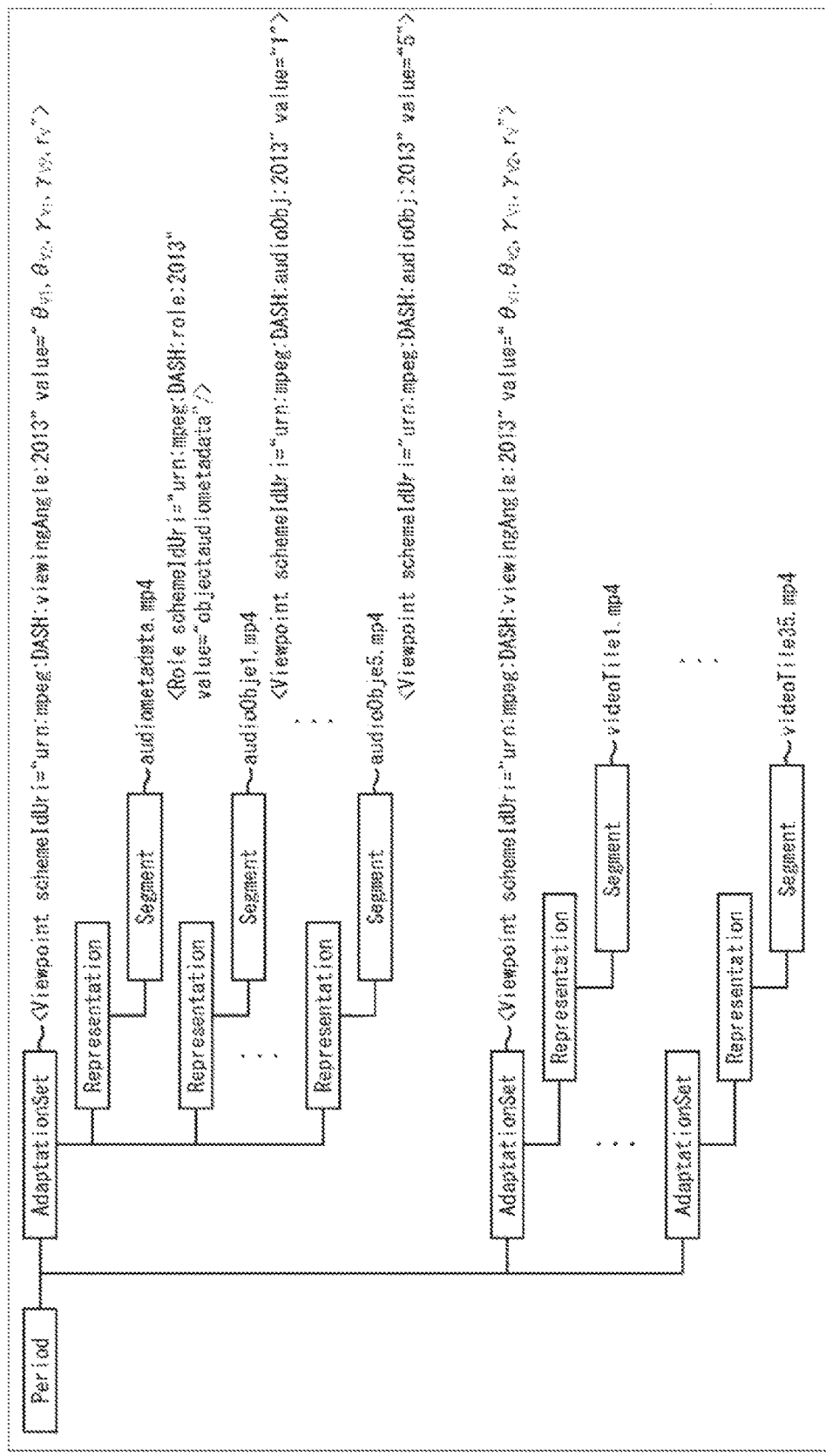
FIG. 10 is a diagram illustrated to describe an exemplary description of MPD file.

FIG. 10 is a diagram illustrated to describe the description of MPD file.

As described above, in the information processing system 10, the image frame size information is contained in the MPD file to allow an object in the display area to be specified by the video playback terminal 14. As shown in FIG. 10, Scheme (um:mpeg:DASH:viewingAngle:2013) used to define new image frame size information (viewing angle) is extended by utilizing a DescriptorType element of Viewpoint, and thus the image frame size information is arranged in an "Adaptation Set" for voice and an "Adaptation Set" for image. The image frame size information may be arranged only in the "Adaptation Set" for image.

The "Representation" for voice metafile is described in the "Adaptation Set" for voice of the MPD file. A URL or other reference as information for specifying the voice metafile (audiometadata.mp4) is described in "Segment" of the "Representation". In this case, it is described that the file to be specified in "Segment" is the voice metafile (objectaudiometadata) by utilizing Role element.

The "Representation" for voice file of each object is also described in "Adaptation Set" for voice of the MPD file. A URL or other reference as information for specifying the voice file (audioObje1.mp4, audioObje5.mp4) of each object is described in "Segment" of the "Representation". In this case, object IDs (1 and 5) of the objects corresponding to the voice file are also described by extending Viewpoint.

Although not shown, the tile position information is arranged in the "Adaptation Set" for image.

(Exemplary Configuration of File Generation Device)

Figure 11:
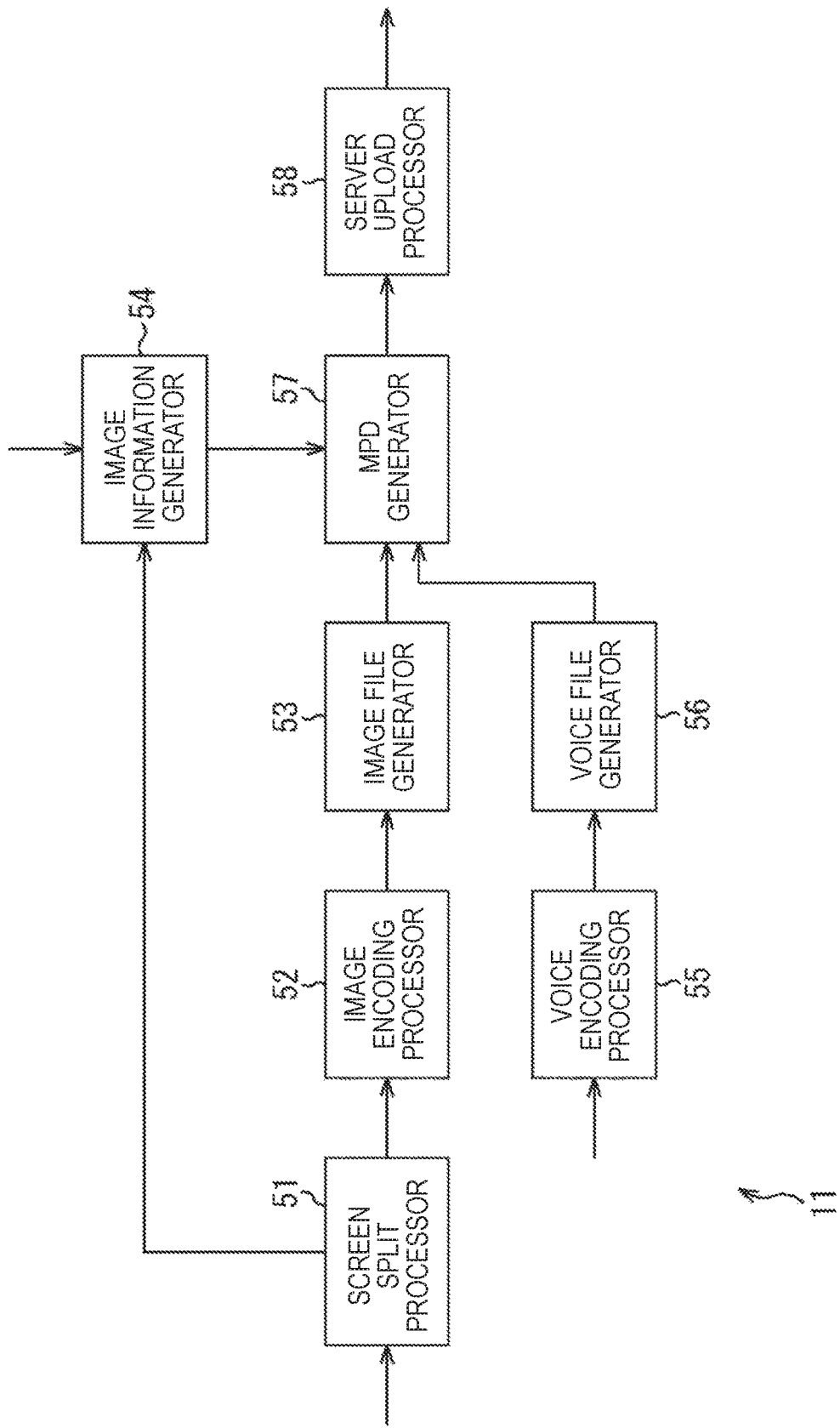
FIG. 11 is a block diagram illustrating an exemplary configuration of a file generation device.

FIG. 11 is a block diagram illustrating an exemplary configuration of the file generation device 11 shown in FIG. 1.

The file generation device 11 shown in FIG. 11 is configured to include a screen split processor 51, an image encoding processor 52, an image file generator 53, an image information generator 54, a voice encoding processor 55, a voice file generator 56, an MPD generator 57, and a server upload processor 58.

The screen split processor 51 of the file generation device 11 splits image data of video content inputted from the outside into tile units. The screen split processor 51 supplies the image information generator 54 with the tile position information. The screen split processor 51 supplies the image encoding processor 52 with the image data configured in units of tiles.

The image encoding processor 52 encodes the image data, which is configured in tile units and is supplied from the screen split processor 51, for each tile to generate a video stream. The image encoding processor 52 supplies the image file generator 53 with the video stream of each tile.

The image file generator 53 processes the video stream of each tile supplied from the image encoding processor 52 into a file format in units of segments and supplies the MPD generator 57 with the resulting image file of each tile.

The image information generator 54 supplies the MPD generator 57 with the tile position information supplied from the image split processor 51 and with the image frame size information inputted from the outside.

The voice encoding processor 55 encodes voice data, which is configured in units of objects of video content inputted from the outside, for each object, and generates an audio stream. The voice encoding processor 55 encodes the object position information of each object inputted from the outside and the audio metadata that contains the object ID to generate encoded data. The voice encoding processor 55 supplies the voice file generator 56 with the audio stream of each object and the encoded data of the audio metadata.

The voice file generator 56 functions as a voice file generator. The voice file generator 56 processes the audio stream of each object supplied from the voice encoding processor 55 into a file format in units of segments and supplies the MPD generator 57 with the resulting voice file of each object.

The voice file generator 56 functions as a metafile generator. The voice file generator 56 processes the encoded data, which is obtained by encoding the audio metadata, supplied from the voice encoding processor 55 into a file format in units of segments, and supplies the MPD generator 57 with the resulting voice metafile.

The MPD generator 57 determines a URL or other reference of the Web server 12 for storing the image file of each tile supplied from the image file generator 53. The MPD generator 57 determines a URL or other reference of the Web server 12 for storing the voice file of each tile and the voice metafile, which are supplied from the voice file generator 56.

The MPD generator 57 arranges the image information supplied from the image information generator 54 in "AdaptationSet" for image of the MPD file. The MPD generator 57 arranges the image frame size information among the image information in "AdaptationSet" for voice of the MPD file. The MPD generator 57 arranges a URL or other reference of the image file of each tile in "Segment" of "Representation" for image file of the tile.

The MPD generator 57 arranges the URL or other reference of the image file of each object in "Segment" of "Representation" for voice file of the object. The MPD generator 57 functions as an information generator. The MPD generator 57 arranges a URL or other reference as information for specifying a voice metallic in "Segment" of "Representation" for voice metafile. The MPD generator 57 supplies the server upload processor 58 with the MPD file in which various types of information are arranged as described above, the image file, the voice file, and the voice metafile.

The server upload processor 58 uploads the image file of each tile, the voice file of each object, the voice metafile, and the MPD file, which are supplied from the MPD generator 57, to the Web server 12.

(Illustration of Processing by File Generation Device)

Figure 12:
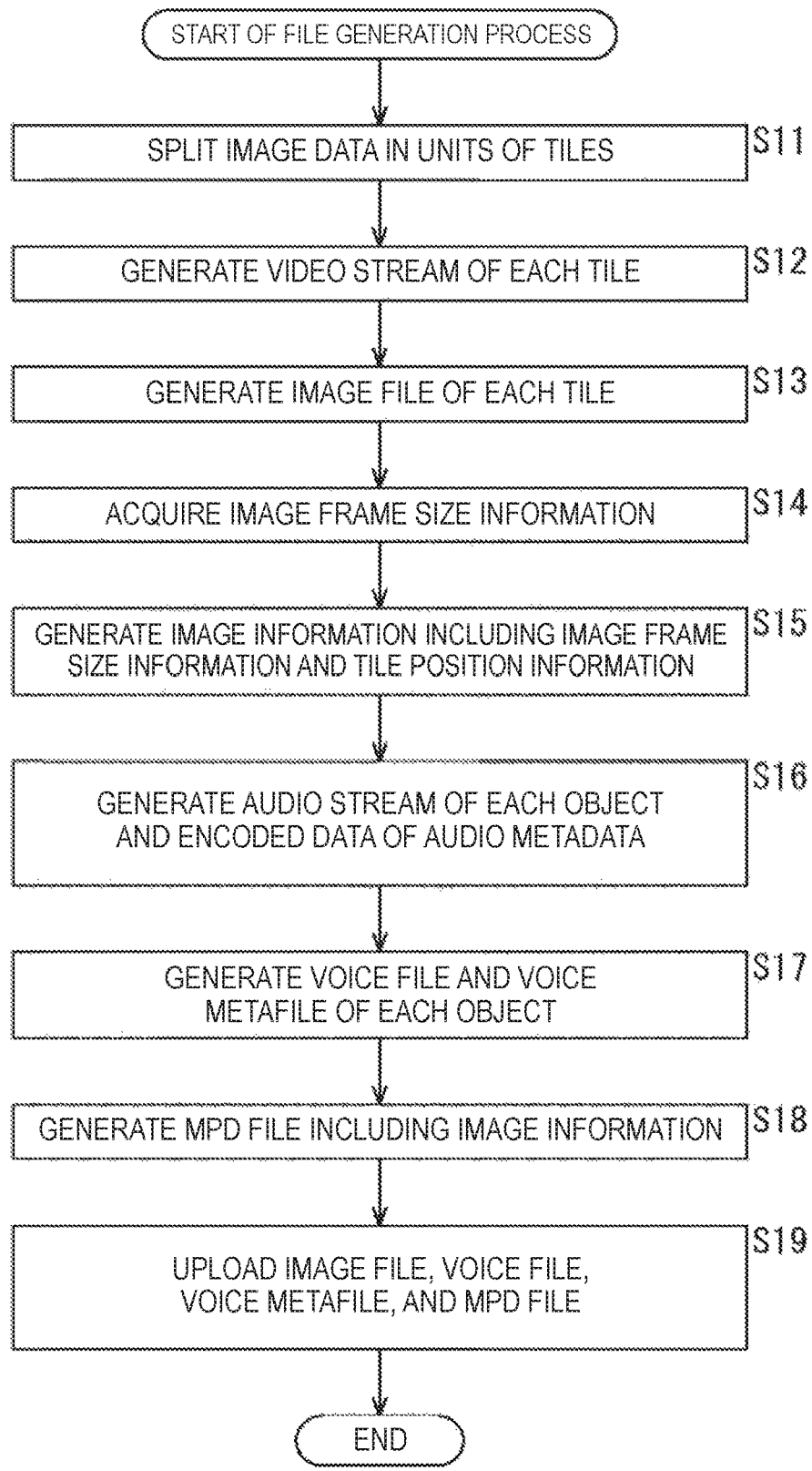
FIG. 12 is a flowchart illustrated to describe a file generation process performed by the file generation device.

FIG. 12 is a flowchart illustrated to describe a file generation process to be performed by the file generation device 11 shown in FIG. 11.

In step S11 of FIG. 12, the screen split processor 51 of the file generation device 11 splits image data of video content inputted from the outside into tile units. The screen split processor 51 supplies the image information generator 54 with the tile position information. The screen split processor 51 supplies the image encoding processor 52 with the image data configured in units of tiles.

In step S12, the image encoding processor 52 encodes the image data, which is configured in tile units and is supplied from the screen split processor 51, for each tile to generate a video stream of each tile. The image encoding processor 52 supplies the image file generator 53 with the video stream of each tile In step S13, the image file generator 53 processes the video stream of each tile supplied from the image encoding processor 52 into a file format in units of segments to generate an image file of each tile. The image file generator 53 supplies the MPD generator 57 with the image file of each tile.

In step S14, the image information generator 54 acquires the image frame size information from the outside. In step S15, the image information generator 54 generates image information that contains the tile position information supplied from the image split processor 51 and the image frame size information, and supplies the MPD generator 57 with the generated image information.

In step S16, the voice encoding processor 55 encodes voice data, which is configured in units of objects of video content inputted from the outside, for each object, and generates an audio stream of each object. The voice encoding processor 55 encodes the object position information of each object inputted from the outside and the audio metadata that contains the object ID to generate encoded data. The voice encoding processor 55 supplies the voice file generator 56 with the audio stream of each object and the encoded data of the audio metadata.

In step S17, the voice file generator 56 processes the audio stream of each object supplied from the voice encoding processor 55 into a file format in units of segments to generate a voice file of each object. The voice file generator 56 processes the encoded data, which is obtained by encoding the audio metadata supplied from the voice encoding processor 55 into a file format in units of segments to generate a voice metafile. The voice file generator 56 supplies the MPD generator 57 with the voice file of each object and the voice metafile.

In step S18, the MPD generator 57 generates an MPD file that contains the image information supplied from the image information generator 54, the URL of each file, or other information. The MPD generator 57 supplies the server upload processor 58 with the MPD file, the image file of each tile, the voice file of each object, and the voice metafile.

In step S19, the server upload processor 58 uploads the image file of each tile, the voice file of each object, the voice metafile, and the MPD file, which are supplied from the MPD generator 57, to the Web server 12. Then, the process is terminated.

(Exemplary Functional Configuration of Video Playback Terminal)

Figure 13:
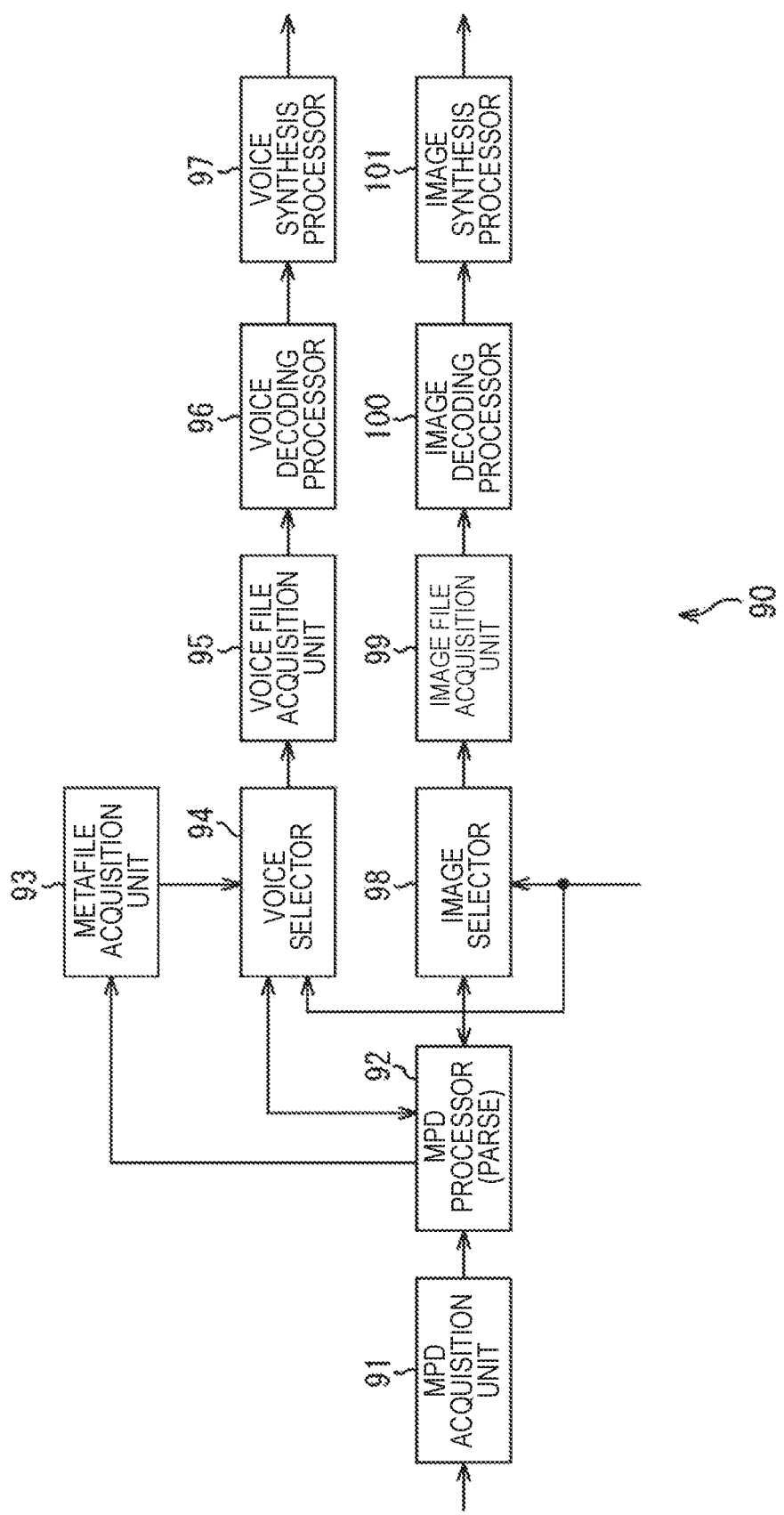
FIG. 13 is a block diagram illustrating an exemplary configuration of a streaming playback section.

FIG. 13 is a block diagram illustrating an exemplary configuration of a streaming playback section implemented by the execution of the control software 21, the video playback software 22, and the access software 23 in the video playback terminal 14 shown in FIG. 1.

The streaming playback section 90 shown in FIG. 13 is configured to include an MPD acquisition unit 91, an MPD processor 92, a metafile acquisition unit 93, a voice selector 94, a voice file acquisition unit 95, a voice decoding processor 96, a voice synthesis processor 97, an image selector 98, an image file acquisition unit 99, an image decoding processor 100, and an image synthesis processor 101.

The MPD acquisition unit 91 of the streaming playback section 90 functions as a receiver. The MPD acquisition unit 91 acquires an MPD file from the Web server 12 and supplies the MPD processor 92 with the acquired MPD file.

The MPD processor 92 extracts information such as a URL, which is described in "Segment" for voice metafile, from the MPD file supplied from the MPD acquisition unit 91, and supplies the metafile acquisition unit 93 with the extracted information. The MPD processor 92 extracts image frame size information, which is described in "AdaptationSet" for image, from the MPD file, and supplies the voice selector 94 with the extracted information. The MPD processor 92 extracts information such as a URL, which is described in "Segment" for voice file of the object requested from the voice selector 94, from the MPD file. Then, the MPD processor 92 supplies the voice selector 94 with the extracted information.

The MPD processor 92 extracts the tile position information described in "AdaptationSet" for image from the MPD file and supplies the image selector 98 with the extracted information. The MPD processor 92 extracts information such as a URL, which is described in "Segment" for image file of the tile requested from the image selector 98, from the MPD file. Then, the MPD processor 92 supplies the image selector 98 with the extracted information.

The metafile acquisition unit 93 requests a voice metafile from the Web server 12 based on the information supplied from the MPD processor 92. The voice metafile to be requested is specified in a URL among the information supplied from the MPD processor 92. Then, the metafile acquisition unit 93 acquires the voice metafile. The metafile acquisition unit 93 supplies the voice selector 94 with object position information contained in the voice metafile.

The voice selector 94 functions as a position determination unit. The voice selector 94 calculates a position of each object on the image, based on the image frame size information supplied from the MPD processor 92 and the object position information supplied from the metafile acquisition unit 93. The voice selector 94 selects an object in the display area specified by the user based on the position of each object on the image. The voice selector 94 requests information such as a URL of the voice file of the selected object from the MPD processor 92. The voice selector 94 supplies the voice file acquisition unit 95 with the information such as a URL supplied from the MPD processor 92 in response to the request.

The voice file acquisition unit 95 functions as a receiver. The voice file acquisition unit 95 requests a voice file in units of objects from the Web server 12 based on the information supplied from the voice selector 94. The voice file in units of objects to be requested is specified in a URI, among the information supplied from the voice selector 94. Then, the voice file acquisition unit 95 acquires the voice file in units of objects, and supplies the voice decoding processor 96 with the acquired voice file in units of objects.

The voice decoding processor 96 decodes an audio stream contained in the voice file in units of object supplied from the voice file acquisition unit 95 to generate voice data in units of objects. The voice decoding processor 96 supplies the voice synthesis processor 97 with the voice data in units of objects.

The voice synthesis processor 97 synthesizes the voice data in units of objects supplied from the voice decoding processor 96 and outputs the synthesized data.

The image selector 98 selects a tile in the display area specified by the user based on the tile position information supplied from the MPD processor 92. The image selector 98 requests information such as a URL for the image file of the selected tile from the MPD processor 92. The image selector 98 supplies the image file acquisition unit 99 with the information such as a URL supplied from the MPD processor 92 in response to the request.

The image file acquisition unit 99 requests an image file in units of tiles from the Web server 12 based on the information supplied from the image selector 98. The image file in units of tiles to be requested is specified in a URL among the information supplied from the image selector 98, Then, the image file acquisition unit 99 acquires the image file in units of tiles, and supplies the image decoding processor 100 with the acquired image file in units of tiles.

The image decoding processor 100 decodes a video stream contained in the image file in units of tiles supplied from the image file acquisition unit 99 to generate image data in units of tiles. The image decoding processor 100 supplies the image synthesis processor 101 with the image data in units of tiles.

The image synthesis processor 101 synthesizes the image data in units of tiles supplied from the image decoding processor 100 and outputs the synthesized data.

(Illustration of Processing by Video Playback Terminal)

Figure 14:
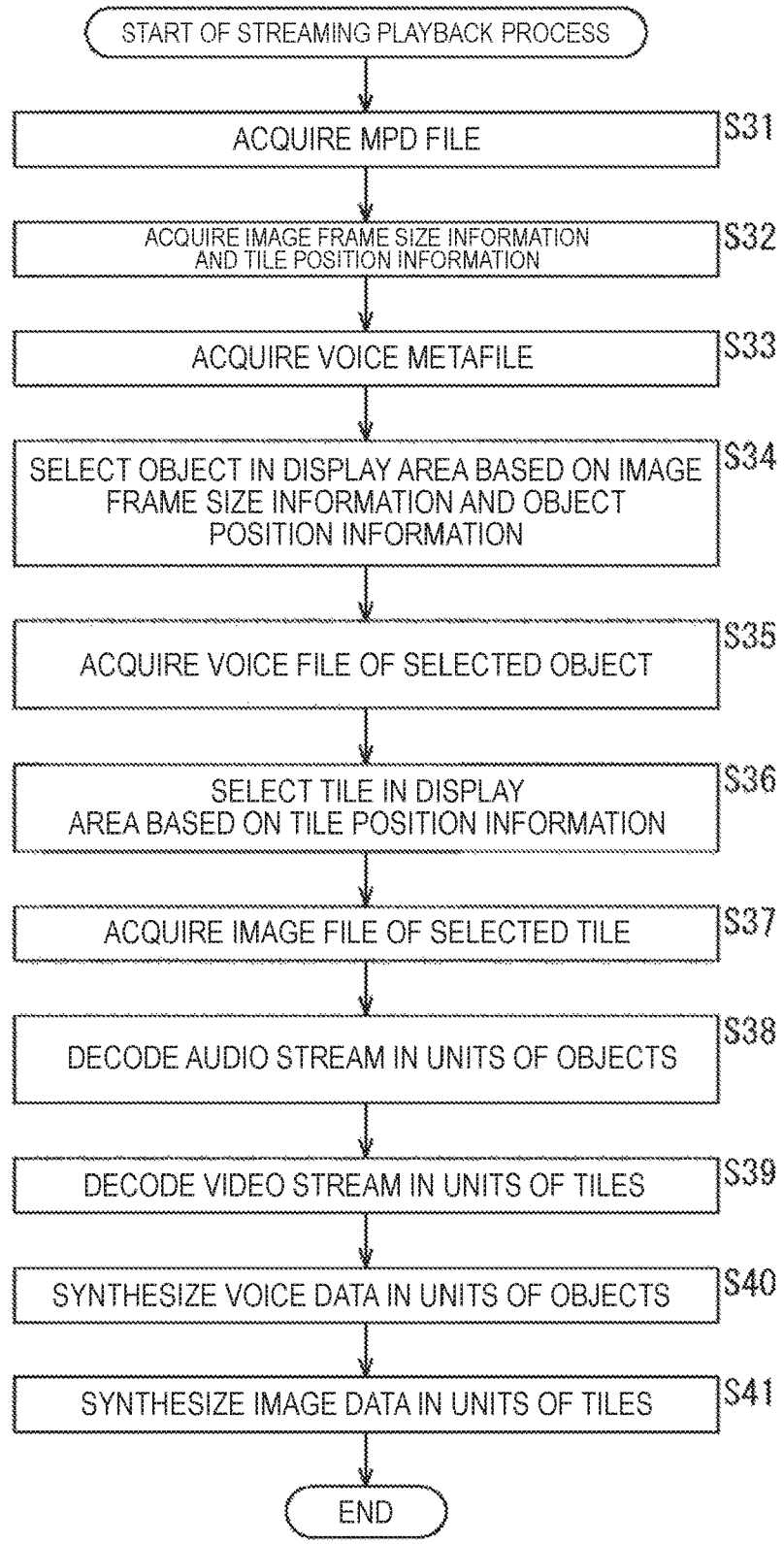
FIG. 14 is a flowchart illustrated to describe a streaming playback process performed by the streaming playback section.

FIG. 14 is a flowchart illustrated to describe a streaming playback process by the streaming playback section 90 (see FIG. 13) of the video playback terminal 14.

In step S31 of FIG. 14, the MPD acquisition unit 91 of the streaming playback section 90 acquires the MPD file from the Web server 12 and supplies the MPD processor 92 with the acquired MPD file.

In step S32, the MPD processor 92 acquires the image frame size information and the tile position information, which are described in "AdaptationSet" for image, from the MPD file supplied from the MPD acquisition unit 91. The MPD processor 92 supplies the voice selector 94 with the image frame size information and supplies the image selector 98 with the tile position information. The MPD processor 92 extracts information such as a URL described in "Segment" for voice metafile and supplies the metafile acquisition unit 93 with the extracted information.

In step S33, the metafile acquisition unit 93 requests a voice metafile from the Web server 12 based on the information supplied from the MPD processor 92. The voice metafile to be requested is specified in a URL among the information supplied from the MPD processor 92. Then, the metallic acquisition unit 93 acquires the voice metafile. The metafile acquisition unit 93 supplies the voice selector 94 with object position information contained in the voice metafile.

In step S34, the voice selector 94 selects an object in the display area specified by the user, based on the image frame size information supplied from the MPD processor 92 and the object position information supplied from the metafile acquisition unit 93. The voice selector 94 requests the information such as a URL for the voice file of the selected object from the MPD processor 92.

The MPD processor 92 extracts information such as a URL, which is described in "Segment" for voice file of the object requested from the voice selector 94, from the MPD file. Then, the MPD processor 92 supplies the voice selector 94 with the extracted information. The voice selector 94 supplies the voice file acquisition unit 95 with the information such as a URL supplied from the MPD processor 92.

In step S35, the voice file acquisition unit 95 requests and acquires, based on the information such as a URL supplied from the voice selector 94, a voice tile of the selected object specified in the URL from the Web server 12. Then, the voice file acquisition unit 95 supplies the voice decoding processor 96 with the acquired voice file in units of objects.

In step S36, the image selector 98 selects utile in the display area specified by the user based on the file position information supplied from the MPD processor 92. The image selector 98 requests information such as a URL for the image file of the selected tile from the MPD processor 92.

The MPD processor 92 extracts information such as a URL, which is described in "Segment" for image file of the object requested from the image selector 98, from the MPD file, and the MPD processor 92 supplies the image selector 98 with the extracted information. The image selector 98 supplies the image file acquisition unit 99 with the information such as a URL supplied from the MPD processor 92.

In step S37, the image file acquisition unit 99 requests an image file in units of tiles from the Web server 12 based on the information supplied from the image selector 98. The image file in selected tiles to be requested is specified in a URL among the information supplied from the image selector 98. Then, the image file acquisition unit 99 acquires the image file in units of tiles, and supplies the image decoding processor 100 with the acquired image file in units of tiles.

In step S38, the voice decoding processor 96 decodes an audio stream contained in the voice file in units of object supplied from the voice file acquisition unit 95 to generate voice data in units of objects. The voice decoding processor 96 supplies the voice synthesis processor 97 with the voice data in units of objects.

In step S39, the image decoding processor 100 decodes a video stream contained in the image file in units of tiles supplied from the image tile acquisition unit 99 to generate image data in units of tiles. The image decoding processor 100 supplies the image synthesis processor 101 with the image data in units of tiles.

In step S40, the voice synthesis processor 97 synthesizes the voice data in units of objects supplied from the voice decoding processor 96 and outputs the synthesized data. In step S41, the image synthesis processor 101 synthesizes the image data in units of tiles supplied from the image decoding processor 100 and outputs the synthesized data. Then, the process is terminated.

As described above, the Web server 12 transmits the image frame size information and the object position information. Thus, the video playback terminal 14 can specify an object in the display area to acquire selectively a voice file of the specified object so that the voice file corresponds to the image in the display area. This allows the video playback terminal 14 to acquire only a necessary voice file, which leads to the improvement of transmission efficiency.

Figure 15:
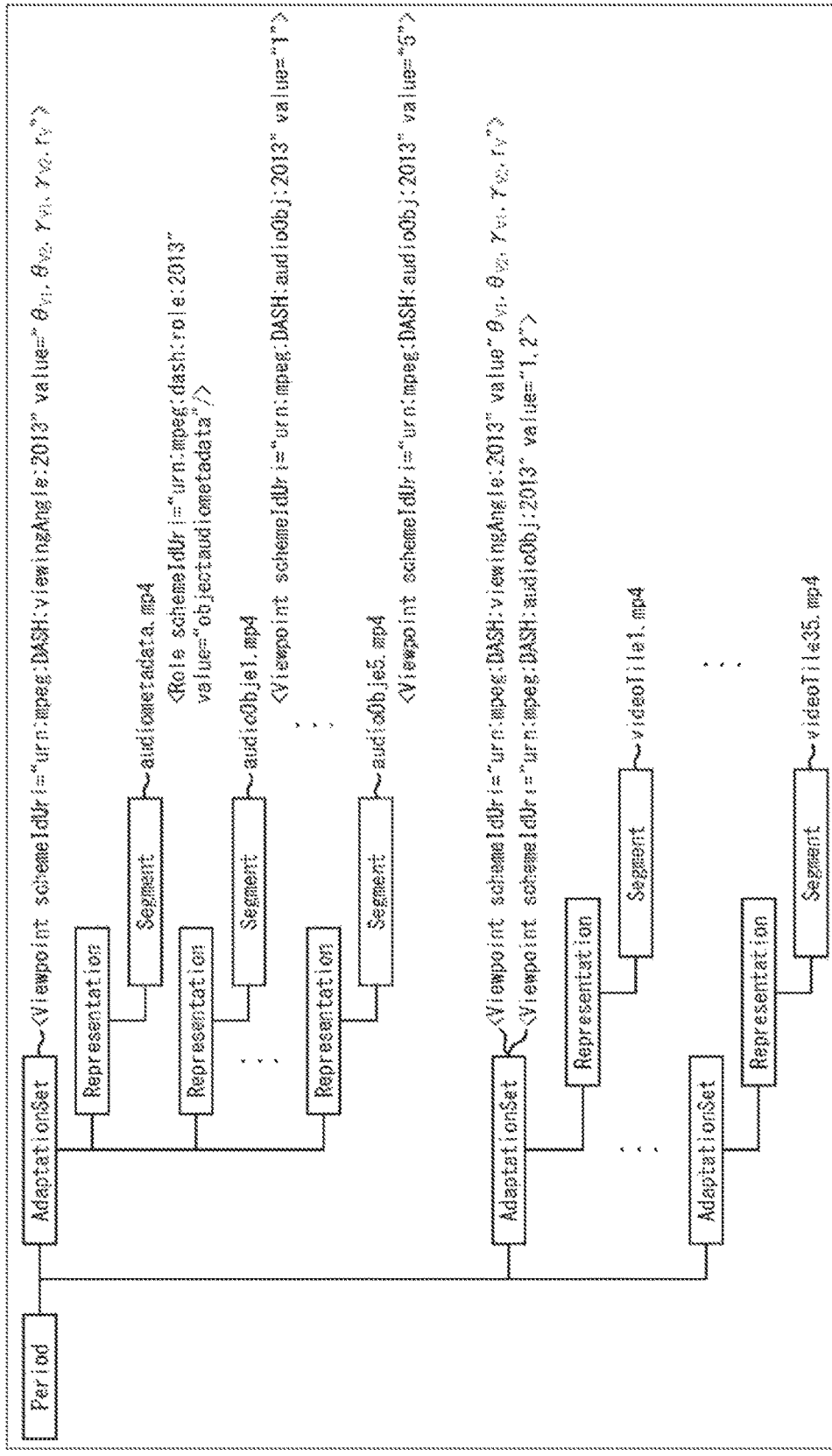
FIG. 15 is a diagram illustrated to describe another exemplary description of MPD file.

As shown in FIG. 15, an object ID (object specifying information) be described in "AdaptationSet" for an image of the MPD file. This object ID may be used as information for specifying an object corresponding to the voice that is intended to be played back simultaneously with the image of the MPD file. The object ID may be described by extending Scheme (urn:mpeg:DASH:audioObj:2013) for defining new object ID information (audioObj) by utilizing a Descriptor-Type element of Viewpoint. In this case, the video playback terminal 14 selects a voice file of the object corresponding to the object ID described in "AdaptationSet" for image, and acquires the voice file for playback.

The encoded data of all objects may be multiplexed into a single audio stream, rather than the generation of voice file in units of objects, to generate a single voice file.

Figure 16:
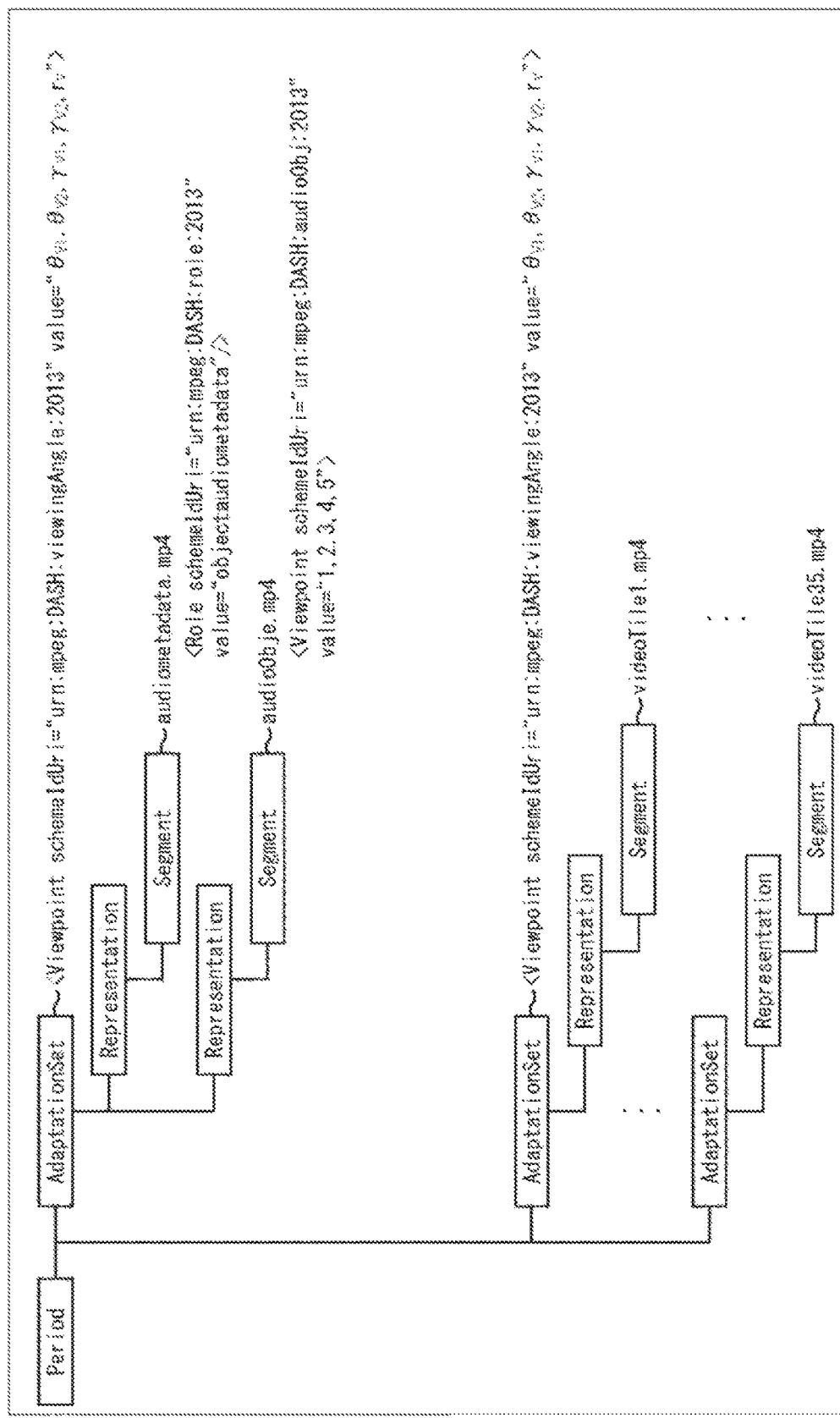
FIG. 16 is a diagram illustrated to describe still another exemplary description of MPD file.

In this case, as shown in FIG. 16, one "Representation" for voice file is provided in "AdaptationSet" for voice of the MPD file, and a URL or other reference for the voice file (audioObje.mp4) that contains the encoded data of all objects is described in "Segment". At this time, object IDs (1, 2, 3, 4, and 5) of all objects corresponding to the voice file are described by extending Viewpoint.

Figure 17:
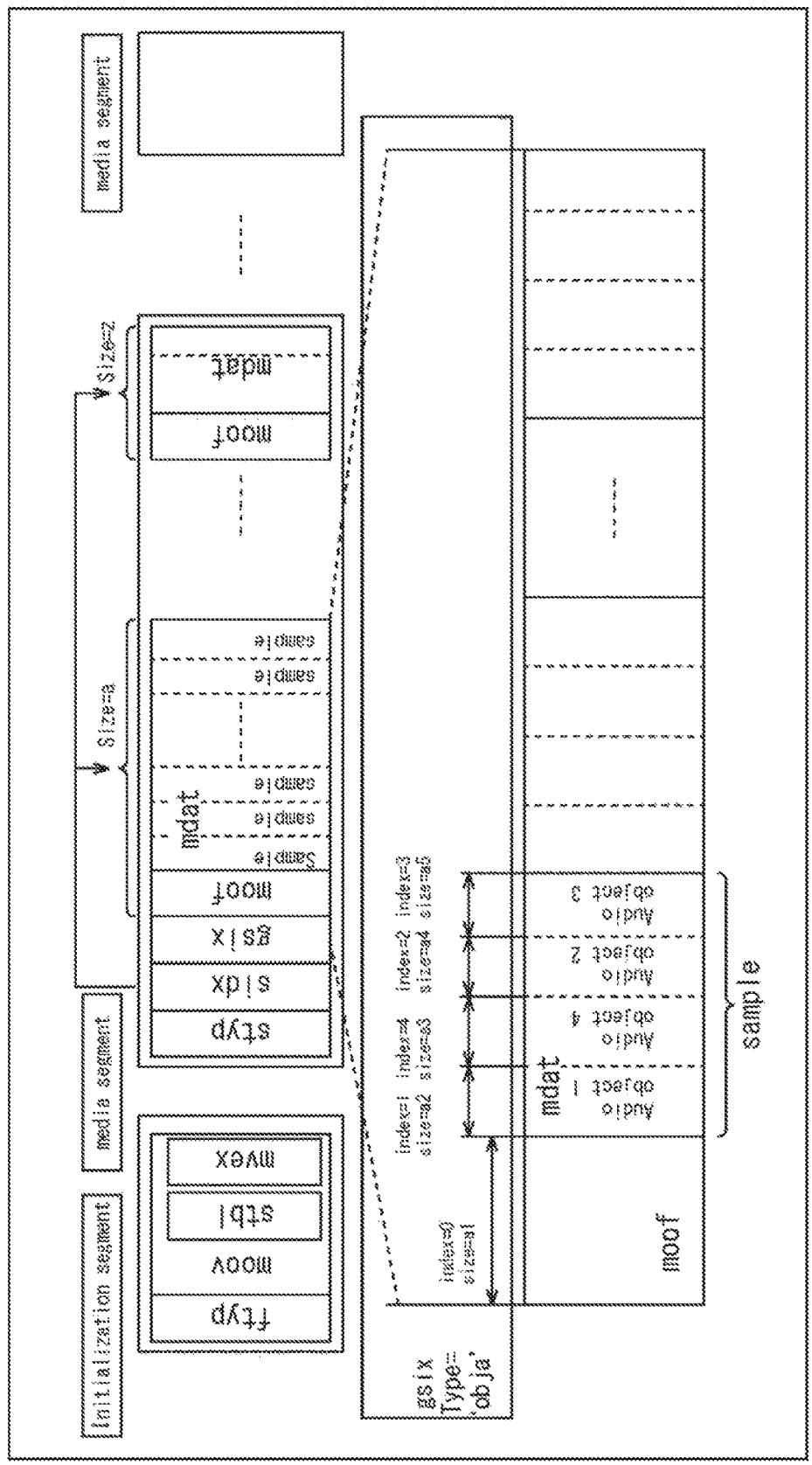
FIG. 17 is a diagram illustrating an arrangement example of an audio stream.

In addition, in this case, as shown in FIG. 17, the encoded data (Audio object) of each object is arranged, as a subsample, in an "mdat" box of the voice file (hereinafter, also referred to as voice media file, as appropriate acquired by referring to "Media Segment" of the MPD file.

Specifically, data is arranged in the voice media file in units of subsegments that are any time shorter than a segment. The position of data in units of subsegments is specified by a "sidx" box. The data in units of subsegments is composed of moof and mdat boxes. The mdat box is composed of a plurality of samples, and the encoded data of each object as each subsample of the sample is arranged.

A gsiz box in which information on sample is described is placed next to the sidx box of the voice media file. In this way, the gsiz box in which the information on sample is provided separately from the moof box, and thus the video playback terminal 14 can acquire the information on sample in a short time.

A grouping_type for indicating the types of Sample group entry composed of one or more samples or subsamples managed by the gsix box is described in the gsix box, as shown in FIG. 18. For example, when the Sample group entry is a subsample of the encoded data in units of objects, the type of the Sample group entry is "obja". The gsix box of a plurality of grouping_type is arranged in the voice media file, as shown in FIG. 17.

As shown in FIG. 18, an index (entry_index) of each Sample group entry and a byte range as data position information indicating the position in the voice media file are described in the gsix box. When the index (entry_index) is zero, the corresponding byte range indicates a byte range of the moof box (a1 in the example of FIG. 17).

Information indicating which object is used for allowing each Sample group entry to corresponds to a subsample of the encoded data obtained by encoding the object is described in the voice file acquired by referring to "Initialization Segment" of the MPD file (hereinafter, also referred to as voice initialization file, as appropriate).

Figure 19:
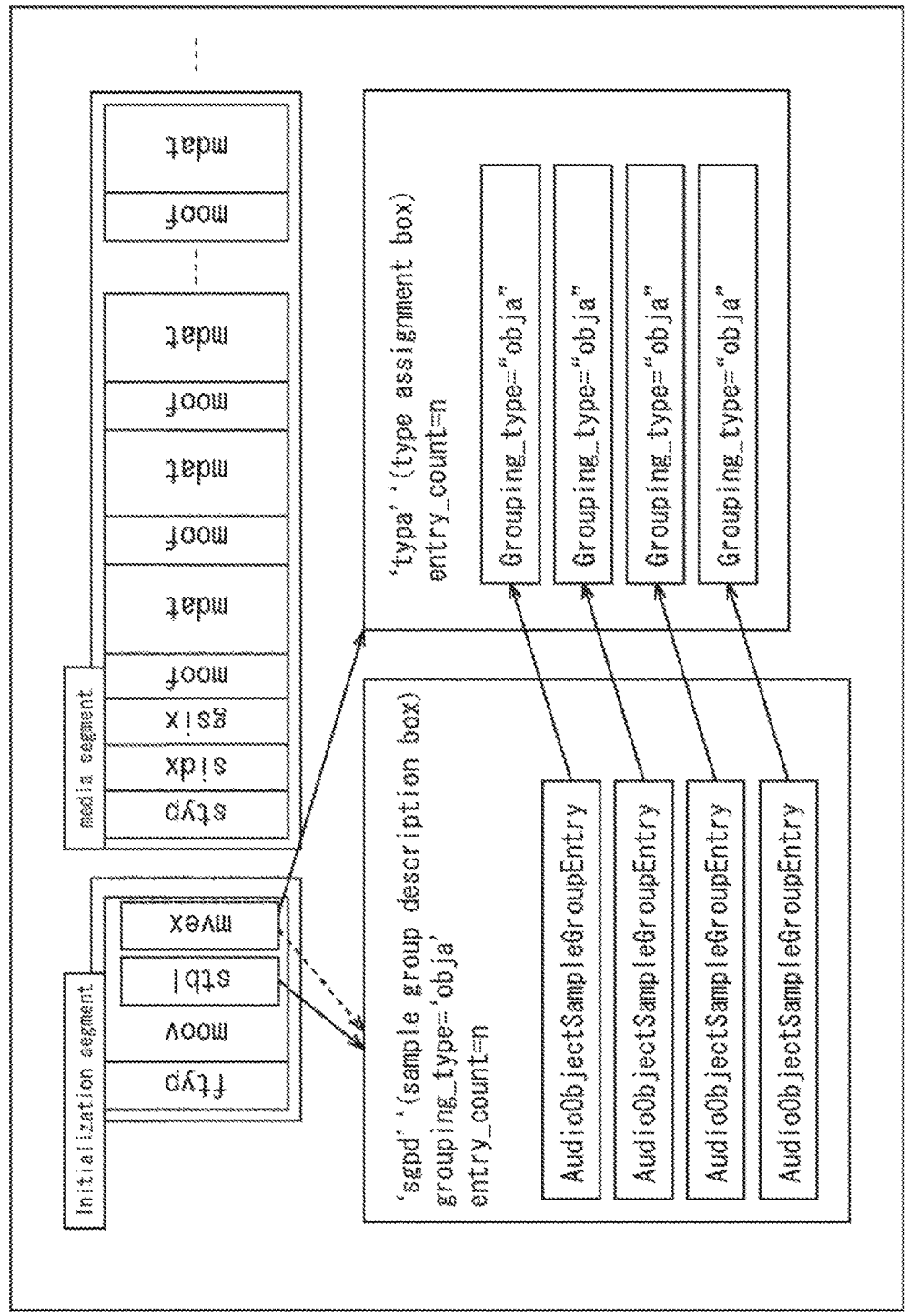
FIG. 19 is a diagram illustrating an example of information indicating an association relationship between Sample group entry and object ID.

Specifically, as shown in FIG. 19, this information is indicated by using a type assignment box (typa), which is associated with AudioObjectSampleGroupEntry of a sample group description box (sgpd) in a sbtl box of the voice initialization file.

Figure 20:
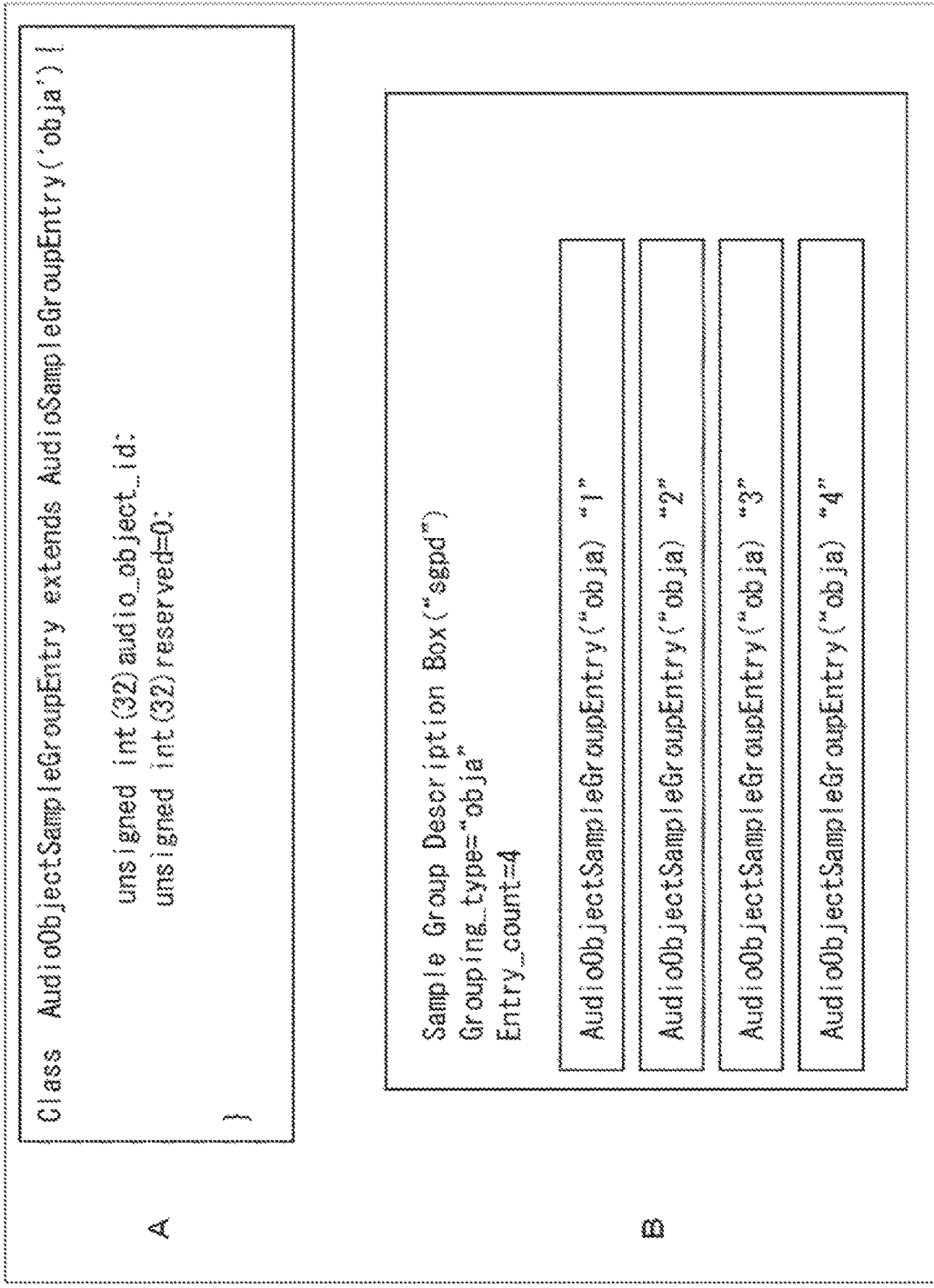
FIG. 20 is a diagram illustrating an exemplary description of AudioObjectSampleGroupEntry.

In other words, as shown in the portion A of FIG. 20, an object ID (audio_object_id) corresponding to the encoded data contained in the sample is described in each AudioObjectSampleGroupEntry box. As shown in the portion B of FIG. 20, an object ID such as, for example, 1, 2, 3, and 4 is described in each of four AudioObjectSampleGroupEntry boxes.

On the other hand, as shown in FIG. 21, in the type assignment box, an index as a parameter (grouping_type_parameter) of the Sample group entry corresponding to the AudioObjectSampleGroupEntry is described in each AudioObjectSampleGroupEntry.

The voice media file and the voice initialization file are configured as described above. Thus, when the video playback terminal 14 acquires the encoded data of the object selected as an object in the display area, the AudioObjectSampleGroupEntry in which the object ID of the selected object is described is retrieved from the stbl box of the voice initialization file. Then, an index of the Sample group entry corresponding to the retrieved AudioObjectSampleGroupEntry is read from the mvex box. The position of data in units of subsegments is read from the sidx box of the voice file, and the byte range of the Sample group entry of the read index is read from the gsix box. The encoded data arranged in the mdat box is acquired based on the position of data in units of subsegments and the byte range. This allows encoded data of the selected object to be acquired.

Although, in the description mentioned above, the index of Sample group entry and the object ID of AudioObjectSampleGroupEntry are associated with each other through the mvex box, they can be associated with each other directly. When they are associated with each other directly, the index of Sample group entry is described in the AudioObjectSampleGroupEntry.

When the voice file is composed of a plurality of tracks, the sgpd box can be stored in the mvex box, which allows the sgpd box to be shared among tracks.

Second Embodiment (Overview of Second Embodiment)

Figure 22:
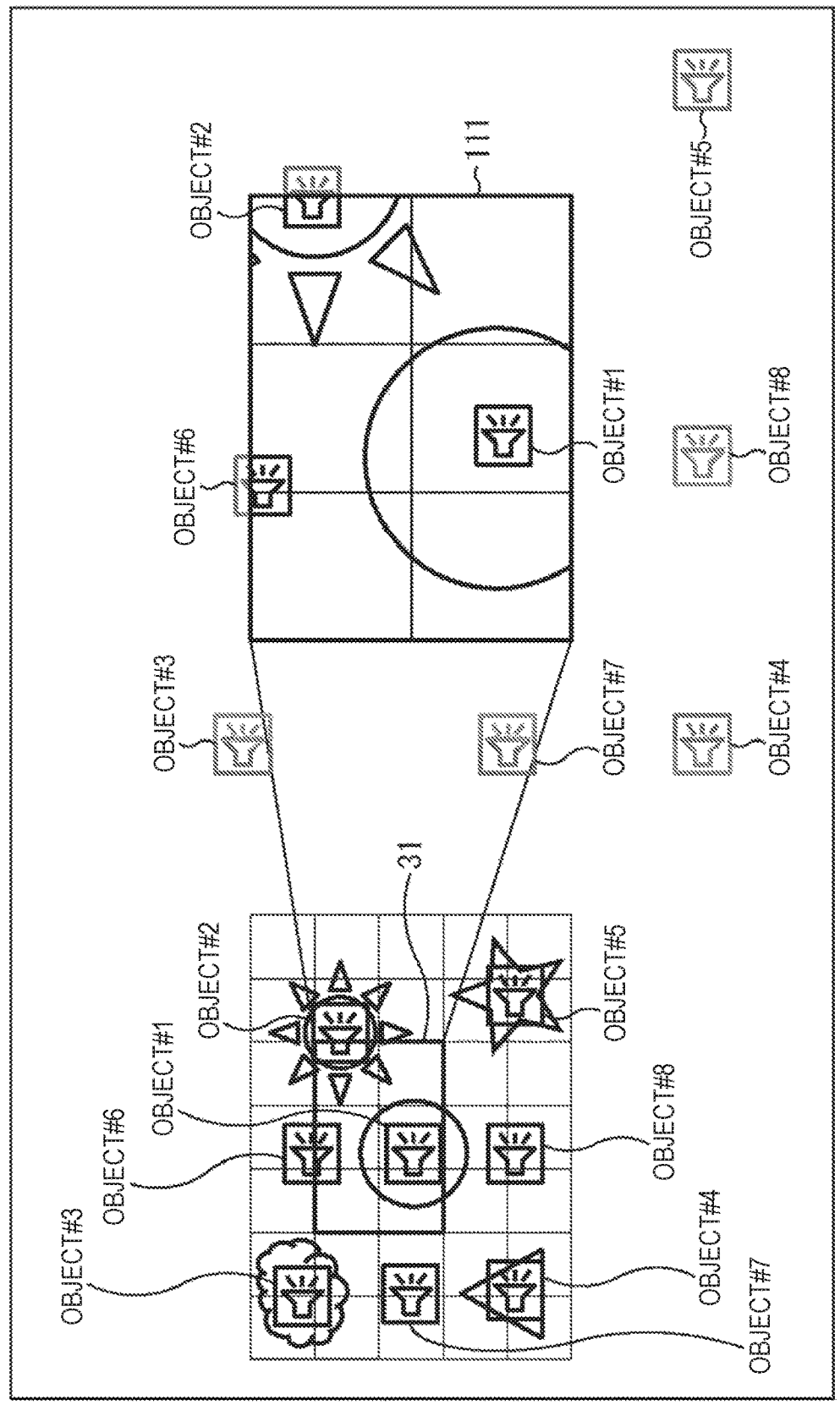
FIG. 22 is a diagram illustrated to describe an overview of a second embodiment of the information processing system to which the present disclosure is applied.

FIG. 22 is a diagram illustrated to describe an overview of a second embodiment of the information processing system to which the present disclosure is applied.

In FIG. 22, the same elements as those shown in FIG. 3 are denoted with the same reference signs.

In the example shown in FIG. 22, as is the case with FIG. 3, the image of video content is partitioned into 7 (width)×5 (height) tiles, and voices of objects #1 to #8 are acquired as a voice of video content.

In this case, when the user specifies the display area 31 composed of 3 (width)×2 (height) tiles, the display area 31 is converted (extended) to an area having the same size as the size of the image of video content, resulting in a display image #11 in the second embodiment as shown in FIG. 22. The voices of the objects #1 to #8 are synthesized based on the positions of the objects #1 to #8 in the display image 111 and are outputted along with the display image 111. In other words, voices of the objects #3 to #5, #7, and #8, which are outside the display area 31, are outputted, in addition to the voices of the objects #1, #2, and #6, which are inside the display area 31.

(Exemplary Configuration of Streaming Playback Section)

The configuration of the second embodiment of the information processing system to which the present disclosure is applied is the same as the configuration of the information processing system 10 shown in FIG. 1 except for the configuration of the streaming playback section, and thus the following description will be given only of the streaming playback section.

Figure 23:
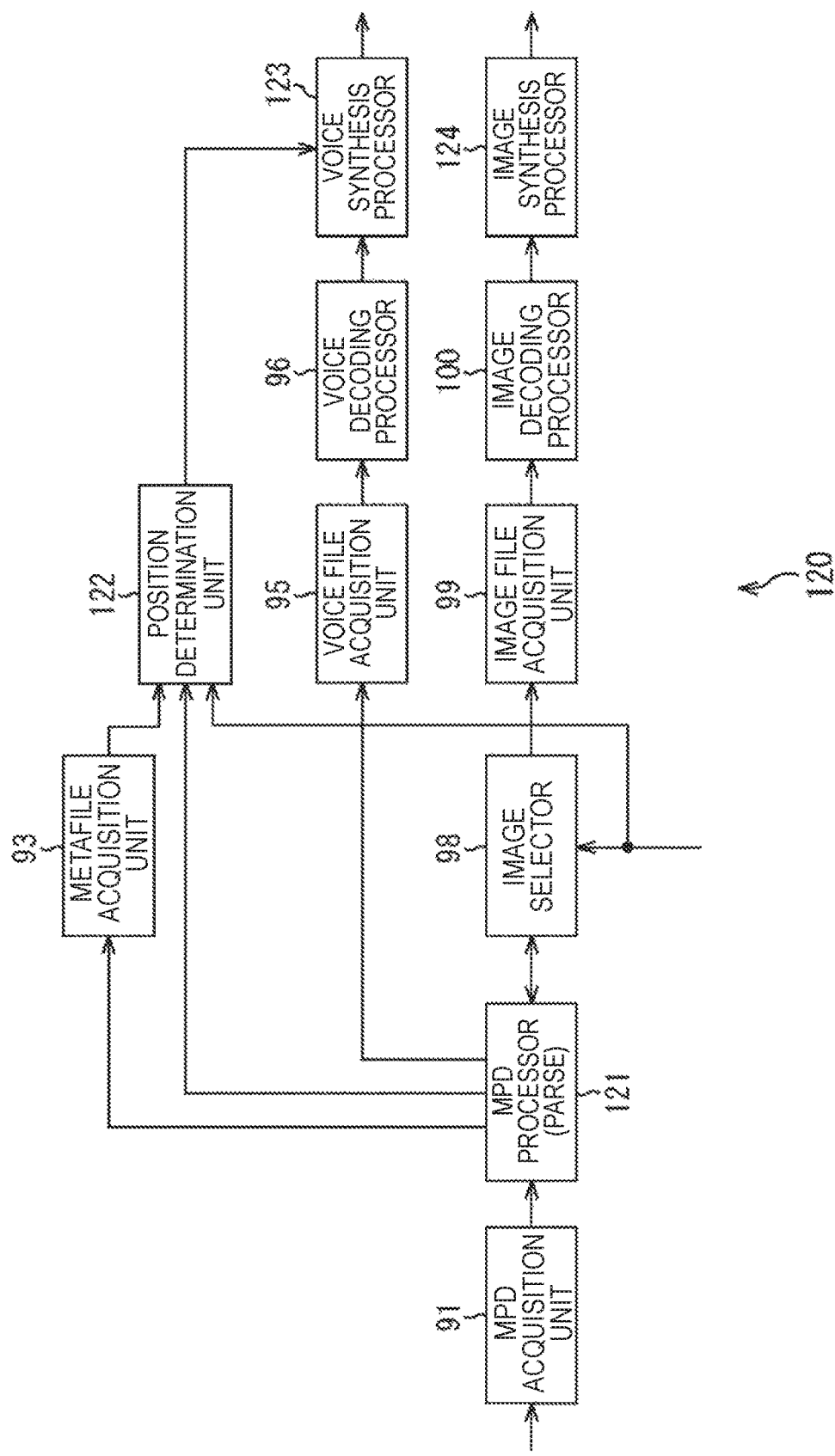
FIG. 23 is a block diagram illustrating an exemplary configuration of a streaming playback section of the information processing system to which the present disclosure is applied.

FIG. 23 is a block diagram illustrating an exemplary configuration of the streaming playback section of the information processing system to which the present disclosure is applied.

In FIG. 23, the same configurations as those shown in FIG. 13 are denoted with the same reference signs, and repeated description is omitted as appropriate.

A streaming playback section 120 shown in FIG. 23 is provided with an MPD processor 121, a voice synthesis processor 123, and an image synthesis processor 124 instead of the MPD processor 92, the voice synthesis processor 97, and the image synthesis processor 101, respectively, and the streaming playback section 120 is configured to further include a position determination unit 122, which is different from the streaming playback section 90 shown in FIG. 13.

The MPD processor 121 of the streaming playback section 120 extracts information such as a URL, which is described in "Segment" for voice metafile, from the MPD file supplied from the MPD acquisition unit 91, and supplies the metafile acquisition unit 93 with the extracted information. The MPD processor 121 extracts image frame size information of an image of the video content (hereinafter, referred to as content image frame size information) that is described in "AdaptationSet" for image from the MPD file and supplies the position determination unit 122 with the extracted information. The MPD processor 121 extracts information such as a URL, which is described in "Segment" for voice file of all objects, from the MPD file, and supplies the voice file acquisition unit 95 with the extracted information.

The MPD processor 121 extracts the tile position information described in "AdaptationSet" for image from the MPD file and supplies the image selector 98 with the extracted information. The MPD processor 121 extracts information such as a URL, which is described in "Segment" for image file of the tile requested from the image selector 98, from the MPD file. Then, the MPD processor 121 supplies the image selector 98 with the extracted information.

The position determination unit 122 acquires object position information that is contained in the voice metafile obtained by the metafile acquisition unit 93 and the content image frame size information that is supplied from the MPD processor 121. The position determination unit 122 acquires display area image frame size information that is the image frame size information of the display area specified by the user. The position determination unit 122 determines (recognizes) the position of objects in the display area, based on the object position information, the content image frame size information, and the display area image frame size information. The position determination unit 122 supplies the voice synthesis processor 123 with the determined position of the object.

The voice synthesis processor 123 synthesizes voice data in units of objects supplied from the voice decoding processor 96 based on the object position supplied from the position determination unit 122. Specifically, the voice synthesis processor 123 determines voice data to be assigned to each speaker for each object based on the object position and the position of each speaker that outputs sound. The voice synthesis processor 123 synthesizes voice data of each object for each speaker and outputs the synthesized voice data as voice data for each speaker. A detailed description of the method of synthesizing voice data of each object based on the object position is disclosed, for example, in Ville Pulkki: "Virtual Sound Source Positioning Using Vector Base Amplitude Panning", Journal of AES, vol. 45, no. 6, pp. 456-466, 1997.

The image synthesis processor 124 synthesizes image data in units of tiles supplied from the image decoding processor 100. The image synthesis processor 124 functions as a converter. The image synthesis processor 124 converts the size of the image corresponding to the synthesized image data to the size of the video content to generate a display image. The image synthesis processor 124 outputs the display image.

(Illustration of Method of Determining Position of Object)

Figure 24:
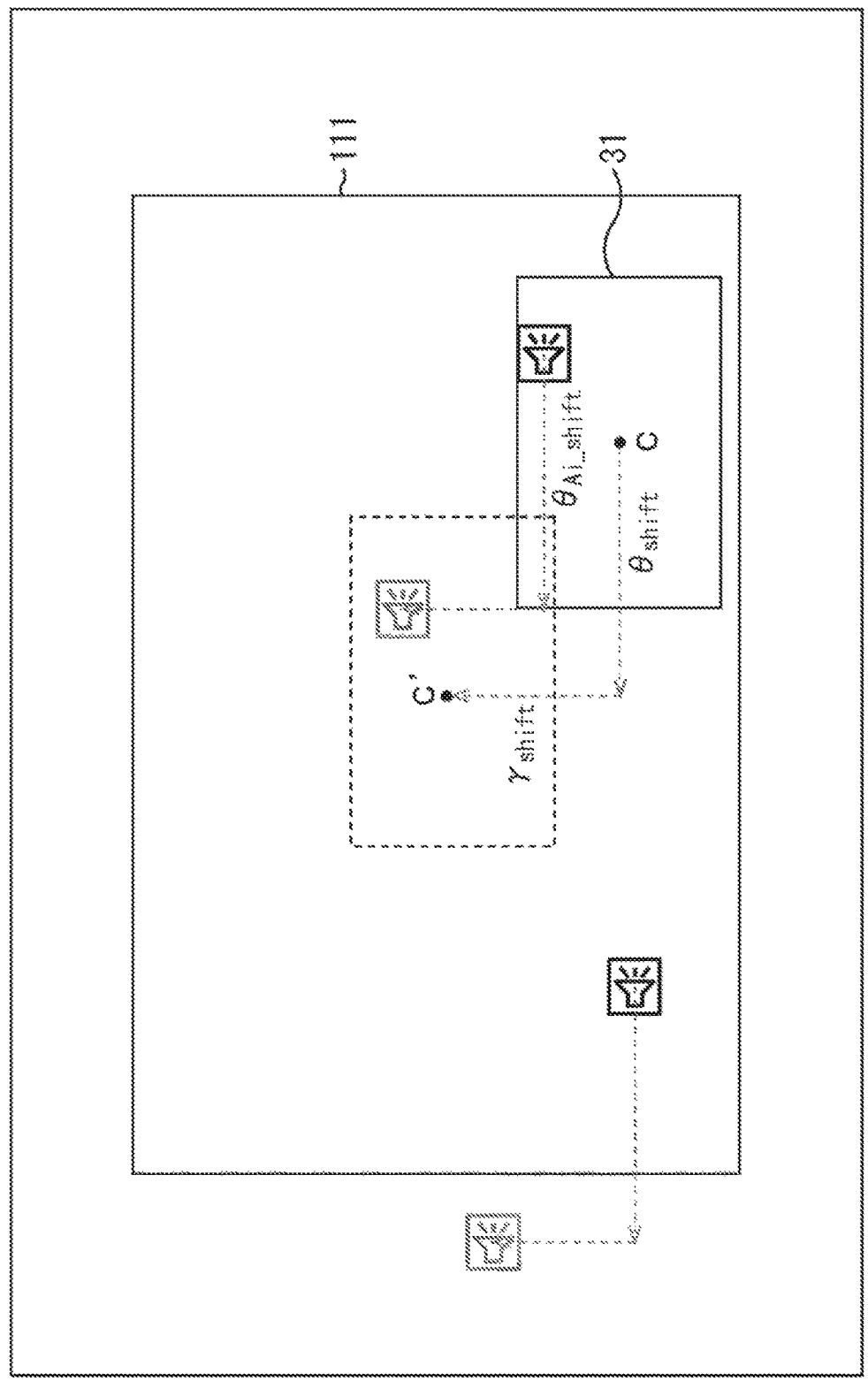
FIG. 24 is a diagram illustrated to describe a method of determining a position of an object.
Figure 25:
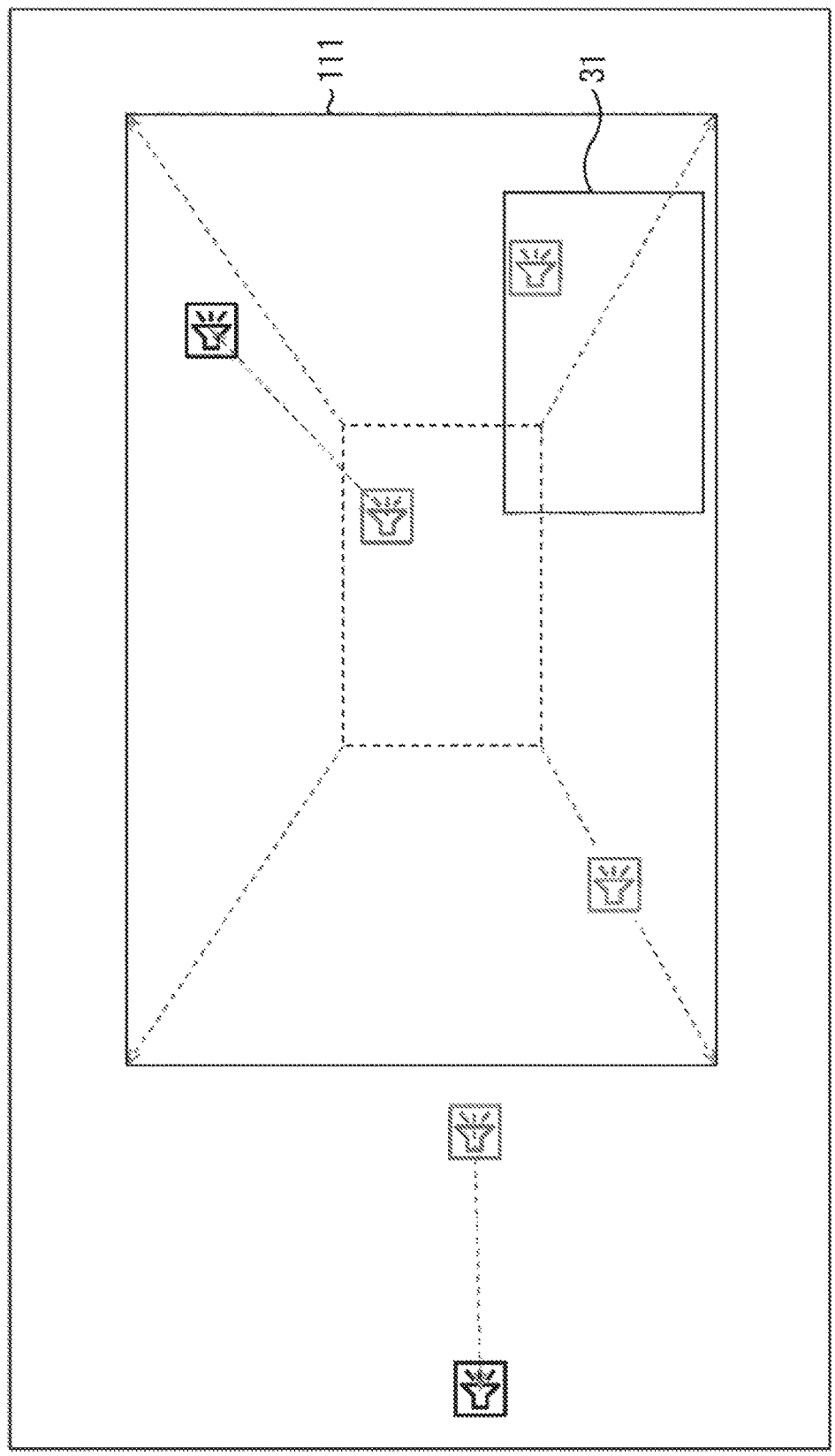
FIG. 25 is a diagram illustrated to describe a method of determining a position of an object.
Figure 26:
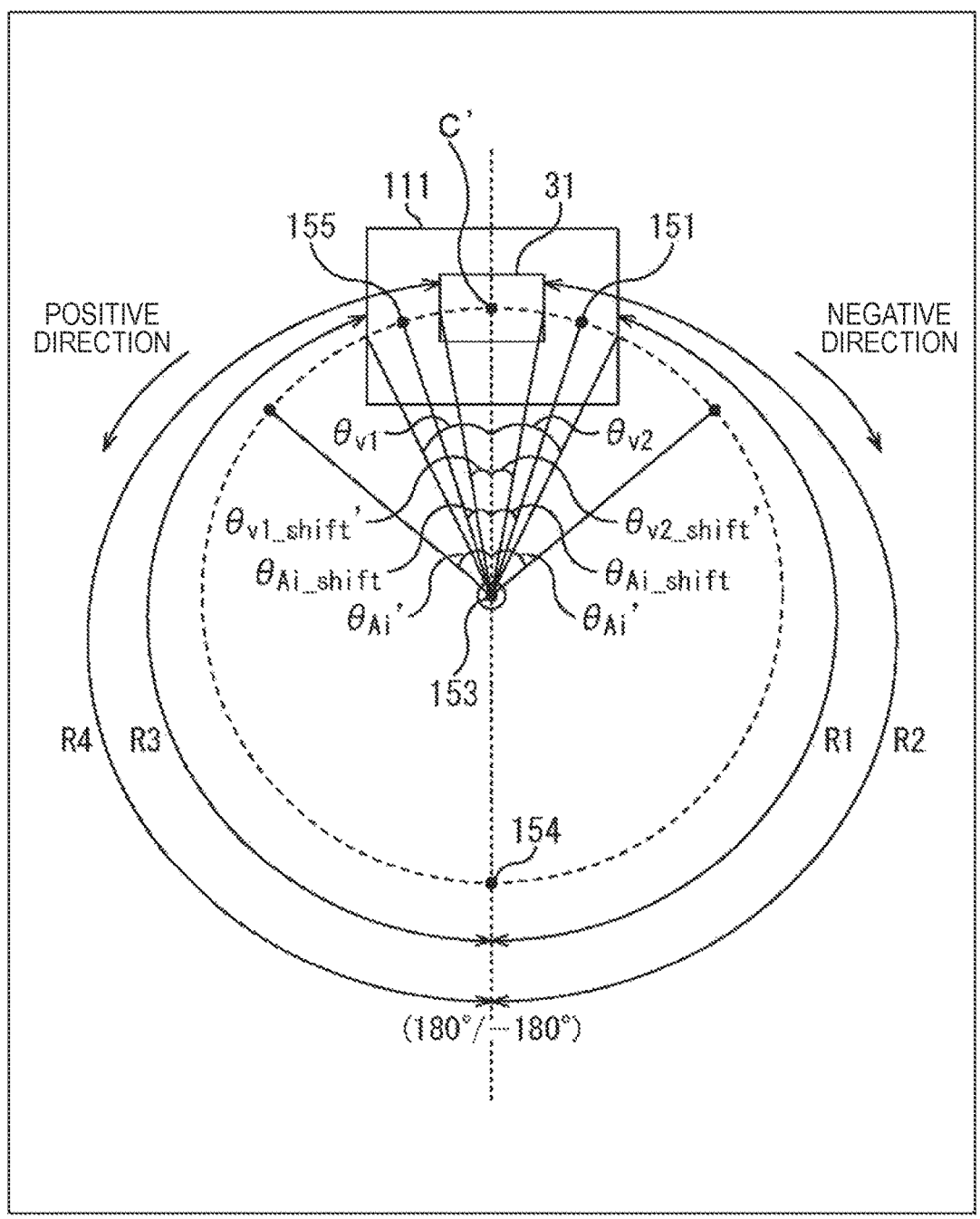
FIG. 26 is a diagram illustrated to describe a method of determining a position of an object.

FIGS. 24 to 26 are diagrams illustrated to describe a method of determining a position of an object by the position determination unit 122 shown in FIG. 23.

The display area 31 is extracted from the video content and the size of the display area 31 is converted to the size equivalent to that of the video content, and then a display image 111 is generated. Thus, the display image 111 has the size equivalent to the size obtained by shifting the center C of the display area 31 to the center C' of the display image 111 as shown in FIG. 24 and by converting the size of the display area 31 to the size of the video content as shown in FIG. 25.

Thus, the position determination unit 122 calculates a shift amount $\theta_{shift}$ in horizontal direction when the center O of the display area 31 is shifted to the center O' of the display image 111. This calculation uses the following Equation (1).

[Math. 1]

$$\theta_{shift} = \frac{\theta'_{v1} + \theta'_{v2} - \theta_{v1} - \theta_{v2}}{2} \quad (1)$$

In Equation (1), $\theta_{v1}'$ is the horizontal angle at the left edge in the display area 31 contained in the display area image frame size information, and $\theta_{v2}'$ is the horizontal angle at the right edge in the display area 31 of the display area image frame size information. In Equation (1), $\theta_{v1}$ is a horizontal angle at the left edge of the content image frame size information, and $\theta_{v2}$ is a horizontal angle at the right edge contained in the content image frame size information.

The position determination unit 122 calculates a horizontal angle at the left edge $\theta_{v1\_shift}'$ and a horizontal angle at the right edge $\theta_{v2\_shift}'$ in the display area 31 after the center O of the display area 31 is shifted to the center O' of the display image 111. This calculation uses the shift amount $\theta_{shift}$ and is obtained by the following Equation (2).

[Math. 2]

$$\theta_{v1\_shift}' = \mathrm{mod}(\theta_{v1}' + \theta_{shift} + 180°, 360°) - 180°$$

$$\theta_{v2\_shift}' = \mathrm{mod}(\theta_{v2}' + \theta_{shift} + 180°, 360°) - 180° \quad (2)$$

According to Equation (2), the horizontal angle $\theta_{v1\_shift}'$ and the horizontal angle $\theta_{v2\_shift}'$ are calculated so that they do not exceed the range of −180° to 180°.

As described above, the display image 111 has the size equivalent to the size obtained by shifting the center O of the display area 31 to the center O' of the display image 111 and by converting the size of the display area 31 to the size of the video content. Thus, the following Equation (3) is satisfied for the horizontal angles $\theta_{v1}$ and $\theta_{v2}$.

[Math. 3]

$$\theta_{v1} = \frac{\theta_{v1} - \theta_{v2}}{\theta_{v1\_shift}' - \theta_{v2\_shift}'} * \theta_{v1\_shift}'$$

$$\theta_{v2} = \frac{\theta_{v1} - \theta_{v2}}{\theta_{v1\_shift}' - \theta_{v2\_shift}'} * \theta_{v2\_shift}'$$

(3)

The position determination unit 122 calculates the shift amount $\theta_{shift}$, the horizontal angle $\theta_{v1\_shift}'$, and the horizontal angles $\theta_{v2\_shift}'$, in the way described above and then calculates a horizontal angle of objects in the display image 111. Specifically, the position determination unit 122 calculates a horizontal angle $\theta_{Ai\_shift}$ of an object #i after the center C of the display area 31 is shifted to the center C' of the display image 111. This calculation uses the shift amount $\theta_{shift}$ and is obtained by the following Equation (4).

[Math. 4]

$$\theta_{Ai\_shift} = \text{mod}(\theta_{Ai} + \theta_{shift} + 180°, 360°) - 180°$$

(4)

In Equation (4), $\theta_{Ai}$ is the horizontal angle of an object #i contained in the object position information. According to Equation (4), the horizontal male $\theta_{Ai\_shift}$ is calculated so that it does not exceed the range of −180° to 180°.

When an object #i is present in the display area 31, that is, if the condition of $\theta_{v2\_shift}' < \theta_{Ai\_shift} < \theta_{v1\_shift}'$ is satisfied, the position determination unit 122 calculates a horizontal angle of an object #i in the display image 111 using the following Equation (5).

[Math. 5]

$$\theta_{Ai}' = \frac{\theta_{v1} - \theta_{v2}}{\theta_{v1\_shift}' - \theta_{v2\_shift}'} \cdot \left(\theta_{Ai\_shift} - \frac{\theta_{v1} + \theta_{v2}}{2}\right)$$

(5)

According to Equation (5), the horizontal angle $\theta_{Ai}'$ is calculated by extending the distance between the position of an object #i in the display image 111 and the center C' of the display image 11 depending on the ratio between the sizes of the display area 31 and the display image 111.

On the other hand, when no object #i is present in the display area 31, that is, if the condition of $-180° \leq \theta_{Ai\_shift} \leq \theta_{v2\_shift}'$ or $\theta_{v1\_shift}' \leq \theta_{Ai\_shift} \leq 180°$ is satisfied, the position determination unit 122 calculates the horizontal angle $\theta_{Ai}'$ of an object #i in the display image 111 using the following Equation (6).

[Math. 6]

$$\theta_{Ai}' = \frac{\theta_{v2} + 180°}{\theta_{v2\_shift}' + 180°} \cdot (\theta_{Ai\_shift} + 180°) - 180°$$

(6)

-continued (for $-180° \leq \theta_{A1\_shift} \leq \theta_{v2\_shift}'$)

$$\theta_{Ai}' = \frac{180° - \theta_{v1}}{180° - \theta_{v1\_shift}'} \cdot (\theta_{Ai\_shift} - 180°) + 180°$$

(for $\theta_{v1\_shift}' \leq \theta_{Ai\_shift} \leq 180°$)

According to Equation (6), when an object #i is present in a position 151 on the right side of the display area 31 ($-180° \leq \theta_{Ai\_shift} \leq \theta_{v2\_shift}'$) as shown in FIG. 26, the horizontal angle $\theta_{Ai}'$ is calculated by extending the horizontal angle $\theta_{Ai\_shift}$ depending on the ratio between angles R1 and R2. The angle R1 is the angle measured from the right edge of the display image 111 to the position 154 just behind a viewer 153. The angle R2 is the angle measured from the right edge of the display area 31 whose center is shifted to the position 154.

According to Equation (6), when an object #i is present in a position 155 on the left side of the display area 31 ($\theta_{v1\_shift}' \leq \theta_{Ai\_shift} \leq 180°$), the horizontal angle $\theta_{Ai}'$ is calculated by extending the horizontal angle $\theta_{Ai\_shift}$ depending on the ratio between angles R3 and R4. The angle R3 is the angle measured from the left edge of the display image 111 to the position 154, The angle R4 is the angle measured from the left edge of the display area 31 whose center is shifted to the position 154.

The position determination unit 122 calculates a vertical angle $\gamma_{Ai}'$ of an object #i in the display image 111 based on the horizontal angles $\theta_{Ai}$ and $\theta_{Ai}'$. Specifically, when the object #i is located in front of the viewer, the position determination unit 122 calculates the vertical angle in a similar way to the horizontal angle $\theta_{Ai}'$.

On the other hand, when the object #i is located behind the viewer, the extension of the display area 31 allows the position of the object #i indicated by the horizontal angle $\theta_{Ai}$ to be shifted to the position just behind the viewer. Thus, when the vertical angle $\gamma_{Ai}''$ is calculated in a similar way to the horizontal angle $\theta_{Ai}'$, the position indicated by the vertical angle $\gamma_{Ai}$ contained in the object position information of the object #i is shifted to the position just above or just below the viewer. However, when the object #i is located behind the viewer, unless the object #i is shifted behind the viewer by change in the horizontal angle $\theta_{Ai}$, it is desirable to prevent the vertical angle $\gamma_{Ai}'$ from being changed even when the display area 31 is extended or reduced, or in this case, it is desirable to change the vertical angle $\gamma_{Ai}'$ in the same direction as the direction in which the horizontal angle $\theta_{Ai}$ is changed.

Thus, when the object #i indicated by the horizontal angle $\theta_{Ai}$ and the object #i indicated by the horizontal angle are all located in front of the viewer, i.e., if the condition of abs$(\theta_{Ai}) < 90°$ and abs$(\theta_{Ai}') < 90°$ is satisfied, the position determination unit 122 calculates the vertical angle $\gamma_{Ai}'$ using the following Equation (7).

[Math. 7]

$$\gamma_{Ai}' = \begin{cases} \frac{\gamma_{v2}' + 90°}{\gamma_{v2} + 90°} \cdot (\gamma_{Ai} + 90°) - 90° & \text{for } -90° \leq \gamma_{Ai} < \gamma_{v2} \\ \frac{\gamma_{v1}' - \gamma_{v2}'}{\gamma_{v1} - \gamma_{v2}} \cdot \left(\gamma_{Ai} - \frac{\gamma_{v1} + \gamma_{v2}}{2}\right) & \text{for } \gamma_{v2} \leq \gamma_{Ai} < \gamma_{v1} \\ \frac{90° - \gamma_{v1}'}{90° - \gamma_{v1}} \cdot (\gamma_{Ai} - \gamma_{v1}) + \gamma_{v1}' & \text{for } \gamma_{v1} \leq \gamma_{Ai} < 90° \end{cases}$$

(7)

In Equation (7), is the vertical angle at the upper edge in the display area. 31 contained in the display area image frame size information, and $\gamma_{v2}'$ is the vertical angle at the lower edge. In Equation (7), $\gamma_{v1}$ is the vertical angle at the upper edge contained in the content image frame size information, and $\gamma_{v2}$ is the vertical angle at the lower edge.

when the object #i indicated by the horizontal angle $\theta_{Ai}$ and the object #i indicated by the horizontal angle $\theta_{Ai}'$ are all located behind the viewer, i.e., if the condition of abs $(\theta_{Ai}) \geq 90°$ and abs $(\theta_{Ai}') \geq 90°$ is satisfied, the position determination unit 122 calculates the vertical angle $\gamma_{Ai}'$ using the following Equation (8). In other words, the vertical angle $\gamma_{Ai}$ becomes equal to the vertical angle $\gamma_{Ai}'$.

[Math. 8]

$$\gamma_{Ai}' = \gamma_{Ai} \quad (8)$$

Furthermore, when one of the object #i indicated by the horizontal angle $\theta_{Ai}$ and the object #i indicated by the horizontal angle is located in front of the viewer and the other is located behind the viewer, i.e., if the condition of abs $(\theta_{Ai}) < 90°$ and abs $(\theta_{Ai}') \geq 90°$ or abs $(\theta_{Ai}) \geq 90°$ and abs $(\theta_{Ai}') < 90°$ is satisfied, the position determination unit 122 calculates the vertical angle $\gamma_{Ai}'$ as described below.

In other words, in this case, the object #i is shifted from a position in front of the viewer to a position behind the viewer, or is shifted from a position behind the viewer to a position in front of the viewer. Thus, it will be difficult to simply conclude that the object #i is located at a position in front of or behind the viewer. In this case, it is necessary that the calculation procedure be split into two stages. One stage is to allow the horizontal angle of an object #i to have a range between an angle indicating the position of the object #i in front of the viewer and the angle of 90° that is the angle indicating the left side of the viewer or the angle of −90° indicating the right side of the viewer. The other stage is to allow the horizontal angle of an object #i to have a range between the angle of 90° or −90° and an angle indicating the position of the object #i behind the viewer.

Specifically, the position determination unit 122 sets the shift amount of the vertical angle $\gamma_{Ai}$ in the stage in which the horizontal angle of the object #i has a range between 90° or −90° and an angle indicating the position of the object #i behind the viewer to be equal to zero. The position determination unit 122 calculates the shift amount of the vertical angle $\gamma_{Ai}$ in the stage in which the horizontal angle of an object #i has a range between an angle indicating the position of the object #i in front of the viewer and the angle of 90° that is an angle indicating the left side of the viewer or the angle of −90° indicating the right side of the viewer in a similar way to Equation (7). As given in the following Equation (9), the vertical angles $\gamma_{v2}'$, $\gamma_{v2}$, $\gamma_{v1}'$, and $\gamma_{v1}$ defined in Equation (7) are substituted by the vertical angle $\gamma_{v2f}'$, $\gamma_{v2f}$, $\gamma_{v1f}'$, and $\gamma_{v1f}$ defined in the following Equation (10), respectively.

[Math. 9]

$$\gamma_{Ai} = \begin{cases} \frac{\gamma_{v2f}' + 90°}{\gamma_{v2f} + 90°} \cdot (\gamma_{Ai} + 90°) - 90° & \text{for } -90° \leq \gamma_{Ai} < \gamma_{v2f} \\ \frac{\gamma_{v1f}' - \gamma_{v2f}'}{\gamma_{v1f} - \gamma_{v2f}} \cdot \left(\gamma_{Ai} - \frac{\gamma_{v1f} + \gamma_{v2f}}{2}\right) & \text{for } \gamma_{v2f} \leq \gamma_{Ai} < \gamma_{v1f} \\ \frac{90° - \gamma_{v1f}'}{90° - \gamma_{v1f}} \cdot (\gamma_{Ai} - \gamma_{v1f}) + \gamma_{v1f}' & \text{for } \gamma_{v1f} \leq \gamma_{Ai} < 90° \end{cases} \quad (9)$$

[Math. 10]

for $(\theta_{Ai} < 90° \text{ \& } \theta_{Ai}' \geq 90°)$: (10)

$$\gamma_{v1f} = \gamma_{v1}$$

$$\gamma_{v2f} = \gamma_{v2}$$

$$\gamma_{v1f}' = F_{side} \cdot \gamma_{v1}$$

$$\gamma_{v2f}' = F_{side} \cdot \gamma_{v2}$$

for $(\theta_{Ai} \geq 90° \text{ \& } \theta_{Ai}' < 90°)$:

$$\gamma_{v1f} = F_{side} \cdot \gamma_{v1}$$

$$\gamma_{v2f} = F_{side} \cdot \gamma_{v2}$$

$$\gamma_{v1f}' = \gamma_{v1}'$$

$$\gamma_{v2f}' = \gamma_{v2}'$$

In Equation (10), $F_{side}$ indicates the ratio between the vertical angle of the display area 31 and the vertical angle of the display image 111 when the horizontal angle of the object #i is 90° or −90°, and is calculated using the following Equation (11).

[Math. 11]

$$F_{side} = \begin{cases} \dfrac{180° - \dfrac{90°}{180° - \gamma_{Ai}} \cdot (180° - \theta_{v1})}{\theta_{v1}} \cdot \text{TransForm\_Factor} & \text{for } \gamma_{Ai} \geq 0° \\ \dfrac{\dfrac{90°}{180° + \gamma_{Ai}} \cdot (180° + \theta_{v2}) - 180°}{\theta_{v2}} \cdot \text{TransForm\_Factor} & \text{for } \gamma_{Ai} < 0° \end{cases} \quad (11)$$

In Equation (11), $F_{side}$ is calculated by multiplying the ratio between the vertical angle of the display area 31 and the vertical angle of the display image 111 when the horizontal angle of the object #i is 90° or −90° by TransForm_Factor.

In Equation (11), TransForm_Factor is the factor indicating the ratio between the vertical angles $\gamma_{v1}$ and $\gamma_{v2}$ and the horizontal angles $\theta_{v1}$ and $\theta_{v2}$, and is expressed by the following Equation (12). This factor TransForm_Factor enables the variation in the vertical angle corresponding to the variation in the horizontal angle to be estimated.

[Math. 12]

$$\text{TransForm\_Factor} = \frac{\dfrac{\gamma_{v1}' - \gamma_{v2}'}{\gamma_{v1} - \gamma_{v2}}}{\dfrac{\theta_{v1}' - \theta_{v2}'}{\theta_{v1} - \theta_{v2}}} \quad (12)$$

As described above, when the object #i is shifted from a position in front of the viewer to a position behind the viewer, i.e., if the condition of abs $(\theta_{Ai}') < 90°$ and abs $(\theta_{Ai}') \geq 90°$ is satisfied, the variation in the vertical angle of the object #i becomes equal to a variation when the horizontal angle of the object #i is shifted front the horizontal angle $\theta_{Ai}$ to the angle of 90° or −90°. Thus, the vertical angle $\gamma_{v1}'$ in Equation (7) becomes equal to the image frame size for abs $(\theta_{Ai}')=90°$, i.e., the product of $F_{side}$ and the vertical angle $\gamma_{v1}$, and the vertical angle $\gamma_{v2}'$ in Equation (7) becomes equal to the image frame size for abs $(\theta_{Ai}')=90°$, i.e., the product of $F_{side}$ and the vertical angle $\gamma_{v2}$.

when the object #i is shifted from a position behind the viewer to a position in front of the viewer, i.e., if the condition of abs abs $(\theta_{Ai})\geq 90°$ and abs $(\theta_{Ai})<90°$ is satisfied, the variation in the vertical angle of the object #i becomes equal to a variation when the horizontal angle of the object #i is shifted front the angle of 90° or −90° to the horizontal angle $\theta_{Ai}'$. Thus, the vertical angle $\gamma_{v1}$ in Equation (7) becomes equal to the product of Fside and the vertical angle $\gamma_{v1}$, and the vertical angle $\gamma_{v2}$ in Equation (7) becomes equal to the product of Fside and the vertical angle $\gamma_{v2}$.

In the above case, although the vertical angle is intended not to change when the object #i is located behind the viewer, the vertical angle may be set to change in the same direction as the horizontal angle. In other words, when the position indicated by the horizontal angle is shifted to a position just behind the viewer, the position indicated by the vertical angle also may be shifted to a position just behind the viewer. When the position indicated by the horizontal angle is shifted to a position right in front of the viewer, the position indicated by the vertical angle also may be shifted to a position right in front of the viewer.

The position determination unit 122 may set the distance $r_{Ai}'$ of the object #i in the display image 111 to the distance $r_{Ai}$ contained in the object position information of the object #i. The position determination unit 122 supplies the horizontal angle $\theta_{Ai}'$, vertical angle $\gamma_{Ai}'$, and distance $r_{Ai}$ of the object #i which are obtained as described above to the voice synthesis processor 123, which accepts these values as the position of the object #i.

Figure 27:
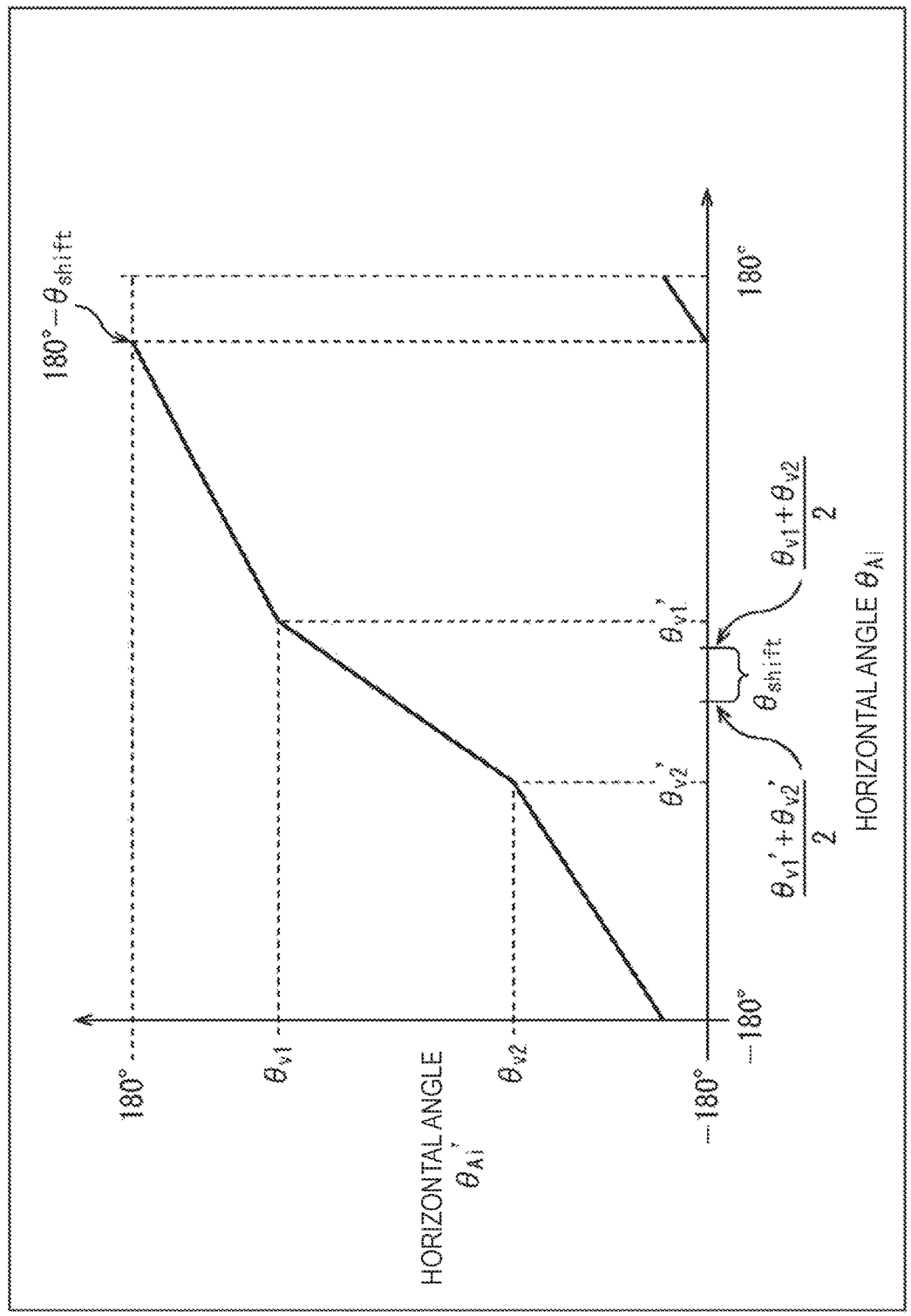
FIG. 27 is a graph illustrating the relationship between horizontal angles $\theta_{Ai}$ and $\theta_{Ai}'$.

FIG. 27 is a graph illustrating the relationship between the horizontal angle $\theta_{Ai}$ and the horizontal angle $\theta_{Ai}'$.

In the graph shown in FIG. 27, the horizontal axis represents the horizontal angle $\theta_{Ai}$, and the vertical axis represents the horizontal angle $\theta_{Ai}'$.

As shown in FIG. 27, if the condition $\theta_{Ai}'<\theta_{Ai}<\theta_{Ai}'$ is satisfied, the horizontal angle $\theta_{Ai}$ is shifted by the shift amount $\theta_{shift}$ and is extended, then the horizontal angle $\theta_{Ai}$ becomes equal to the horizontal angle $\theta_{Ai}'$. If the condition of $-180°\leq\theta_{Ai}\leq\theta_{v2}'$ or $\theta_{v1}\leq\theta_{Ai}\leq 180°$ is satisfied, the horizontal angle $\theta_{Ai}$ is shifted by the shift amount $\theta_{shift}$ and is reduced, then the horizontal angle $\theta_{Ai}$ becomes equal to the horizontal angle $\theta_{Ai}'$.

Figure 28:
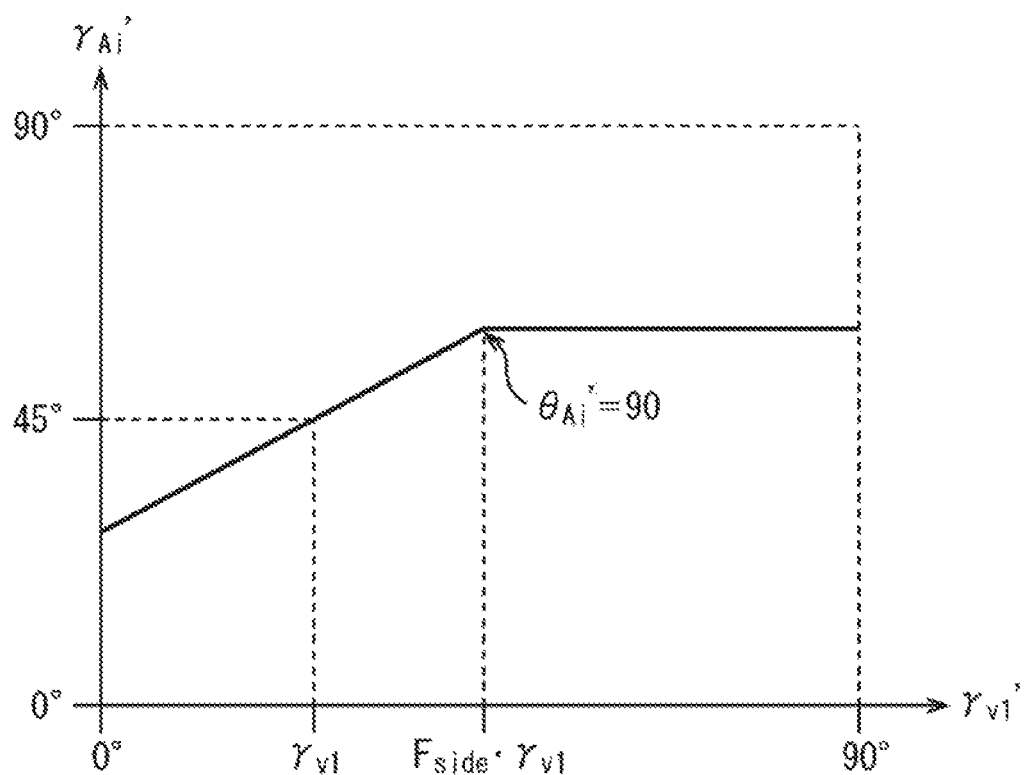
FIG. 28 is a graph illustrating the relationship between vertical angles $\gamma_{v1}'$ and $\gamma_{Ai}'$.

FIG. 28 is a graph illustrating the relationship between the vertical angle $\gamma_{v1}'$ and the vertical angle $\gamma_{Ai}'$.

In the graph shown in FIG. 28, the horizontal axis represents the vertical angle $\gamma_{v1}'$ and the vertical axis represents the vertical angle $\gamma_{Ai}'$.

In the example shown in FIG. 28, the horizontal angle $\theta_{Ai}$ and the vertical angle $\gamma_{Ai}$ are both 45°. The vertical angles $\gamma_{v1}$ and $\gamma_{v2}$ are changed in the same ratio as the horizontal angles $\theta_{v1}$ and $\theta_{v2}$. In other words, TransForm_Factor is equal to 1. The angles $\theta_{v1}$, $\theta_{v2}$, $\gamma_{v1}$, and $\gamma_{v2}$ are equal to 29°, −29°, 17.5°, and −17.5°, respectively.

In this case, as shown in FIG. 28, if the condition of $0°<\gamma_{v1}'<(F_{side}*\gamma_{v1})$ is satisfied, the vertical angle $\gamma_{Ai}'$ increases as the image frame size in the vertical direction of the display image 111 increases. If the condition of $(F_{side}*\gamma_{v1})\leq\gamma_{v1}'\leq 90°$ is satisfied, the vertical angle $\gamma_{Ai}'$ becomes equal to the vertical angle $\gamma_{Ai}'$ when $\gamma_{v1}'=(F_{side}*\gamma_{v1})$, i.e., when the horizontal angle $\theta_{Ai}'$ of the object #i is 90°, regardless of the magnitude the image frame size in the vertical direction of the display image 111.

(Illustration of Processing by Streaming Playback Section)

Figure 29:
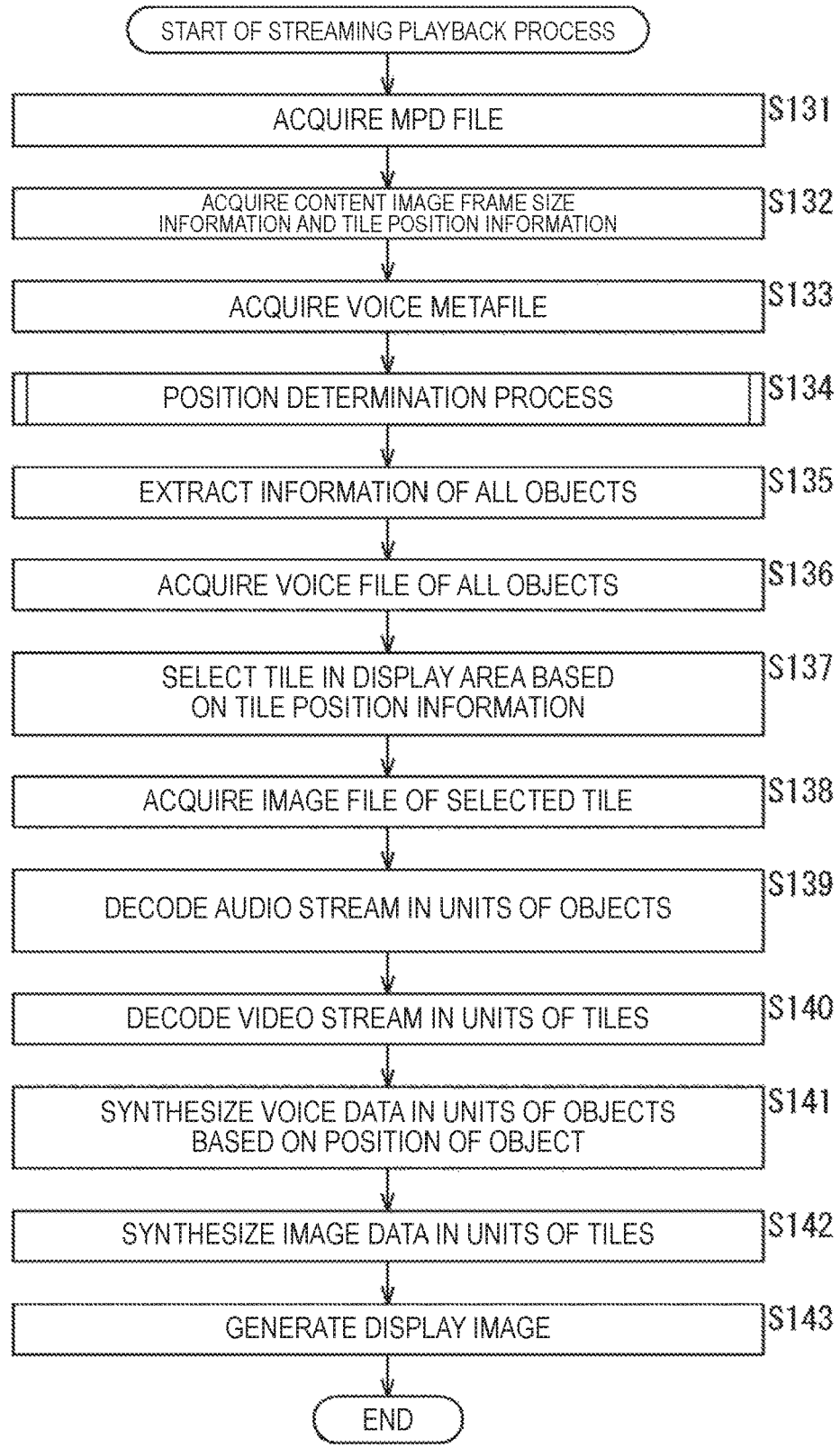
FIG. 29 is a flowchart illustrated to describe a streaming playback process to be performed by the streaming playback section in FIG. 23.

FIG. 29 is a flowchart illustrated to describe the streaming playback process to be performed by the streaming playback section 120 of FIG. 23.

In step S131 of FIG. 29, the MPD acquisition unit 91 of the streaming playback section 120 acquires the MPD file from the Web server 12 and supplies the MPD processor 121 with the acquired MPD file.

In step S132, the MPD processor 121 acquires the content image frame size information and the tile position information, which are described in "AdaptationSet" for image, from the MPD file supplied from the MPD acquisition unit 91. The MPD processor 121 supplies the position determination unit 122 with the image frame size information and supplies the image selector 98 with the tile position information. The MPD processor 121 extracts information such as a URL described in "Segment" for voice metafile and supplies the metafile acquisition unit 93 with the extracted information.

In step S133, the metafile acquisition unit 93 requests a voice metafile from the Web server 12 based on the information supplied from the MPD processor 92. The voice metallic to be requested is specified in a URL among the information supplied from the MPD processor 92. Then, the metafile acquisition unit 93 acquires the voice metafile. The metafile acquisition unit 93 supplies the voice selector 94 with object position information contained in the voice metafile.

In step S134, the position determination unit 122 performs a position determination process of determining the position of an object in a display image, based on object position information, content image frame size information, and display area image frame size information. The position determination process will be described in detail with reference to FIG. 30 described later herein.

In step S135, the MPD processor 121 extracts information such as a URL, which is described in "Segment" for voice file of all objects, from the MPD file. Then, the MPD processor 121 supplies the voice file acquisition unit 95 with the extracted information.

In step S136, the voice file acquisition unit 95 requests and acquires, based on the information such as a URL supplied from the MPD processor 121, voice files of all the objects specified in the URL from the Web server 12. Then, the voice file acquisition unit 95 supplies the voice decoding processor 96 with the acquired voice file in units of objects.

The process in steps S137 to S140 is substantially similar to the process in steps S36 to S39 of FIG. 14, and thus a description thereof is omitted.

In step S141, the voice synthesis processor 123 synthesizes voice data in units of objects supplied from the voice decoding processor 96 based on the object position supplied from the position determination unit 122 and outputs the synthesized voice data.

In step S142, the image synthesis processor 124 synthesizes image data in units of tiles supplied from the image decoding processor 100.

In step S143, the image synthesis processor 124 converts the size of the image corresponding to the synthesized image data to the size of the video content to generate a display image. The image synthesis processor 124 outputs the display image, and then the process is terminated.

Figure 30:
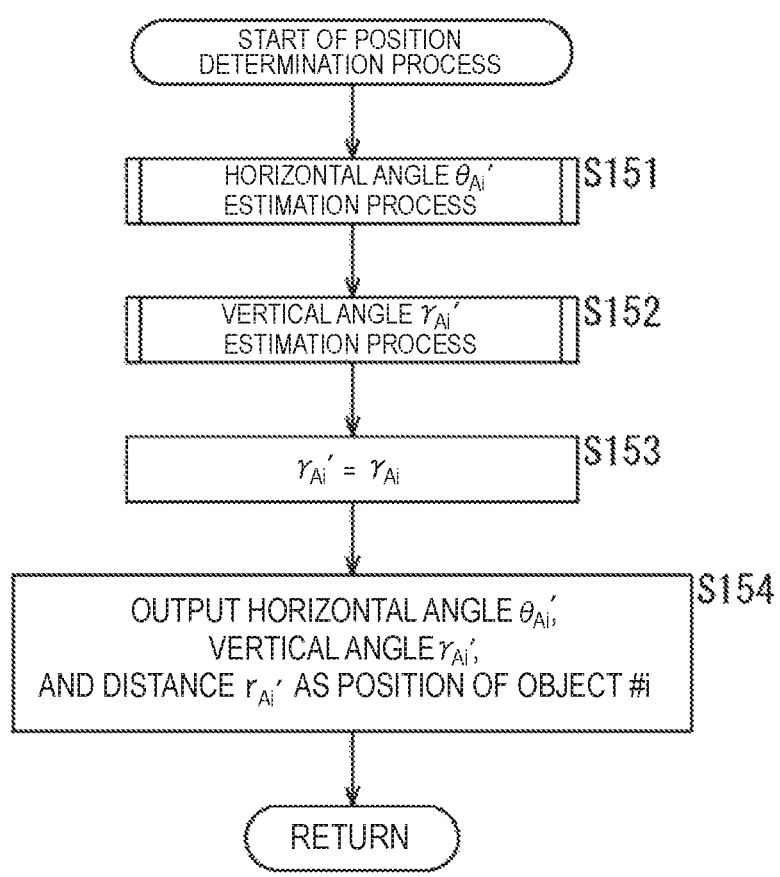
FIG. 30 is a flowchart illustrated to describe in more detail a position determination process in FIG. 29.

FIG. 30 is a flowchart illustrated to describe in more detail the position determination process in step S134 of FIG. 29. The position determination process is performed, for example, for each object.

In step S151 of FIG. 30, the position determination unit 122 performs a horizontal angle $\theta_{Ai}'$ estimation process of estimating the horizontal angle $\theta_{Ai}'$ in a display image. The detailed description of the horizontal angle $\theta_{Ai}'$ estimation process will be given later with reference to FIG. 31.

In step S152, the position determination unit 122 performs a vertical angle $\gamma_{Ai}'$ estimation process of estimating the vertical angle $\gamma_{Ai}'$ in a display image. The detailed description of the vertical angle $\gamma_{Ai}'$ estimation process is similar to the horizontal angle $\theta_{Ai}'$ estimation process in step S151 except that the vertical direction is used in place of the horizontal direction, and thus a detailed description thereof will be omitted.

In step S153, the position determination unit 122 sets the distance $r_{Ai}'$ in a display image to be equal to the distance $r_{Ai}$ contained in the object position information supplied from the metafile acquisition unit 93.

In step S154, the position determination unit 122 outputs the horizontal angle $\theta_{Ai}'$, vertical angle $\gamma_{Ai}'$, and distance $r_{Ai}$ to the voice synthesis processor 123, which accepts these values as the position of the object #i. Then, the process returns to step S134 of FIG. 29 and proceeds to step S135.

Figure 31:
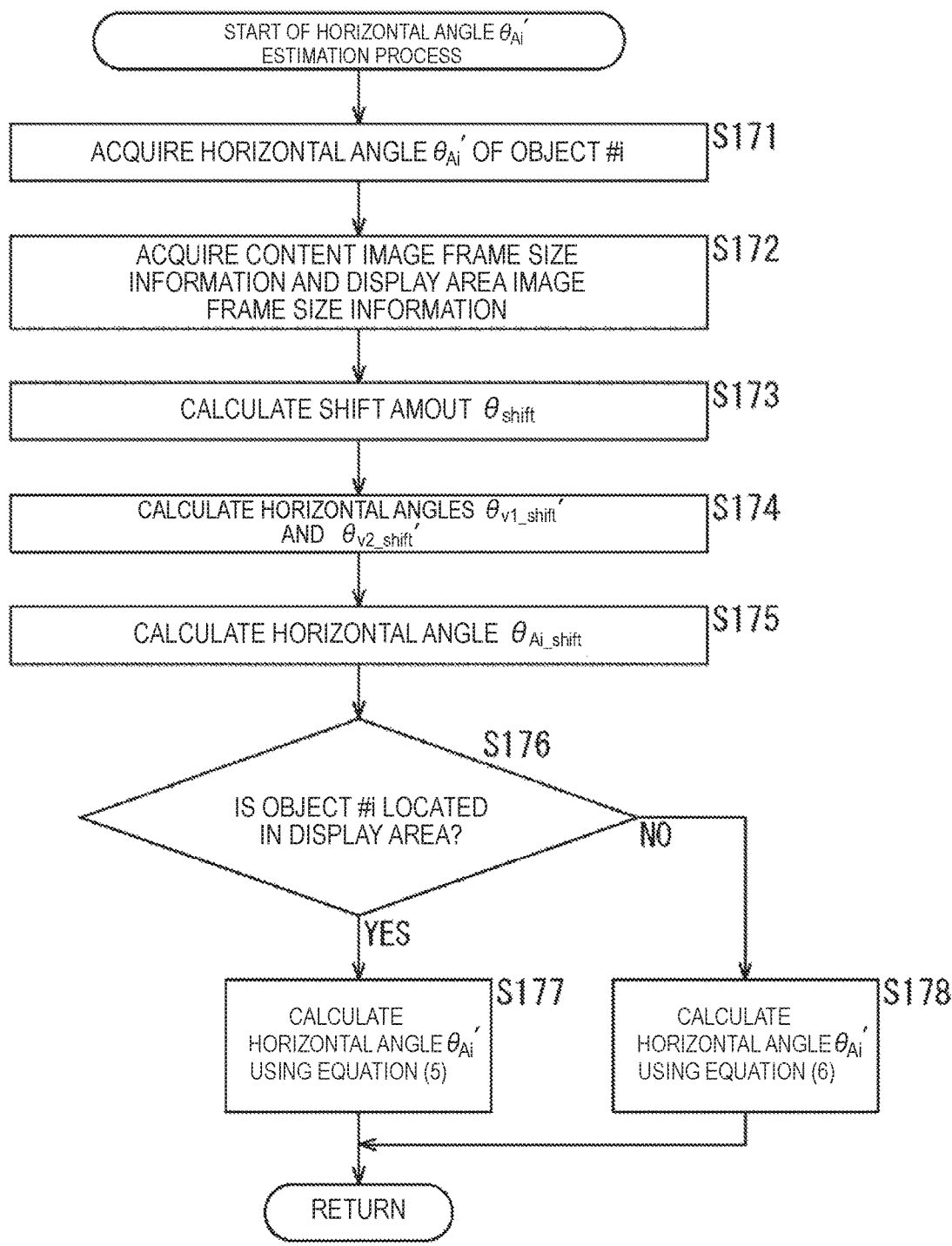
FIG. 31 is a flowchart illustrated to describe in detail a horizontal angle $\theta_{Ai}'$ estimation process in FIG. 30.

FIG. 31 is a flowchart illustrated to describe in detail the horizontal angle $\theta_{Ai}'$ estimation process in step S151 of FIG. 30.

In step S171 of FIG. 31, the position determination unit 122 acquires the horizontal angle $\theta_{Ai}$ contained in the object position information supplied from the metafile acquisition unit 93.

In step S172, the position determination unit 122 acquires the content image frame size information supplied from the MPD processor 121 and the display area image frame size information specified by the user.

In step S173, the position determination unit 122 calculates the shift amount $\theta_{shift}$ by the above-mentioned Equation (1) based on the content image frame size information and the display area image frame size information.

In step S174, the position determination unit 122 calculates the horizontal angles $\theta_{v1\_shift}'$ and $\theta_{v2\_shift}'$ by the above-mentioned Equation (2) using the shift amount $\theta_{shift}$ and the display area image frame size.

In step S175, the position determination unit 122 calculates the horizontal angle $\theta_{Ai\_shift}$ by the above-mentioned Equation (4) using the horizontal angle $\theta_{Ai}$ and the shift amount $\theta_{shift}$.

In step S176, the position determination unit 122 determines whether the object #i is located in the display area 31 (the horizontal angle of the object #i ranges between horizontal angles at both edges of display area 31) or whether the condition of $\theta_{v2\_shift}' < \theta_{Ai\_shift} < \theta_{Ai\_shift}'$ shift is satisfied.

If it is determined in step S176 that the object #i is located in the display area 31 or that the condition of $\theta_{v2\_shift}' < \theta_{Ai\_shift} < \theta_{v1\_shift}'$ is satisfied, the process proceeds to step S177. In step S177, the position determination unit 122 calculates the horizontal angle $\theta_{Ai}'$ by the above-mentioned Equation (5) based on the content image frame size information, horizontal angles $\theta_{v1\_shift}'$ and $\theta_{v2\_shift}'$, and vertical angle $\gamma_{Ai\_shift}'$.

On the other hand, if it is not determined in step S176 that the object #i is located in the display area 31 or that the condition of $-180° \leq \theta_{Ai\_shift} \leq \theta_{v2\_shift}'$ or $\theta_{v1\_shift}' \leq \theta_{Ai\_shift} \leq 180°$ is satisfied, the process proceeds to step S178. In step S178, the position determination unit 122 calculates the horizontal angle $\theta_{Ai}'$ by the above-mentioned Equation (6) based on the content image frame size information, horizontal angle $\theta_{v1\_shift}'$ or $\theta_{v2\_shift}'$, and horizontal angle $\theta_{Ai\_shift}'$.

When the process in steps S177 and 178 is performed, the process returns to step S151 of FIG. 30 and proceeds to step S152.

Although the size of the display image is set to be equal to the size of the video content in the second embodiment, the size of both may be different from each other.

In the second embodiment, voice data of some objects (e.g. objects in a display area or objects within a predetermined range from a display area) may be synthesized and outputted, rather than the voice data of all objects is synthesized and outputted. A method of selecting an object of voice data to be outputted may be determined in advance or may be decided by the user.

Third Embodiment (Illustration of Method of Determining Position of Object in Display Image)

A third embodiment of the information processing system to which the present disclosure is applied is substantially similar to the second embodiment except for a method of determining a position of an object in a display area by the position determination unit 122 of FIG. 23. Thus, a description will be given only of a method of determining a position of an object in a display area by the position determination unit 122 of FIG. 23.

When a viewer views a video content item, the change in a distance from the viewer to the image frame causes the angle of the image frame viewed from the viewer to be changed accordingly. For example, as the viewer approaches the image frame, the image frame is visible larger. As the viewer is away from the image frame, the image frame is visible smaller. Thus, the change in size of the display area or the image frame can be represented by the movement of the viewer. In the third embodiment, the change in size of the display area is represented by the movement of the viewer.

FIGS. 32 to 35 are diagrams illustrated to describe a method of determining a position of an object in a display area according to the third embodiment of the information processing system to which the present disclosure is applied.

Figure 32:
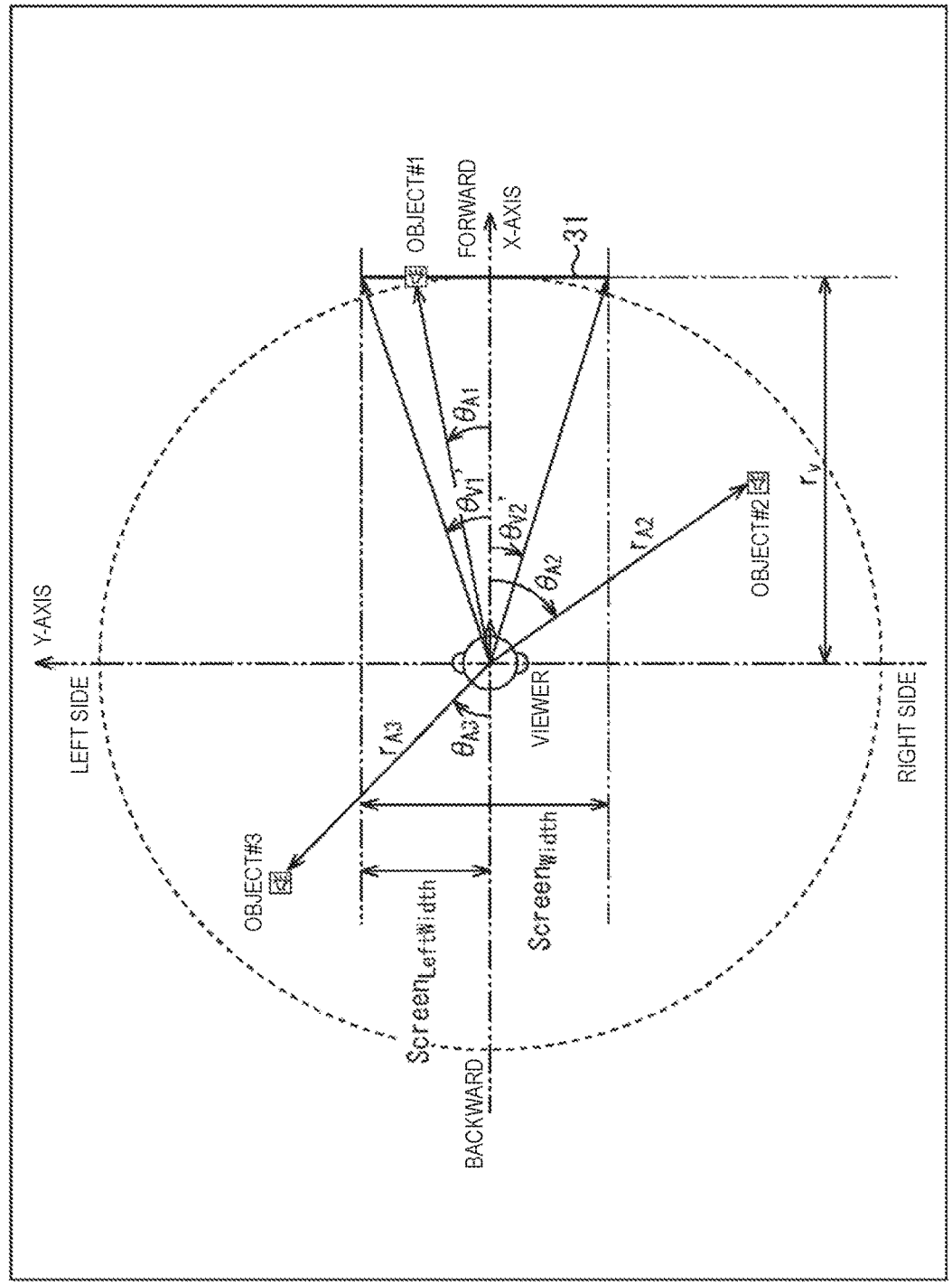
FIG. 32 is a diagram illustrated to describe a method of determining a position of an object according to a third embodiment of the information processing system to which the present disclosure is applied.
Figure 33:
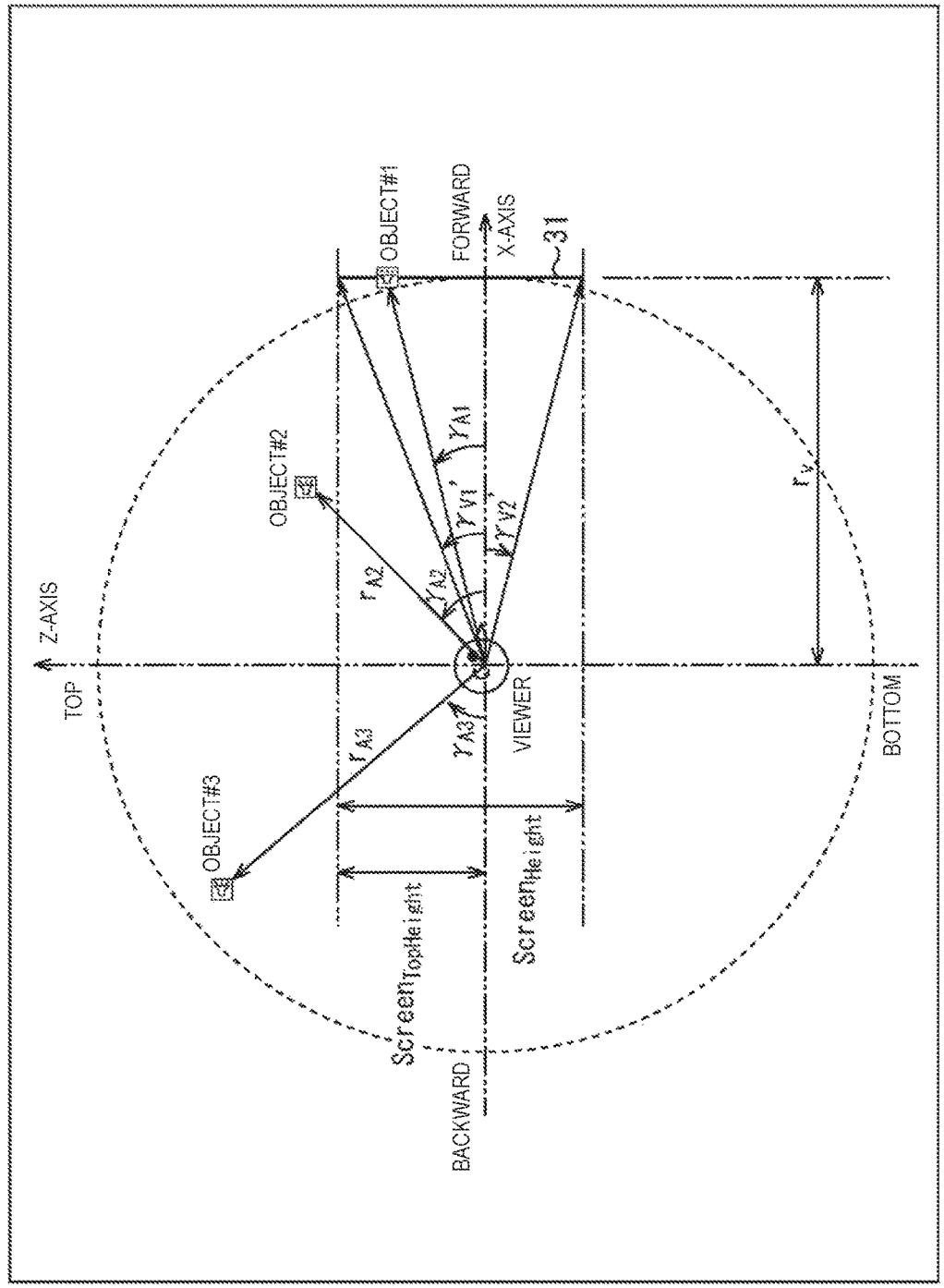
FIG. 33 is a diagram illustrated to describe a method of determining a position of an object according to a third embodiment of the information processing system to which the present disclosure is applied.

FIGS. 32 and 33 are diagrams illustrated to describe a state in which the size of the display area 31 in the video content is changed. FIG. 32 is a top view seen from the top of the head of the viewer, and FIG. 32 is a side view seen from the right side of the viewer.

Figure 34:
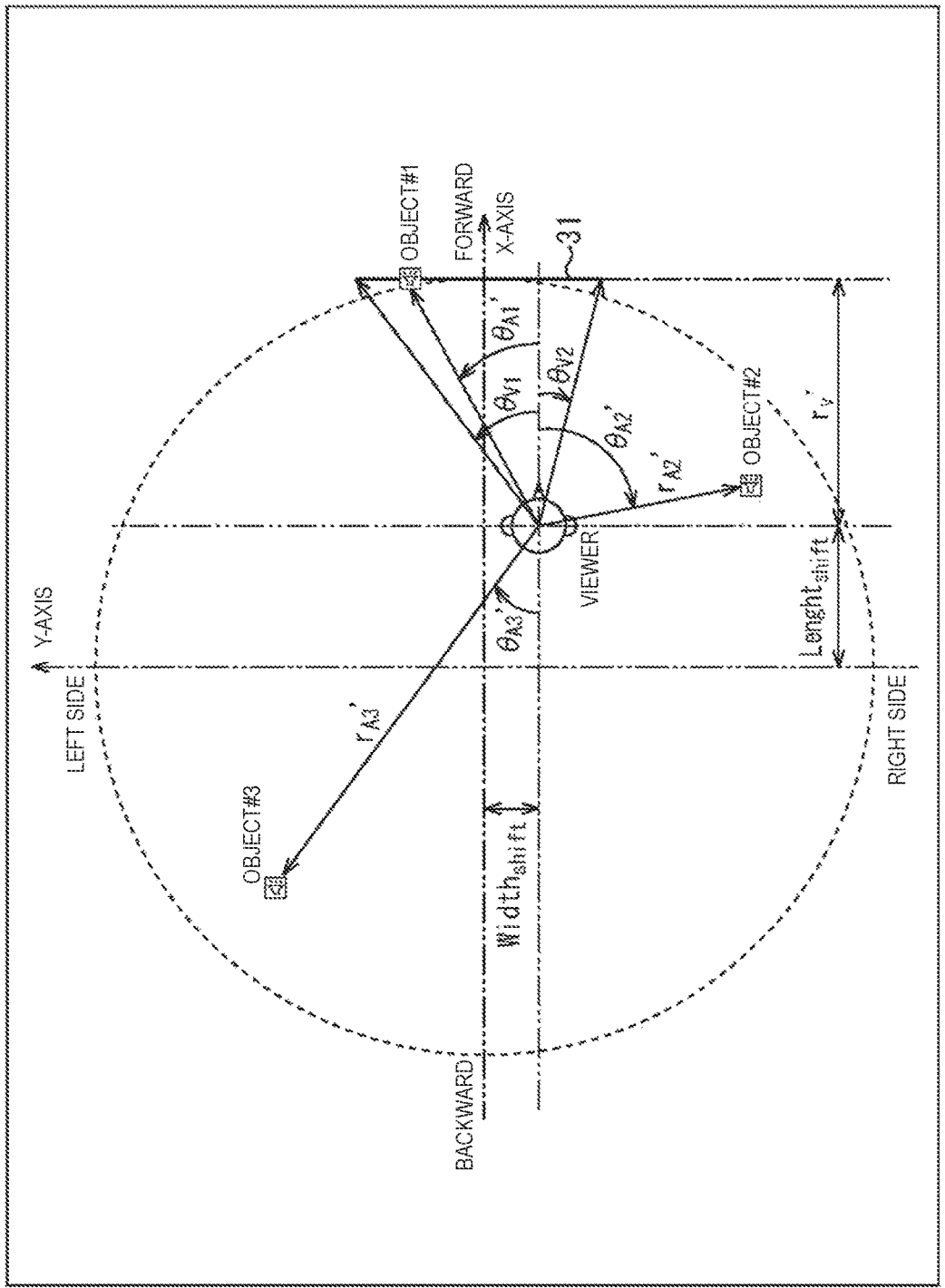
FIG. 34 is a diagram illustrated to describe a method of determining a position of an object according to a third embodiment of the information processing system to which the present disclosure is applied.
Figure 35:
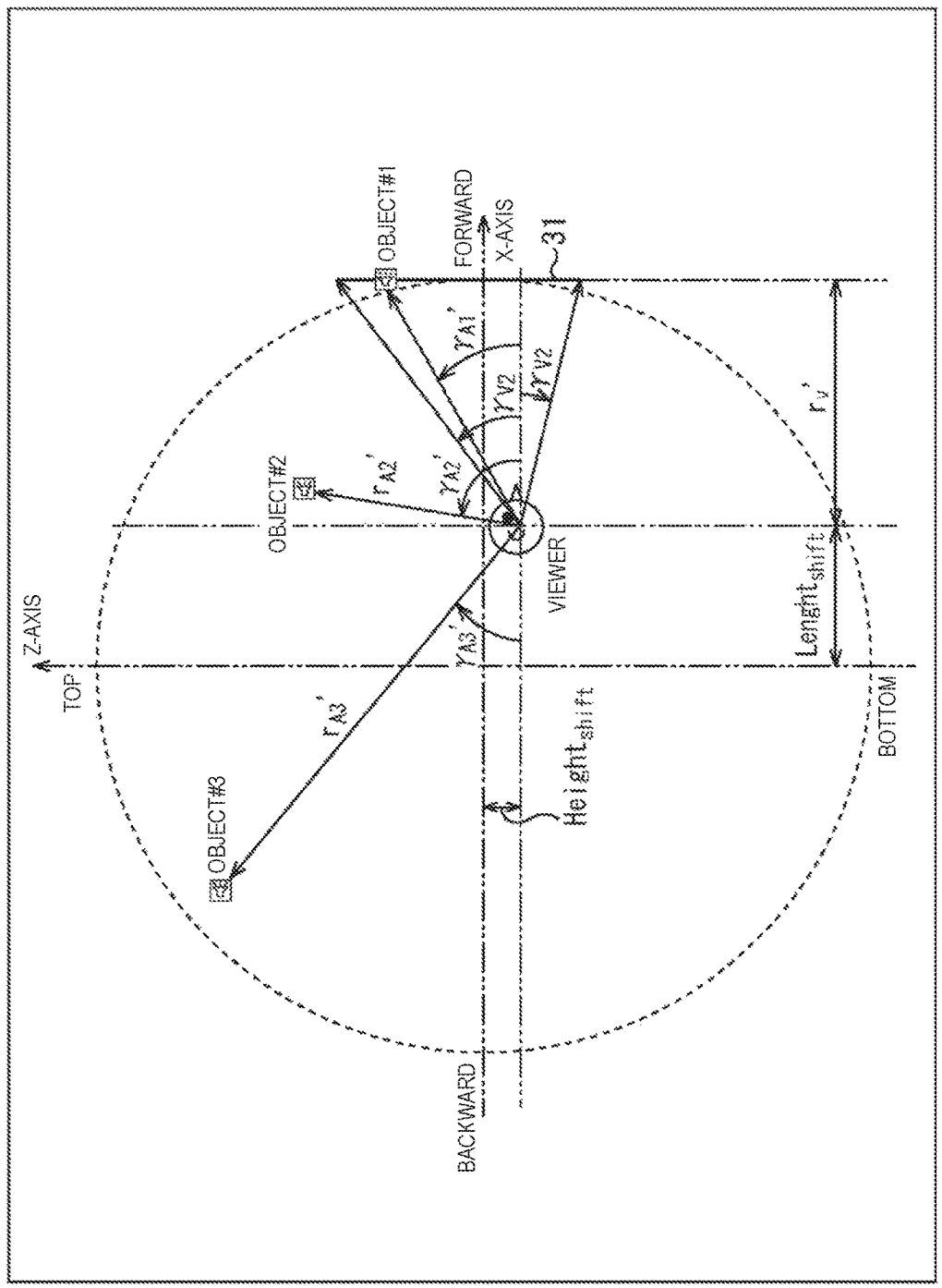
FIG. 35 is a diagram illustrated to describe a method of determining a position of an object according to a third embodiment of the information processing system to which the present disclosure is applied.

FIGS. 34 and 35 are diagrams illustrated to describe a state in which the viewer is moved and the size of the display area 31 seen from the viewer is equal to the size of the video content with the movement of the viewer. FIG. 34 is a top view seen from the top of the head of the viewer, and FIG. 35 is a side view seen from the right side of the viewer.

As shown in FIGS. 32 to 35, the relative positional relationships between the viewer and an object 41 within the display area 31 and between the viewer and objects 42 and 43 outside the display area 31 are changed with the movement of the viewer. Thus, the position determination unit 122 estimates object position information when the size of the display area 31 is changed to the equal to the size of the video content, i.e., object position information in the display image, by obtaining object position information of the object changed by the movement of the viewer.

Specifically, the position determination unit 122 calculates a horizontal width $Screen_{Width}$ in the display area 31 before the movement, a width $Screen_{Leftwidth}$ extending between the left edge and the center, and a height $Screen_{TopHeight}$ extending between the top edge and the center, using the following Equation (13).

[Math. 13]

$$Screen_{LeftWidth} = r_v \cdot \tan(\theta_{v1}')$$

$$Screen_{TopHeight} = r_v \cdot \tan(\gamma_{v1}')$$

$$Screen_{Width} = r_v \cdot (\tan(\theta_{v1}') - \tan(\theta_{v2}')) \quad (13)$$

In Equation (13), $r_v$ is the distance from the viewer to the image frame, $\theta_{v1}'$ is the horizontal angle at the left edge in the display area 31 contained in the display area image frame size information, $\theta_{v2}'$ is the horizontal angle at the right edge, and $\gamma_{v1}'$ is the vertical angle at the upper edge.

Then, the position determination unit 122 estimates a distance $r_v'$ from the viewer to the image frame when the size of the display area 31 seen from the viewer is equal to the size of the video content. This estimation is performed using the following Equation (14).

[Math. 14]

$$r_v' = \frac{Screen_{Width}}{\tan(\theta_{v1}) - \tan(\theta_{v2})} \quad (14)$$

In Equation (14), $\theta_{v1}$ is the horizontal angle at the left edge contained in the display area image frame size information of the display area 31 after the movement, i.e., the content image frame size information, and $\theta_{v2}$ is the horizontal angle at the right edge.

Then, the position determination unit 122 estimates a shift amount $Length_{shift}$ in the back and forth direction of the viewer, a shift amount $Width_{shift}$ in the side-to-side direction of the viewer, and a shift amount $Height_{shift}$ in the up-and-down direction of the viewer when the size of the display area 31 seen from the viewer is equal to the size of the video content with the movement of the viewer. This estimation is performed using the following Equation (15).

[Math. 15]

$$Length_{shift} = r_v - r_v'$$

$$Width_{shift} = Screen_{LeftWidth} - r_v' \cdot \tan(\theta_{v1})$$

$$Height_{shift} = Screen_{TopHeight} \cdot F_{Aspect\_ratio} - r_v' \cdot \tan(\gamma_{v1}) \quad (15)$$

In Equation (15), vertical angle $\gamma_{v1}$ is the vertical angle at the upper edge contained in the display area image frame size information of the display area 31 after the movement, i.e., the content image frame size information. In Equation (15), $F_{Aspect\_ratio}$ is the factor indicating the variation of the ratio between the width in the vertical direction and the width in the horizontal direction of the display area 31 seen from the viewer before and after the movement, and is expressed by the following Equation (16). This factor $F_{Aspect\_ratio}$ allows the variation in width in the vertical direction corresponding to the variation in width in the horizontal direction to be estimated.

[Math. 16]

$$F_{Aspect\_ratio} = \frac{(\tan(\gamma_{v1}') - \tan(\gamma_{v2}')) \cdot (\tan(\theta_{v1}) - \tan(\theta_{v2}))}{(\tan(\theta_{v1}') - \tan(\theta_{v2}')) \cdot (\tan(\gamma_{v1}) - \tan(\gamma_{v2}))} \quad (16)$$

In Equation (16), $\gamma_{v2}$ is the vertical angle at the lower edge contained in the display area image frame size information of the display area 31 after the movement, i.e., the content image frame size information, and $\gamma_{v2}'$ is the vertical angle at the lower edge contained in the display area image frame size information of the display area 31.

Consequently, the position determination unit 122 estimates the object position information of the object in the display image using the obtained information as described above.

Specifically, when an object is located in the display area 31, i.e., if the condition of $\theta_{v2}' \leq \theta_{Ai} \leq \theta_{v1}'$ and $\gamma_{v2}' \leq \gamma_{Ai} \leq \gamma_{v1}'$ is satisfied (in the examples of FIGS. 32 to 35, the object is object #1), the position determination unit 122 estimates the object position information in the display image using the following Equation (17).

[Math. 17]

$$\theta_{Ai}' = \arctan\left(\frac{r_v \cdot \tan(\theta_{Ai}) - Width_{shift}}{r_v'}\right) \quad (17)$$

$$\gamma_{Ai}' = \arctan\left(\frac{r_v \cdot \tan(\gamma_{Ai}) - Height_{shift}}{r_v'}\right)$$

$$r_{Ai}' = \frac{r_v'}{\cos(\theta_{Ai}') \cdot \cos(\gamma_{Ai}')}$$

In Equation (17), $\theta_{Ai}'$ is the horizontal angle of the object #1 after the movement, $\theta_{Ai}$ is the horizontal angle of the object #1 before the movement, $\gamma_{A1}'$ is the vertical angle of the object #1 after the movement, and a vertical angle $\gamma_{Ai}$ is the horizontal angle of the object #1 before the movement. In Equation (17), $r_{Ai}'$ is the distance of the object #1 after the movement and $r_{Ai}$ is the distance of the object #1 before the movement.

On the other hand, when no object is located in the display area 31, i.e., if the condition of $\theta_{v2}' \leq \theta_{Ai} \leq \theta_{v1}'$ and $\gamma_{v2}' \leq \gamma_{Ai} \leq \gamma_{v1}'$ is not satisfied (in the examples of FIGS. 32 to 35, objects #1 and #3 are used), the position determination unit 122 estimates the object position information in the display image using the following Equation (18).

[Math. 18]

$$\theta_{Ai}' = \arctan\left(\frac{r_{Ai} \cdot \sin(\theta_{Ai}) \cdot \cos(\gamma_{Ai}) - Width_{shift}}{r_{Ai} \cdot \cos(\theta_{Ai}) \cdot \cos(\gamma_{Ai}) - Length_{shift}}\right) \quad (18)$$

$$\gamma_{Ai}' = \arctan\left(\frac{r_{Ai} \cdot \sin(\gamma_{Ai}) - Height_{shift}}{\sqrt{(r_{Ai} \cdot \cos(\theta_{Ai}) \cdot \cos(\gamma_{Ai}) - Length_{shift})^2 + (r_{Ai} \cdot \sin(\theta_{Ai}) \cdot \cos(\gamma_{Ai}) - Width_{shift})^2}}\right)$$

$$r_{Ai}' = \sqrt{(r_{Ai} \cdot \cos(\theta_{Ai}) \cdot \cos(\gamma_{Ai}) - Length_{shift})^2 + (r_{Ai} \cdot \sin(\theta_{Ai}) \cdot \cos(\gamma_{Ai}) - Width_{shift})^2 + (r_{Ai} \cdot \tan(\gamma_{Ai}) - Height_{shift})^2}$$

Note that Equation (18) may be modified like the following equation (19).

[Math. 19]

$$x_{Ai}' = r_{Ai} \cdot \cos(\theta_{Ai}) \cdot \cos(\gamma_{Ai}) - Length_{shift} \quad (19)$$

$$y_{Ai}' = r_{Ai} \cdot \sin(\theta_{Ai}) \cdot \cos(\gamma_{Ai}) - Width_{shift}$$

-continued $$z'_{Ai} = r_{Ai} \cdot \tan(\gamma_{Ai}) - Height_{shift}$$

$$\theta'_{Ai} = \arctan\left(\frac{y'_{Ai}}{x'_{Ai}}\right)$$

$$\gamma'_{Ai} = \arctan\left(\frac{z'_{Ai}}{\sqrt{x'^2_{Ai} + y'^2_{Ai}}}\right)$$

$$r'_{Ai} = \sqrt{x'^2_{Ai} + y'^2_{Ai} + z'^2_{Ai}}$$

In Equation (19), $x_{Ai}'$, $y_{v1}'$, and $z_{Ai}'$ are positions in the back and forth direction (depth direction), in the side-to-side direction, and in the up-and-down direction, respectively, in the xyz coordinate system of the object after the movement. Equation (19) is obtained as a modification of Equation (18), and Equations (18) and (19) are equivalent to each other.

As described above, the object position information after the movement is estimated using the distance $r_v$ from the viewer to the image frame and the distance $r_{Ai}$ of the object #i before the movement. However, when any of $r_v$ and $r_{Ai}$ is not given, it may be assumed that $r_v=r_{Ai}$. Furthermore, when none of them are given, it may be assumed that $r_v=r_{Ai}=1$.

When at least one of $r_v$ and $r_{Ai}$ is not given, a restriction that calculated by Equation (14) does not exceed $2*r_v$ may be provided to prevent the shift amount in the back and forth direction of the viewer from exceeding $r_v$. In other words, calculated by Equation (14) may be used to obtain a final value of $r_v'$ using an equation of $r_v'=\min(2*r_v, r_v')$.

(Illustration of Processing by Streaming Playback Section)

A streaming playback process to be performed by the streaming playback section according to the third embodiment of the information processing system to which the present disclosure is applied is the same as the streaming playback process shown in FIG. 29 except for the position determination process in step S134, and thus the following description will be given only of the position determination process.

Figure 36:
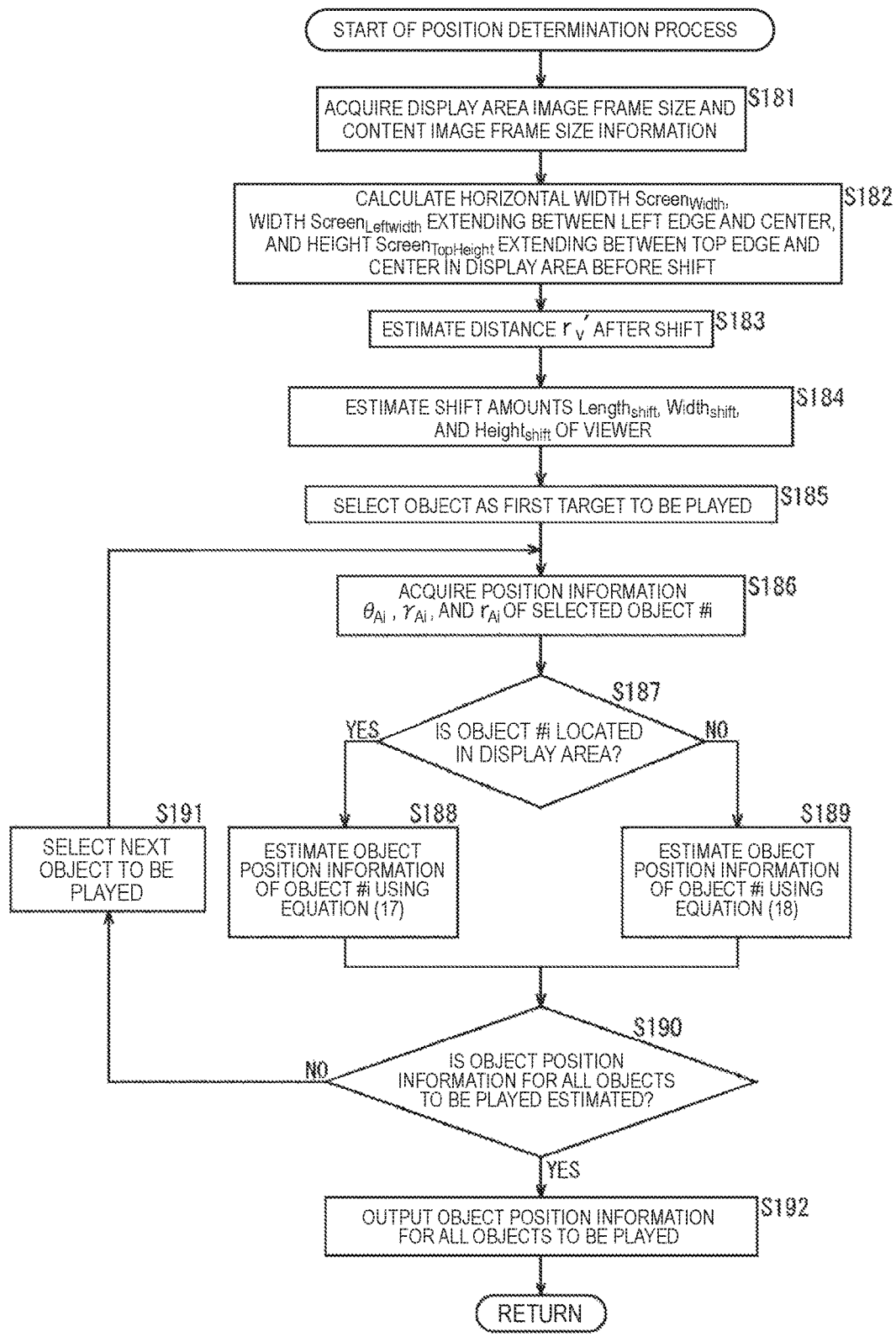
FIG. 36 is a flowchart illustrated to describe in detail the position determination process according to the third embodiment of the information processing system to which the present disclosure is applied.

FIG. 36 is a flowchart illustrated to describe in detail the position determination process according to the third embodiment of the information processing system to which the present disclosure is applied.

In step S181 of FIG. 36, the position determination unit 122 acquires the display area image frame size information and the content image frame size information of the display area 31 before the movement. Specifically, the position determination unit 122 acquires the horizontal angle $\theta_{v1}'$ at the left edge, horizontal angle $\theta_{v2}'$ at the right edge, vertical angle $\gamma_{v1}'$ at the upper edge, and vertical angle $\gamma_{v2}'$ at the lower edge, of the image frame in the display area 31 before the movement. The position determination unit 122 also acquires the horizontal angle $\theta_{v1}$ at the left edge, horizontal angle $\theta_{v2}$ at the right edge, vertical angle $\gamma_{v1}$ at the upper edge, vertical angle $\gamma_{v2}'$ at the lower edge, and distance $r_v$, of the image frame of the video content.

In step S182, the position determination unit 122 calculates a horizontal width $Screen_{Width}$, a width $Screen_{Leftwidth}$, and a height $Screen_{TopHeight}$ by the above-mentioned Equation (13) using the horizontal angles $\theta_{v1}'$ and $\theta_{v2}'$, vertical angle $\gamma_{v1}'$, and distance $r_v$.

In step S183, the position determination unit 122 estimates a distance $r_v'$ after the movement by the above-mentioned Equation (14) using the horizontal width $Screen_{Width}$ and horizontal angles $\theta_{v1}$ and $\theta_{v2}$.

In step S184, the position determination unit 122 estimates the shift amounts $Length_{shift}$, $Width_{shift}$, and $Height_{shift}$ of the viewer by the above-mentioned Equations (15) and (16) using the width $Screen_{LeftWidth}$, height $Screen_{TopHeight}$, distances $r_v$ and $r_v'$, horizontal angles $\theta_{v1}$, $\theta_{v2}$, $\theta_{v1}'$, and $\theta_{v2}'$, and vertical angles $\gamma_{v1}$, $\gamma_{v2}$, $\gamma_{v1}'$, and $\gamma_{v2}'$.

In step S185, the position determination unit 122 selects an object #i as a first target to be played.

In step S186, the position determination unit 122 acquires a horizontal angle $\theta_{Ai}$, a vertical angle $\gamma_{Ai}$, and a distance $r_{Ai}$ that are object position information before the movement of the selected object #i.

In step S187, the position determination unit 122 determines whether the object #i is located in the display area 31, i.e., whether the condition of $\theta_{v2}' \leq \theta_{Ai} \leq \theta_{v1}'$ and $\gamma_{v2}' \leq \gamma_{Ai} \leq \gamma_{v1}'$ is satisfied.

If it is determined in step S187 that the object #i is located in the display area 31, i.e., the condition of $\theta_{v2}' \leq \theta_{Ai} \leq \theta_{v1}'$ and $\gamma_{v2}' \leq \gamma_{Ai} \leq \gamma_{v1}'$ is satisfied, the process proceeds to step S188.

In step S188, the position determination unit 122 estimates object position information of the object #i in the display image by the above-mentioned Equation (17) using the shift amounts $Width_{shift}$ and $Height_{shift}$, distances $r_v$ and $r_v'$, horizontal angles $\theta_{Ai}$ and $\theta_{Ai}'$, and vertical angles $\gamma_{Ai}$ and $\gamma_{Ai}'$. Then, the process proceeds to step S190.

On the other hand, if it is not determined in step S187 that the object #i is located in the display area 31, i.e., the condition of $\theta_{v2}' \leq \theta_{Ai} \leq \theta_{v1}'$ and $\gamma_{v2}' \leq \gamma_{Ai} \leq \gamma_{v1}'$ is not satisfied, the process proceeds to step S189.

In step S189, the position determination unit 122 estimates object position information of the object #i in the display image by the above-mentioned Equation (18) using the shift amounts $Length_{shift}$, $Width_{shift}$ and $Height_{shift}$, the distance $r_{Ai}$, horizontal angles $\theta_{Ai}$ and vertical angles $\gamma_{Ai}$ and $\gamma_{Ai}'$. Then, the process proceeds to step S190.

In step S190, the position determination unit 122 determines whether the object position information for all the objects to be played is estimated. If it is not determined in step S190 that the object position information for all the objects to be played is estimated, the process proceeds to step S191.

In step S191, the position determination unit 122 selects an object following the currently selected object among objects to be played, and then the process returns to step S186.

On the other hand, if it is determined in step S190 that the object position information for all the objects is estimated, the process proceeds to step S192.

In step S192, the position determination unit 122 outputs the object position information for all the objects to be played in the display image to the voice synthesis processor 123. After the process in step S192, the process returns to step S134 of FIG. 29, and then proceeds to step S135.

Although the size of the display image is set to be equal to the size of the video content in the second embodiment, the size of both may be different from each other.

In the third embodiment, voice data of some objects (e.g. objects in a display area or objects within a predetermined range from a display area) may be synthesized and outputted, rather than the voice data of all objects to be played is synthesized and outputted. A method of selecting an object of voice data to be outputted may be determined in advance or may be decided by the user.

Fourth Embodiment (Description of a Computer to which the Present Disclosure is Applied)

The series of processes by the Web server 12 described above can be executed by hardware or software. When the series of processes are executed by software, a program constituting the software is installed in a computer. Here, the computer includes a computer incorporated into dedicated hardware, a general-purpose personal computer, for example, that can execute various functions by installing various programs, and the like.

Figure 37:
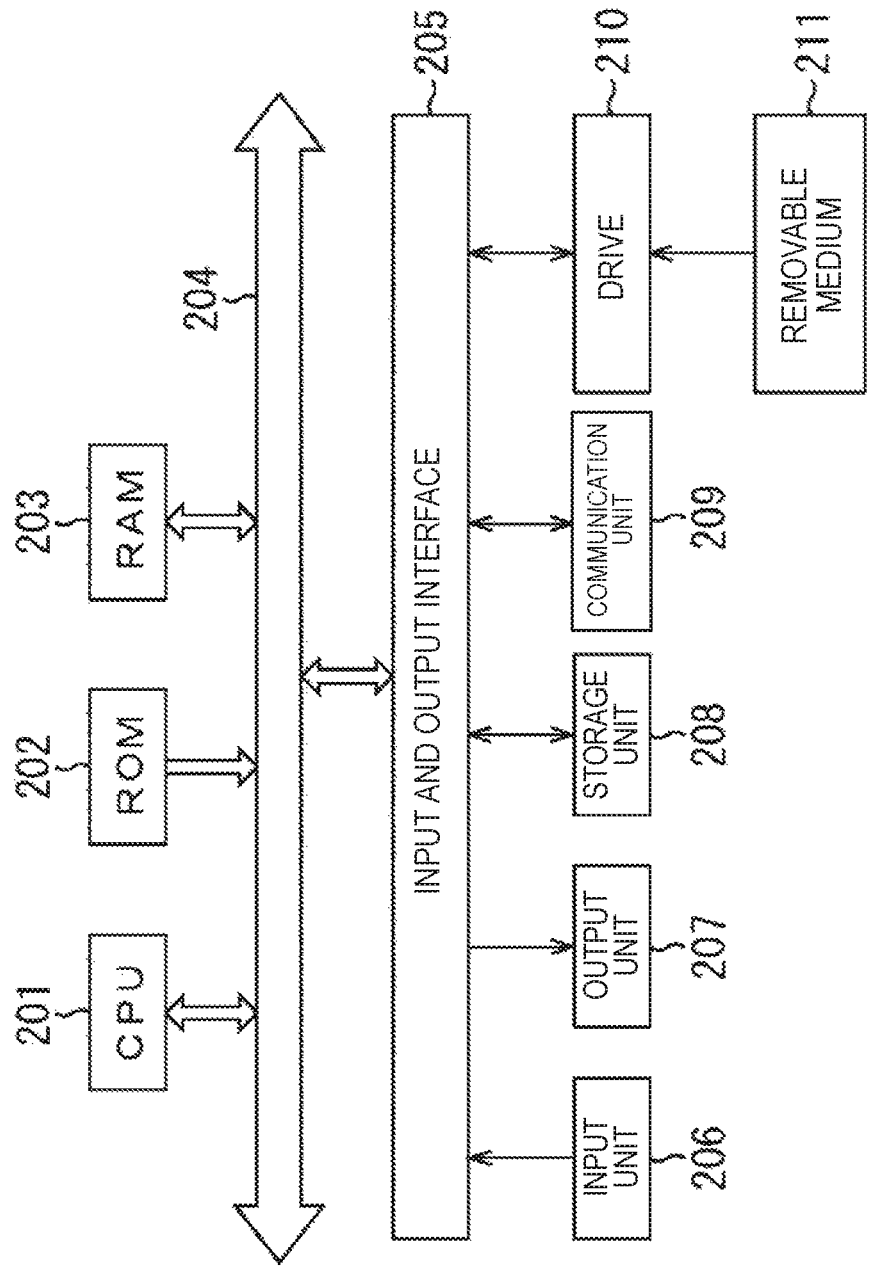
FIG. 37 is a block diagram illustrating an exemplary hardware configuration of a computer.

FIG. 37 is a block diagram illustrating an example of a hardware configuration of a computer which executes the above-described series of processes by the Web server 12 using a program.

In the computer, a central processing unit (CPU) 201, a read only memory (ROM) 202, and a random access memory (RAM) 203 are connected to one another by a bus 204.

The bus 204 is further connected with an input and output interface 205. The input and output interlace 205 is connected with an input unit 206, an output unit 207, a storage unit 208, a communication unit 209, and a drive 210.

The input unit 206 includes a keyboard, a mouse, a microphone, or the like. The output unit 207 includes a display, a speaker, or the like. The storage unit 208 includes a hard disk, a non-volatile memory, or the like. The communication unit 209 includes a network interface or the like. The drive 210 drives a removable medium 211 such as a magnetic disk, an optical disc, a magneto-optical disc, or a semiconductor memory.

The series of processes described above are performed in the computer configured as described above when the CPU 201 loads, for example, the program stored in the storage unit 208 in the RAM 203 through the input and output interface 205 and the bus 204 for execution.

The program executed by the computer (CPU 201) can be provided by being recorded in the removable medium 211 serving as, for example, a package medium or the like. In addition, the program can be provided via a wired or wireless transmission medium such as a local area network, the Internet, or digital satellite broadcasting.

The program can be installed in the storage unit 208 of the computer using the input and output interface 205 by loading the removable medium 211 in the drive 210. In addition, the program can be received by the communication unit 209 and installed in the storage unit 208 via the wired or wireless transmission medium. Further, the program can be installed in advance in the ROM 202 or the storage unit 208.

Note that the program executed by the computer may be a program which performs the processes in a time series manner in the order described in the present specification, or may be a program which performs the processes in parallel or at necessary timings when they are invoked, or the like.

The video playback terminal 14 may have hardware configuration that is substantially similar to that of the computer shown in FIG. 37. In this case, the CPU 201 may execute the control software 21, the video playback software 22, and the access software 23. Processing by the video playback terminal 14 may be executed using hardware.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the file generation device 11 may be configured to generate a video stream by multiplexing encoded data of all tiles rather than the generation of an image file in units of tiles to generate a single image file.

The voice corresponding to the display area 31 may include a voice from a fixed object outside the display area 31 in addition to the voice from an object within the display area 31.

Moreover, the voice data may include voice data of channel audio, voice data of higher-order ambisonics (HOA) audio, voice data of spatial audio object coding, and metadata of voice data (scene information and dynamic or static metadata), in addition to voice data in units of objects. In this case, for example, in addition to the encoded data of each object, encoded data of these data is also arranged as a subsample.

Additionally, the present technology may also be configured as below (1)

An information processing device including:

a transmitter configured to transmit image frame size information and voice position information, the image frame size information indicating an image frame size of image data, the voice position information indicating an acquisition position of voice data.

(2)

The information processing device according to (1), wherein the image frame size information is configured as information indicating an angle of view in horizontal and vertical directions of the image data and a distance between a base point of the angle of view and an image plane.

(3)

The information processing device according to (1) or (2), wherein the voice position information is configured as information indicating an angle in horizontal and vertical directions of a line connecting a position in which the voice data is acquired and a base point and a distance between the position in which the voice data is acquired and the base point.

(4)

The information processing device according to any of (1) to (3), further including:

a metafile generator configured to generate a metadata tile of the voice data including the voice position information; and an information generator configured to generate, as control information, information used to specify the image frame size information and the metadata file, wherein the transmitter is configured to transmit the control information generated by the information generator and the metadata file generated by the metafile generator.

(5)

The information processing device according to any of (1) to (4), wherein the transmitter is configured to transmit the voice data. corresponding to a display area that is an area to be displayed in an image corresponding to the image data, the voice data being requested based on the image frame size information and the voice position information.

(6)

The information processing device according to (5),
wherein the voice data is voice data in units of objects, and
wherein the transmitter is configured to transmit voice data of the object corresponding to the display area.

(7)
The information processing device according to (6), further including:
a voice file generator configured to generate a voice file including voice data of a plurality of the objects and data position information indicating a position of each of the objects in the voice file of the voice data,
wherein the transmitter is configured to transmit voice data of the object corresponding to the display area in the voice file generated by the voice file generator.

(8)
The information processing device according to (6), further including:
a voice file generator configured to generate a voice file including each of the voice data of a plurality of the objects,
wherein the transmitter is configured to transmit file specifying information used to specify the voice file of each of the objects and to transmit the voice file including the voice data of the object corresponding to the display area, the voice data being requested based on the image frame size information, the voice position information, and the file specifying information.

(9)
An information processing method including:
a transmission step of transmitting image frame size information and voice position information by an information processing device, the image frame size information indicating an image frame size of image data, the voice position information indicating an acquisition position of voice data.

(10)
An information processing device including:
a receiver configured to receive image frame size information and voice position information, the image frame size information indicating an image frame size of image data, the voice position information indicating an acquisition position of voice data; and
a position determination unit configured to determine an acquisition position of the voice data on an image corresponding to the image data based on the image frame size information of the image data and the voice position information received by the receiver.

(11)
The information processing device according to (10),
wherein the image frame size information is configured as information indicating an angle of view in horizontal and vertical directions of the image data and a distance between a base point of the angle of view and an image plane.

(12)
The information processing device according to (10) or (11),
wherein the voice position information is configured as information indicating an angle in horizontal and vertical directions of a line connecting a position in which the voice data is acquired and a base point, and a distance between the position in which the voice data is acquired and the base point.

(13)
The information processing device according to any of (10) to (12),
wherein the voice data is voice data in units of objects, and
wherein the position determination unit is configured to determine an acquisition position of the voice data of each of the objects on an image corresponding to the image data based on the image frame size information and the voice position information of each of the objects.

(14)
The information processing device according to (13), further including:
a voice selector configured to select voice data of the object corresponding to a display area that is an area to be displayed in an image corresponding to the image data based on the acquisition position of the voice data of each of the objects determined by the position determination unit,
wherein the receiver is configured to receive the voice data selected by the voice selector.

(15)
The information processing device according to (14),
wherein the receiver is configured to receive voice data of the object selected by the voice selector, the voice data of the object being contained in a voice file including the voice data of a plurality of the objects and data position information indicating a position of each of the objects in the voice file of the voice data.

(16)
The information processing device according to (14),
wherein the receiver is configured to receive the voice file including voice data of the object selected by the voice selector among voice files including each of voice data of a plurality of the objects.

(17)
The information processing device according to (13), further including:
a voice synthesis processor configured to synthesize voice data of a plurality of the objects based on the acquisition position of the voice data of each of the objects determined by the position determination unit.

(18)
The information processing device according to (17), further including:
a converter configured to convert a size of image data in an display area that is an area to be displayed in an image corresponding to the image data to a size of the image data,
wherein the position determination unit is configured to determine an acquisition position of the voice data of each of the objects on an image corresponding to image data of the display area having the size converted by the converter, based on the image frame size information of the image data, the voice position information of each of the objects, and image frame size information of the display area.

(19)
The information processing device according to (18),
wherein the image frame size information of the display area is configured as information indicating an angle of view in horizontal and vertical directions of the display area and a distance between a base point of the angle of view and an image plane.

(20)
An information processing method including:
a reception step of receiving image frame size information and voice position information, the image frame size information indicating an image frame size of image data, the voice position information indicating an acquisition position of voice data; and
a position determination step of determining an acquisition position of the voice data on an image corresponding to the image data, based on the image frame size information of the image data and the voice position information received by a process in the reception step.

REFERENCE SIGNS LIST 11 file generation device
12 Web server
14 video playback terminal
56 voice file generator
57 MPD generator
91 MPD acquisition unit
94 voice selector
95 voice file acquisition unit
122 position determination unit
123 voice synthesis processor
124 image synthesis processor

The invention claimed is:
1. An information processing device comprising:
a non-transitory computer-readable medium;
a transmitter configured to transmit image frame size information and voice position information, the image frame size information indicating an image frame size of image data, and the voice position information indicating an acquisition position of voice data corresponding to a display area that is a uniquely identifiable sub area to be displayed in an image corresponding to the image data, the uniquely identifiable sub area being a portion of the image that is less than a total area of the image, and the voice data being requested based on the image frame size information and the voice position information, wherein the image is partitioned into a plurality of tiles, and the display area is composed of one or more of the tiles, wherein the image includes a plurality of objects, and the voice data is associated with one object, of the plurality of the objects, that corresponds to the display area, and wherein the transmitter is further configured to transmit the requested voice data associated with the one object that corresponds to the display area; and
circuitry configured to generate a voice file including each of the voice data of the plurality of the objects,
wherein the transmitter is further configured to transmit file specifying information used to specify the voice file of each of the objects and to transmit the voice file including the voice data associated with the one object corresponding to the display area, the voice data being requested based further on the file specifying information.
2. The information processing device according to claim 1,
wherein the image frame size information is configured as information indicating an angle of view in horizontal and vertical directions of the image data and a distance between a base point of the angle of view and an image plane.
3. The information processing device according to claim 1,
wherein the voice position information is configured as information indicating an angle in horizontal and vertical directions of a line connecting a position in which the voice data is acquired and a base point and a distance between the position in which the voice data is acquired and the base point.
4. The information processing device according to claim 1, further comprising:
circuitry configured to:
generate a metadata file of the voice data including the voice position information; and
generate, as control information, information used to specify the image frame size information and the metadata file,
wherein the transmitter is configured to transmit the generated control information and the generated metadata file.
5. The information processing device according to claim 1, wherein the circuitry is further configured to:
generate data position information indicating a position of each of the objects in the voice file of the voice data.
6. The information processing device according to claim 1,
wherein the display area is composed of a number of tiles that is less than a total number of the tiles of the image.
7. An information processing method comprising:
transmitting image frame size information and voice position information by an information processing device, the image frame size information indicating an image frame size of image data, and the voice position information indicating an acquisition position of voice data corresponding to a display area that is a uniquely identifiable sub area to be displayed in an image corresponding to the image data, the uniquely identifiable sub area being a portion of the image that is less than a total area of the image, and the voice data being requested based on the image frame size information and the voice position information, wherein the image is partitioned into a plurality of tiles, and the display area is composed of one or more of the tiles, and wherein the image includes a plurality of objects, and the voice data is associated with one object, of the plurality of the objects, that corresponds to the display area;
transmitting by the information processing device, the requested voice data associated with the one object that corresponds to the display area; and
generating a voice file including each of the voice data of the plurality of the objects,
wherein file specifying information used to specify the voice file of each of the objects, and the voice file including the voice data associated with the one object corresponding to the display area, are further being transmitted by the information processing device, and the voice data is requested based further on the file specifying information.
8. An information processing device comprising:
a non-transitory computer-readable medium;
a receiver configured to receive image frame size information and voice position information, the image frame size information indicating an image frame size of image data, and the voice position information indicating an acquisition position of voice data corresponding to a display area that is a uniquely identifiable sub area to be displayed in an image corresponding to the image data, the uniquely identifiable sub area being a portion of the image that is less than a total area of the image, and the voice data being requested based on the image frame size information and the voice position information, wherein the image is partitioned into a plurality of tiles, and the display area is composed of one or more of the tiles; and
circuitry configured to determine the acquisition position of the voice data on the image corresponding to the image data based on the image frame size information of the image data and the voice position information received by the receiver, wherein the image includes a plurality of objects, and the voice data is associated with one object, of the plurality of the objects, that corresponds to the display area, wherein the information processing device is further configured to obtain the requested voice data associated with the one object that corresponds to the display area, wherein the circuitry is further configured to determine an acquisition position of the voice data of each of the objects on the image corresponding to the image data based on the image frame size information and the voice position information of each of the objects, wherein the circuitry is further configured to select voice data of the object corresponding to the display area that is the uniquely identifiable sub area to be displayed in the image corresponding to the image data based on the determined acquisition position of the voice data of each of the objects, wherein the receiver is further configured to obtain the voice data selected by the voice selector by receiving, at the receiver, the selected voice data, and wherein the voice data of the object is contained in a voice file including the voice data of a plurality of the objects and data position information indicating a position of each of the objects in the voice file of the voice data.

9. The information processing device according to claim 8, wherein the image frame size information is configured as information indicating an angle of view in horizontal and vertical directions of the image data and a distance between a base point of the angle of view and an image plane.

10. The information processing device according to claim 8, wherein the voice position information is configured as information indicating an angle in horizontal and vertical directions of a line connecting a position in which the voice data is acquired and a base point, and a distance between the position in which the voice data is acquired and the base point.

11. The information processing device according to claim 8, wherein the receiver is further configured to receive the voice file including voice data of the object selected by the voice selector among voice files including each of voice data of the plurality of the objects.

12. The information processing device according to claim 8, further comprising:

circuitry configured to synthesize voice data of the plurality of the objects based on the determined acquisition position of the voice data of each of the objects, wherein the receiver obtains the voice data selected by the voice selector by receiving, from the voice synthesis processor, the selected voice data.

13. The information processing device according to claim 12, further comprising:

circuitry configured to convert a size of image data in the display area that is the uniquely identifiable sub area to be displayed in the image corresponding to the image data; and circuitry configured to determine acquisition position of the voice data of each of the objects on the image corresponding to image data of the display area having the size converted by the converter, based on the image frame size information of the image data, the voice position information of each of the objects, and image frame size information of the display area.

14. The information processing device according to claim 13, wherein the image frame size information of the display area is configured as information indicating an angle of view in horizontal and vertical directions of the display area and a distance between a base point of the angle of view and an image plane.

15. An information processing method comprising:

receiving image frame size information and voice position information, the image frame size information indicating an image frame size of image data, and the voice position information indicating an acquisition position of voice data corresponding to a display area that is a uniquely identifiable sub area to be displayed in an image corresponding to the image data, the uniquely identifiable sub area being a portion of the image that is less than a total area of the image, and the voice data being requested based on the image frame size information and the voice position information, wherein the image is partitioned into a plurality of tiles, and the display area is composed of one or more of the tiles;

determining the acquisition position of the voice data on the image corresponding to the image data, based on the received image frame size information of the image data and the received voice position information, wherein the image includes a plurality of objects, and the voice data is associated with one object, of the plurality of the objects, that corresponds to the display area;

obtaining the requested voice data associated with the one object that corresponds to the display area;

determining an acquisition position of the voice data of each of the objects on the image corresponding to the image data based on the image frame size information and the voice position information of each of the objects; and selecting voice data of the object corresponding to the display area that is the uniquely identifiable sub area to be displayed in the image corresponding to the image data based on the determined acquisition position of the voice data of each of the objects, wherein the voice data selected by the voice selector is obtained by receiving the selected voice data, wherein the voice data of the object is contained in a voice file including the voice data of a plurality of the objects and data position information indicating a position of each of the objects in the voice file of the voice data.

* * * * *